(12) United States Patent
Krisko et al.

(10) Patent No.: US 9,610,530 B2
(45) Date of Patent: *Apr. 4, 2017

(54) FILTER ELEMENTS; AIR CLEANER; ASSEMBLY; AND, METHODS

(71) Applicant: Donaldson Company, Inc., Minneapolis, MN (US)

(72) Inventors: William J. Krisko, Bloomington, MN (US); Wayne R. W. Bishop, St. Louis Park, MN (US); Steven S. Gieseke, Richfield, MN (US); Benny K Nelson, Bloomington, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/328,073

(22) Filed: Jul. 10, 2014

(65) Prior Publication Data

US 2015/0068174 A1 Mar. 12, 2015

Related U.S. Application Data

(63) Continuation of application No. 13/356,205, filed on Jan. 23, 2012, now Pat. No. 8,778,043, which is a
(Continued)

(51) Int. Cl.
*B01D 46/52* (2006.01)
*B01D 45/16* (2006.01)
(Continued)

(52) U.S. Cl.
CPC ........... *B01D 46/527* (2013.01); *B01D 45/16* (2013.01); *B01D 46/4227* (2013.01);
(Continued)

(58) Field of Classification Search
CPC B01D 46/525; B01D 46/527; B01D 2271/02; B01D 2271/022
See application file for complete search history.

(56) References Cited

U.S. PATENT DOCUMENTS 1,238,068 A 8/1917 Slater et al.
2,064,207 A 12/1936 Jacobs
(Continued)

FOREIGN PATENT DOCUMENTS

DE 44 29 527 A1 10/1995
DE 102 22 800 A1 4/2003
(Continued)

OTHER PUBLICATIONS

Complaint filed by Donaldson Company, Inc. in *Donaldson Company, Inc.* v. *Baldwin Filters, Inc.*, United States District Court District of Minnesota, Case 0:09-cv-01049-JMR-AJB, May 5, 2009; and Exhibits A-F.
(Continued)

*Primary Examiner* — Robert Clemente
(74) *Attorney, Agent, or Firm* — Merchant & Gould, P.C.

(57) ABSTRACT

A filter cartridge, a safety element and fluid cleaner assembly are described. The fluid cleaner assembly generally includes a housing having a cover and a primary fluid cleaner section. The filter cartridge generally comprises z-filter media, arranged in a straight through configuration. Preferred cartridges include a seal gasket positioned to extend continuously around at outer perimeter of the straight through flow construction. The fluid cleaner assembly can have a precleaner positioned therein. Preferred features are described. Methods of assembly and use are also provided.

21 Claims, 17 Drawing Sheets

Related U.S. Application Data continuation of application No. 12/692,114, filed on Jan. 22, 2010, now Pat. No. 8,101,003, which is a continuation of application No. 10/587,766, filed as application No. PCT/US2005/009813 on Mar. 23, 2005, now Pat. No. 7,674,308.

(60) Provisional application No. 60/556,133, filed on Mar. 24, 2004.

(51) Int. Cl.
  *B01D 46/42* (2006.01)
  *B01D 50/00* (2006.01)

(52) U.S. Cl.
  CPC ......... *B01D 46/525* (2013.01); *B01D 50/002* (2013.01); *B01D 2265/028* (2013.01); *B01D 2271/022* (2013.01); *B01D 2275/208* (2013.01); *Y10T 29/4998* (2015.01)

(56) References Cited

U.S. PATENT DOCUMENTS

| | | |
|---|---|---|
| 2,559,604 A | 6/1952 | Bauer et al. |
| 2,890,796 A | 6/1959 | Blood |
| 3,025,963 A | 3/1962 | Bauer |
| 3,209,917 A | 10/1965 | Yelinek |
| 3,216,578 A | 11/1965 | Wright et al. |
| 3,397,518 A | 8/1968 | Rogers |
| 3,676,242 A | 7/1972 | Prentice |
| 3,695,012 A | 10/1972 | Rolland |
| 3,695,437 A | 10/1972 | Shaltis |
| 3,712,033 A | 1/1973 | Gronholz |
| 3,807,150 A | 4/1974 | Maracle |
| 3,841,953 A | 10/1974 | Lohkamp et al. |
| 3,849,241 A | 11/1974 | Butin et al. |
| 3,878,014 A | 4/1975 | Melead |
| 3,912,631 A | 10/1975 | Turman |
| 4,065,341 A | 12/1977 | Cub |
| 4,093,435 A | 6/1978 | Marron et al. |
| 4,187,091 A | 2/1980 | Durre et al. |
| 4,201,819 A | 5/1980 | Schenz |
| 4,242,115 A | 12/1980 | Harold et al. |
| 4,255,175 A | 3/1981 | Wilkins |
| 4,316,801 A | 2/1982 | Cooper |
| 4,322,231 A | 3/1982 | Hilzendeger et al. |
| 4,359,330 A | 11/1982 | Copley |
| 4,394,147 A | 7/1983 | Caddy et al. |
| 4,402,830 A | 9/1983 | Pall |
| 4,410,430 A | 10/1983 | Hagler, Jr. |
| 4,449,993 A | 5/1984 | Bergeron |
| 4,498,989 A | 2/1985 | Miyakawa et al. |
| 4,575,422 A | 3/1986 | Zimmer |
| 4,589,983 A | 5/1986 | Wydevan |
| RE32,185 E | 6/1986 | Copley |
| 4,617,122 A | 10/1986 | Kruse et al. |
| 4,673,503 A | 6/1987 | Fujimoto |
| 4,720,292 A | 1/1988 | Engel et al. |
| 4,746,340 A | 5/1988 | Durre et al. |
| 4,810,379 A | 3/1989 | Barrington |
| 4,963,171 A | 10/1990 | Osendorf |
| 4,997,466 A | 3/1991 | Hood |
| 5,069,790 A | 12/1991 | Mordecki |
| 5,125,941 A | 6/1992 | Ernst et al. |
| 5,211,846 A | 5/1993 | Kott et al. |
| 5,238,474 A | 8/1993 | Kahlbaugh et al. |
| 5,240,479 A | 8/1993 | Bachinski |
| 5,290,621 A | 3/1994 | Bach et al. |
| 5,304,312 A | 4/1994 | Forster et al. |
| 5,350,515 A | 9/1994 | Stark et al. |
| 5,415,677 A | 5/1995 | Ager et al. |
| 5,423,892 A | 6/1995 | Kahlbaugh et al. |
| 5,435,870 A | 7/1995 | Takagaki et al. |
| 5,443,891 A | 8/1995 | Bach |
| 5,472,379 A | 12/1995 | Andress et al. |
| 5,472,463 A | 12/1995 | Herman et al. |
| 5,484,466 A | 1/1996 | Brown et al. |
| 5,487,767 A | 1/1996 | Brown |
| 5,531,892 A | 7/1996 | Duffy |
| 5,536,290 A | 7/1996 | Stark et al. |
| 5,543,007 A | 8/1996 | Takagaki et al. |
| 5,547,480 A | 8/1996 | Coulonvaux |
| 5,569,311 A | 10/1996 | Oda et al. |
| 5,601,717 A | 2/1997 | Villette et al. |
| 5,613,992 A | 3/1997 | Engel |
| 5,620,505 A | 4/1997 | Koch et al. |
| 5,624,559 A | 4/1997 | Levin et al. |
| 5,667,545 A | 9/1997 | Honda et al. |
| 5,674,302 A | 10/1997 | Nakayama et al. |
| 5,679,122 A | 10/1997 | Moll et al. |
| 5,685,985 A | 11/1997 | Brown et al. |
| 5,714,126 A | 2/1998 | Frund |
| 5,720,790 A | 2/1998 | Kometani et al. |
| 5,730,766 A | 3/1998 | Clements |
| D396,098 S | 7/1998 | Gillingham et al. |
| 5,782,944 A | 7/1998 | Justice |
| 5,792,229 A | 8/1998 | Sassa et al. |
| 5,792,247 A | 8/1998 | Gillingham et al. |
| 5,795,361 A | 8/1998 | Lanier, Jr. et al. |
| D398,046 S | 9/1998 | Gillingham et al. |
| D399,944 S | 10/1998 | Gillingham et al. |
| 5,820,646 A | 10/1998 | Gillingham et al. |
| 5,846,495 A | 12/1998 | Whittenberger et al. |
| 5,871,557 A | 2/1999 | Tokar et al. |
| 5,895,574 A | 4/1999 | Friedmann et al. |
| 5,897,676 A | 4/1999 | Engel et al. |
| 5,897,787 A | 4/1999 | Keller |
| 5,902,361 A | 5/1999 | Pomplun et al. |
| 5,902,364 A | 5/1999 | Tokar et al. |
| 5,958,097 A | 9/1999 | Schlor et al. |
| D417,268 S | 11/1999 | Gillingham |
| 6,017,379 A | 1/2000 | Kauffman |
| D425,189 S | 5/2000 | Gillingham et al. |
| D428,128 S | 7/2000 | Gillingham et al. |
| 6,164,457 A | 12/2000 | Schlör |
| 6,179,890 B1 | 1/2001 | Ramos et al. |
| D437,402 S | 2/2001 | Gieseke et al. |
| 6,187,073 B1 | 2/2001 | Gieseke et al. |
| 6,190,432 B1 | 2/2001 | Gieseke et al. |
| D439,963 S | 4/2001 | Gieseke et al. |
| 6,221,122 B1 | 4/2001 | Gieseke et al. |
| 6,231,630 B1 | 5/2001 | Ernst et al. |
| 6,235,195 B1 | 5/2001 | Tokar |
| D444,219 S | 6/2001 | Gieseke et al. |
| D447,549 S | 9/2001 | Gieseke et al. |
| D450,827 S | 11/2001 | Gieseke et al. |
| D450,828 S | 11/2001 | Tokar |
| 6,348,084 B1 | 2/2002 | Gieseke et al. |
| 6,350,291 B1 | 2/2002 | Gieseke et al. |
| D455,483 S | 4/2002 | Gieseke et al. |
| 6,368,374 B1 | 4/2002 | Tokar et al. |
| 6,375,700 B1 | 4/2002 | Jaroszczyk et al. |
| 6,391,076 B1 | 5/2002 | Jaroszczyk et al. |
| D461,003 S | 7/2002 | Gieseke et al. |
| 6,416,561 B1 | 7/2002 | Kallsen et al. |
| D461,884 S | 8/2002 | Gieseke et al. |
| 6,447,567 B1 | 9/2002 | Ehrenberg |
| 6,482,247 B2 | 11/2002 | Jaroszczyk et al. |
| D466,602 S | 12/2002 | Gieseke et al. |
| 6,511,599 B2 | 1/2003 | Jaroszczyk et al. |
| 6,517,598 B2 | 2/2003 | Anderson et al. |
| 6,533,845 B2 | 3/2003 | Tokar et al. |
| 6,547,857 B2 | 4/2003 | Gieseke et al. |
| 6,599,344 B2 | 7/2003 | Tokar et al. |
| 6,610,117 B2 | 8/2003 | Gieseke et al. |
| 6,610,126 B2 | 8/2003 | Xu et al. |
| 6,641,637 B2 | 11/2003 | Kallsen et al. |
| 6,673,136 B2 | 1/2004 | Gillingham et al. |
| 6,706,087 B1 | 3/2004 | Gebler et al. |
| 6,743,317 B2 | 6/2004 | Wydeven |
| 6,746,518 B2 | 6/2004 | Gieseke |
| 6,783,565 B2 | 8/2004 | Gieseke et al. |
| 6,852,141 B2 | 2/2005 | Bishop et al. |
| 6,875,256 B2 | 4/2005 | Gillingham et al. |

(56) References Cited

U.S. PATENT DOCUMENTS

| | | |
|---|---|---|
| D506,539 S | 6/2005 | Bishop et al. |
| 6,908,494 B2 | 6/2005 | Gillingham et al. |
| 6,916,360 B2 | 7/2005 | Seguin et al. |
| 6,966,940 B2 | 11/2005 | Krisko et al. |
| 7,004,986 B2 | 2/2006 | Kopec et al. |
| 7,008,467 B2 | 3/2006 | Krisko et al. |
| 7,090,711 B2 | 8/2006 | Gillingham et al. |
| 7,318,851 B2 | 1/2008 | Brown et al. |
| 7,396,375 B2 | 7/2008 | Nepsund et al. |
| 7,491,254 B2 | 2/2009 | Krisko et al. |
| 7,520,913 B2 | 4/2009 | Mills et al. |
| 7,674,308 B2 | 3/2010 | Krisko et al. |
| 8,101,003 B2 | 1/2012 | Krisko et al. |
| 8,778,043 B2 | 7/2014 | Krisko et al. |
| 2002/0185007 A1 | 12/2002 | Xu et al. |
| 2002/0189457 A1 | 12/2002 | Dallas et al. |
| 2003/0146149 A1 | 8/2003 | Binder et al. |
| 2003/0154863 A1 | 8/2003 | Tokar et al. |
| 2003/0217534 A1 | 11/2003 | Krisko et al. |
| 2004/0040271 A1 | 3/2004 | Kopec et al. |
| 2004/0060861 A1 | 4/2004 | Winter et al. |
| 2004/0255781 A1 | 12/2004 | Tokar et al. |
| 2006/0090434 A1 | 5/2006 | Brown et al. |
| 2006/0091061 A1 | 5/2006 | Brown |
| 2006/0091064 A1 | 5/2006 | Brown et al. |
| 2006/0091066 A1 | 5/2006 | Driml et al. |
| 2006/0091084 A1 | 5/2006 | Merritt et al. |
| 2006/0123990 A1 | 6/2006 | Tokar et al. |
| 2006/0137316 A1 | 6/2006 | Krull et al. |
| 2007/0186774 A1 | 8/2007 | Gillingham et al. |
| 2007/0193236 A1 | 8/2007 | Merritt |
| 2007/0209343 A1 | 9/2007 | Cuvelier |
| 2008/0060329 A1 | 3/2008 | Brown et al. |
| 2009/0199520 A1 | 8/2009 | Mills et al. |
| 2009/0241494 A1 | 10/2009 | Schrage et al. |
| 2010/0107577 A1 | 5/2010 | Krisko et al. |
| 2010/0115897 A1 | 5/2010 | Krisko et al. |
| 2010/0186353 A1 | 7/2010 | Ackermann et al. |

FOREIGN PATENT DOCUMENTS

| | | |
|---|---|---|
| EP | 0726389 | 8/1996 |
| EP | 1 306 117 A1 | 5/2003 |
| EP | 1364695 | 11/2003 |
| FR | 2 382 258 | 9/1978 |
| GB | 945 065 | 12/1963 |
| GB | 1 284 403 | 8/1972 |
| GB | 2 106 634 A | 4/1983 |
| JP | 59-170669 | 11/1984 |
| JP | S60-112320 | 7/1985 |
| JP | S60-124622 | 8/1985 |
| JP | 60-155921 | 10/1985 |
| JP | 63-122617 | 6/1988 |
| JP | 63-33612 | 9/1988 |
| JP | 1-11971 | 4/1989 |
| JP | 1-171615 | 7/1989 |
| JP | 2-9858 | 3/1990 |
| JP | 2-129233 | 10/1990 |
| JP | Hei-2-31131 | 10/1990 |
| JP | 8-28376 | 1/1996 |
| JP | 8-243334 | 9/1996 |
| JP | 9-234321 | 9/1997 |
| JP | 2001-507617 | 6/2001 |
| JP | 2003-514178 | 4/2003 |
| JP | 4664969 B2 | 4/2011 |
| WO | WO 89/01818 | 3/1989 |
| WO | WO 97/40918 | 11/1997 |
| WO | WO 01 34270 | 5/2001 |
| WO | WO 03/084641 | 10/2003 |
| WO | WO 2004/020075 | 3/2004 |
| WO | WO 2005/037408 A1 | 4/2005 |
| WO | WO 2005/107924 A2 | 11/2005 |
| WO | WO 2008/067029 A1 | 6/2008 |

OTHER PUBLICATIONS

Declaration of Wayne R.W. Bishop and Exhibits A-D (7 pages).
European Search Report for Application No. 13153716.9 mailed Sep. 2, 2013.
European Search Report for Application No. 13 16 1605.4 mailed Dec. 4, 2013.
Jaroszczyk et al.; Recent Advances in Engine Air Cleaners Design and Evaluation; 2004; vol. 11, No. 1-2 pp. 259-275.
Thomas G. Miller; Statement Regarding Product; Dec. 23, 2010; 7 pages.
Thomas G. Miller; Statement Regarding Product; Dec. 23, 2010; 10 pages.
Declaration of Interference, *Baldwin Filters, Inc.* v. *Donaldson Company, Inc.*, Interference No. 106,021 (RES), 6 pages (Apr. 30, 2015).
Standing Order, 81 pages (Apr. 30, 2015).
Donaldson Designation of Lead and Backup Counsel, Interference No. 106,021 (RES)m 4 pages (May 14, 2015).
Donaldson Identification of Real Party in Interest, Interference No. 106,021 (RES), 3 pages (May 14, 2015).
Donaldson Clean Copy of Claims, Interference No. 106,021 (RES), 13 pages (May 14, 2015).
Donaldson Notice of Related Proceedings, Interference No. 106,021 (RES), 4 pages (May 14, 2015).
Donaldson Request for File Copies, Interference No. 106,021 (RES), 6 pages (May 14, 2015).
Baldwin Designation of Lead and Backup Counsel, Interference No. 106,021 (RES), 5 pages (May 13, 2015).
Baldwin Notice of Real Party in Interest, Interference No. 106,021 (RES), 3 pages (May 13, 2015).
Order—Bd.R. 109(b)—Authorizing Copies of Office Records, Interference No. 106,021 (RES), 3 pages (May 19, 2015).
Baldwin Clean Copy of Claims, Interference No. 106,021 (RES), 11 pages (May 18, 2015).
Brown Notice of Related Proceedings, Interference No. 106,021 (RES), 4 pages (May 18, 2015).
Order—Miscellaneous—37 CFR§ 41.104(a), Interference No. 106,021 (RES), 3 pages (May 22, 2015).
Donaldson's Annotated Claims, Interference No. 106,021 (RES), 16 pages (May 28, 2015).
Baldwin Annotated Claims, Interference No. 106,021 (RES), 19 pages (May 28, 2015).
Baldwin Response to Order in Declaration of Interference, Interference No. 106,021 (RES), 15 pages (Jun. 9, 2015).
Appendix A—Krisko Patent 7,674,308 claim 26 compared to Brown U.S. Appl. 13/042,859 claim 15 and Appendix B—Comparing Other Krisko Patent 7,674,308 independent Claims to Brown Application U.S. Appl. No. 13/042,859 claim 15, Interference No. 106,021 (RES) , 82 pages (Jun. 9, 2015).
Appendix C—Claims of Patent 7,674,308 to Krisko Compared to Count 2 of Interference 105,799, Interference No. 106,021 (RES), 102 pages (Jun. 9, 2015).
Appendix D—Written Description Support in Ex 2002, Interference No. 106,021 (RES), 102 pages (Jun. 9, 2015).
Appendix E—Written Description Support in Ex 2005, Interference No. 106,021 (RES), 259 pages (Jun. 9, 2015).
Appendix F—Diligence Showing, Interference No. 106,021 (RES), 2 pages (Jun. 9, 2015).
Baldwin List of Exhibits, Interference No. 106,021 (RES), 21 pages (Feb. 8, 2016).
EX2001—Donaldson's involved USP 7,674,308 to Krisko, as issued (Served Jun. 10, 2015).
EX2001A—USP 20090241494, US patent publication of Schrage U.S. Appl. No. 12/321,127 (Served Jul. 22, 2015).
EX2002—Filing Receipt and Disclosure of Baldwin involved U.S. Appl. No. 13/042,859 as filed (written abstract, specification, claims, drawings, as originally filed) (Served Jun. 10, 2015).
EX2003—Documents from Image file wrapper, for Donaldson U.S. Appl. No. 10/587,766 to Krisko, that issued into Donaldson's involved patent 7,674,308, including: All documents filed Jul. 28, 2006 (application as filed); Aug. 29, 2009 Filing Receipt; Feb. 3, 2009 Preliminary Amendment; Feb. 3, 2009 Claims; Feb. 3, 2009

(56) References Cited

OTHER PUBLICATIONS

Applicant Arguments/Remarks Made in an Amendment; Jun. 4, 2009 Non-Final Rejection; Jul. 29, 2009 Amendment/Req. Reconsideration-After Non-Final Reject; Jul. 29, 2009 Specification; Jul. 29, 2009 Claims; Jul. 29, 2009 Applicant Arguments/Remarks Made in an Amendment; Oct. 16, 2009 Notice of Allowance and Fees Due (PTOL-85) (Served Jun. 10, 2015).
EX2004—Filing Receipt and Disclosure of Baldwin benefit U.S. Appl. No. 12/556,976 as filed (written abstract, specification, claims, drawings, preliminary amendment, as originally filed), (Served Jun. 10, 2015).
EX2005—Filing Receipt and Disclosure of Baldwin benefit U.S. Appl. No. 11/939,662 as filed (written abstract, specification, claims, drawings, preliminary amendment, as originally filed), (Served Jun. 10, 2015).
EX2006—Transmittal of New Application and Disclosure of Baldwin benefit U.S. Appl. No. 10/979,876 as filed (written abstract, specification, claims, drawings, as originally filed), (Served Jun. 10, 2015).
EX2007—Transmittal of New Application and Disclosure of Baldwin benefit U.S. Appl. No. 10/979,783 as filed (written abstract, specification, claims, drawings, as originally filed), (Served Jun. 10, 2015).
EX2007A—U.S. Pat. No. 7,318,851 to Brown (Served Jun. 10, 2015).
EX2008—Documents from Image file wrapper, for Baldwin's involved U.S. Appl. No. 13/042,859 to Brown, including: All documents filed Mar. 8, 2011 (application as filed); Aug. 14, 2012 Non-Final Rejection; Jan. 10, 2013 Amendment/Req. Reconsideration-After Non-Final Reject; Jan. 10, 2013 Claims; Jan. 10, 2013 Applicant Arguments/Remarks Made in an Amendment; Mar. 11, 2013 Non-Final Rejection; Aug. 12, 2013 Amendment/Req. Reconsideration-After Non-Final Reject; Aug. 12, 2013 Claims; Aug. 12, 2013 Applicant Arguments/Remarks Made in an Amendment; Aug. 29, 2013 Non-Final Rejection; Feb. 28, 2014 Amendment/Req. Reconsideration-After Non-Final Reject; Feb. 28, 2014 Claims; Feb. 28, 2014 Applicant Arguments/Remarks Made in an Amendment; Mar. 18, 2014 Electronic Terminal Disclaimer-Filed; Mar. 31, 2014 Notice of Allowance and Fees Due (PTOL-85); Jul. 17, 2014 Petition for review by the Technology Center SPRE (Served Jun. 10, 2015).
EX2009—U.S. Pat. No. 6,190,432 to Gieseke (Served Jun. 10, 2015).
EX2019—U.S. Pat. No. 6,348,085 to Tokar (Served Jun. 10, 2015).
EX2020—U.S. Pat. No. 4,498,989 to Miyakawa (Served Jun. 10, 2015).
EX2021—WO 91/19898 to Gabrielson (Served Jun. 10, 2015).
EX2022—U.S. Pat. No. 4,373,635 to Mules (Served Jun. 10, 2015).
EX2023—US patent publication 20030146149 to Binder showing holes in the extension (Served Jun. 10, 2015).
EX2024—U.S. Pat. No. 5,820,646 to Gillingham (Served Jun. 10, 2015).
EX2024A—Timely Engineering Associates Memorandum dated Aug. 10, 2004—Filed in Interference 105799 as EX2024 (Served Jun. 10, 2015).
EX2025—U.S. Pat. No. 6,348,084 to Gieseke (Served Jun. 10, 2015).
EX2026—JP60-155921 to Isshi; and English translation of JP60-155921 to Isshi (Served Jun. 10, 2015).
EX2026A—Declaration of Accuracy for English translation of JP60-155921 to Isshi—see EX2026 (Served Jun. 10, 2015).
EX2027—Brown Motion 11—Interference 105,799, *Schrage* v. *Brown* (Served Jun. 10, 2015).
EX2028—WO 97-40918 to Wagner (Served Jun. 10, 2015).
EX2029—Judgment—Interference 105,799, *Schrage* v. *Brown*, entered Jul. 11, 2013 (Served Jun. 10, 2015).
EX2030—Redacted Honeycomb Update (Served Jun. 10, 2015).
EX2031—Newly-Marked up "Concept M" slide (a clean version of that appeared as p. 12 of EX2254 in the 105,799 Interference) (Served Jun. 10, 2015).
EX2032—Newly-Marked up "Concept P" slide (a clean version of that appeared as p. 15 of EX2255 in the 105,799 Interference) (Served Jun. 10, 2015).
EX2033—Newly-Marked up "Concept S" slide (a clean version of that appeared as p. 19 of EX2256 in the 105,799 Interference) (Served Jun. 10, 2015).
EX2034—Newly-Marked up "Concept T" slide (a clean version of that appeared as p. 20 of EX2256 in the 105,799 Interference) (Served Jun. 10, 2015).
EX2035—Newly-Marked up "Concept U" slide (a clean version of that appeared as p. 21 of EX2257 in the 105,799 Interference) (Served Jun. 10, 2015).
EX2036—Definition of "Shell" by Merriam-Webster; http://www.merriam-webster.com/dictionary/shell (Served Jun. 10, 2015).
EX2037—What Is Urethane Foam? http://www.wisegeek.org/what-isurethane-foam.htm (Served Jun. 10, 2015).
EX2038—Steve Merritt Declaration Jun. 9, 2015 (Served Jun. 10, 2015).
EX2039—Declaration of Stan Johnston (Served Jun. 10, 2015).
EX2040—Newly-Marked up "Concept C" slide (a clean version of that appeared as p. 3 of EX2254 in the 105,799 Interference) (Served Jun. 10, 2015).
EX2041—MPEP 608.02 Drawing Symbols (Served Jun. 10, 2015).
EX2042—MPEP 2144.04 (Served Jun. 10, 2015).
EX2051—US patent publication 20020185008 to Anderson (Served Jun. 10, 2015).
EX2089—Redacted version of Conception Document (Option 9)—Filed in Interference 105799 as EX2089 (Served Jun. 10, 2015).
EX2090—AL111748B close-up of stripped corner, posts exposed (Served Jul. 22, 2015).
EX2091—U.S. Pat. No. 5,902,364 to Tokar, seal height (Served Jul. 22, 2015).
EX2092—Deere TM4523 (Aug. 3, 1997) manual excerpt, showing filter (Served Jul. 22, 2015).
EX2093—Transcript of Aug. 19, 2011 deposition of Eric Sandberg, signature page appended (Served Jul. 22, 2015).
EX2094—Picture of label and packing bag enclosing new AL111748 filter (Served Jul. 22, 2015).
EX2095—Brown Steve Merritt Unnumbered Declaration in Response to Objections to Evidence Served on Brown Sep. 7, 2011 (Served Jul. 22, 2015).
EX2096—Brown Bruce Margulies Unnumbered Declaration in Response to Objections to Evidence Served on Brown on Sep. 7, 2011 (Served Jul. 22, 2015).
EX2097—Brown Sep. 16, 2011 Email Requesting Clarification of Sep. 7, 2011 Objections (Served Jul. 22, 2015).
EX2098—Brown's seventh declaration of Steve Merritt in support of Opposition 1 (Served Jul. 22, 2015).
EX2136—*Mitchell* v. *Holt*, Interference 105746, paper 352 (BPAI Apr. 27, 2012) (Served Oct. 18, 2015).
EX2137—Jan. 10, 2003 MEMO, to Norm Johnson (ML)—Filed in Interference 105799 as EX2137 (Served Jun. 10, 2015).
EX2138—Jan. 31, 2003 MEMO, to Norm Johnson (ML)—Filed in Interference 105799 as EX2138 (Served Jun. 10, 2015).
EX2139—Feb. 7, 2003 MEMO, to Norm Johnson (ML)—Filed in Interference 105799 as EX2139 (Served Jun. 10, 2015).
EX2140—Mar. 7, 2003 MEMO, to Norm Johnson (ML)—Filed in Interference 105799 as EX2140 (Served Jun. 10, 2015).
EX2141—Mar. 14, 2003 MEMO, to Norm Johnson (ML)—Filed in Interference 105799 as EX2141 (Served Jun. 10, 2015).
EX2142—Mar. 21, 2003 MEMO, to Norm Johnson (ML)—Filed in Interference 105799 as EX2142 (Served Jun. 10, 2015).
EX2143—Mar. 28, 2003 MEMO, to Norm Johnson (ML)—Filed in Interference 105799 as EX2143 (Served Jun. 10, 2015).
EX2144—Apr. 4, 2003 MEMO, to Norm Johnson (ML)—Filed in Interference 105799 as EX2144 (Served Jun. 10, 2015).
EX2145—Apr. 18, 2003 MEMO, to Norm Johnson (ML)—Filed in Interference 105799 as EX2145 (Served Jun. 10, 2015).
EX2146—May 2, 2003 MEMO, to Norm Johnson (ML)—Filed in Interference 105799 as EX2146 (Served Jun. 10, 2015).

(56) References Cited

OTHER PUBLICATIONS

EX2147—Marked up copy of Ex 2089, showing numbers for counts 2-3 language—Filed in Interference 105799 as EX2147 (Served Jun. 10, 2015).
EX2148—May 12, 2003 Brown 13 page power point (GB, SM)—Filed in Interference 105799 as EX2148 (Served Jun. 10, 2015).
EX2149—May 23, 2003 MEMO, to Norm Johnson (ML)—Filed in Interference 105799 as EX2149 (Served Jun. 10, 2015).
EX2150—Channel Flow Concept Ideas TOC (AH)—Filed in Interference 105799 as EX2150 (Served Jun. 10, 2015).
EX2151—Channel Flow Concept Ideas Tab 36 (AH)—Filed in Interference 105799 as EX2151 (Served Jun. 10, 2015).
EX2152—MEMO, to Norm Johnson (ML)—Filed in Interference 105799 as EX2152 (Served Jun. 10, 2015).
EX2153—Jun. 13, 2013 MEMO, to Norm Johnson (ML)—Filed in Interference 105799 as EX2153 (Served Jun. 10, 2015).
EX2154—Jun. 20, 2013 MEMO, to Norm Johnson (ML)—Filed in Interference 105799 as EX2154 (Served Jun. 10, 2015).
EX2155—Jun. 27, 2013 MEMO, to Norm Johnson (ML)—Filed in 105799 as EX2155 (Served Jun. 10, 2015).
EX2156—Jul. 3, 2003 MEMO, to Norm Johnson (ML)—Filed in Interference 105799 as EX2156 (Served Jun. 10, 2015).
EX2157—Jul. 18, 2003 MEMO, to Norm Johnson (ML)—Filed in Interference 105799 as EX2157 (Served Jun. 10, 2015).
EX2158—Aug. 1, 2003 MEMO, to Norm Johnson (ML)—Filed in Interference 105799 as EX2158 (Served Jun. 10, 2015).
EX2159—Aug. 8, 2003 MEMO, to Norm Johnson (ML)—Filed in Interference 105799 as EX2159 (Served Jun. 10, 2015).
EX2160—Aug. 15, 2003 MEMO, to Norm Johnson (ML)—Filed in Interference 105799 as EX2160 (Served Jun. 10, 2015).
EX2161—Aug. 22, 2003 MEMO, to Norm Johnson (ML)—Filed inInterferencee 105799 as EX2161 (Served Jun. 10, 2015).
EX2162—Aug. 29, 2003 MEMO, to Norm Johnson (ML)—Filed in Interference 105799 as EX2162 (Served Jun. 10, 2015).
EX2163—Sep. 5, 2003 MEMO, to Norm Johnson (ML)—Filed in Interference 105799 as EX2163 (Served Jun. 10, 2015).
EX2164—Sep. 26, 2003 MEMO, to Norm Johnson (ML)—Filed in Interference 105799 as EX2164 (Served Jun. 10, 2015).
EX2165—Oct. 24, 2003 MEMO, to Norm Johnson (ML)—Filed in Interference 105799 as EX2165 (Served Jun. 10, 2015).
EX2166—Oct. 31, 2003 MEMO, to Norm Johnson (ML)—Filed in Interference 105799 as EX2166 (Served Jun. 10, 2015).
EX2167—Nov. 7, 2003 MEMO, to Norm Johnson (ML)—Filed in Interference 105799 as EX2167 (Served Jun. 10, 2015).
EX2168—Nov. 21, 2003 MEMO, to Norm Johnson (ML)—Filed in Interference 105799 as EX2168 (Served Jun. 10, 2015).
EX2169—Nov. 26, 2003 MEMO, to Norm Johnson (ML)—Filed in Interference 105799 as EX2169 (Served Jun. 10, 2015).
EX2170—Dec. 19, 2003 MEMO, to Norm Johnson (ML)—Filed in Interference 105799 as EX2170 (Served Jun. 10, 2015).
EX2171—Jan. 16, 2004 MEMO, to Norm Johnson (ML)—Filed in Interference 105799 as EX2171 (Served Jun. 10, 2015).
EX2172—Jan. 23, 2004 MEMO, to Norm Johnson (ML)—Filed in Interference 105799 as EX2172 (Served Jun. 10, 2015).
EX2173—Jan. 30, 2004 MEMO, to Norm Johnson (ML)—Filed in Interference 105799 as EX2173 (Served Jun. 10, 2015).
EX2174—Feb. 6, 2004 MEMO, to Norm Johnson (ML)—Filed in Interference 105799 as EX2174 (Served Jun. 10, 2015).
EX2175—Feb. 20, 2004 MEMO, to Norm Johnson (ML)—Filed in Interference 105799 as EX2175 (Served Jun. 10, 2015).
EX2176—Feb. 27, 2004 MEMO, to Norm Johnson (ML)—Filed in Interference 105799 as EX2176 (Served Jun. 10, 2015).
EX2177—Mar. 19, 2004 MEMO, to Norm Johnson (ML)—Filed in Interference 105799 as EX2177 (Served Jun. 10, 2015).
EX2178—Mar. 26, 2004 MEMO, to Norm Johnson (ML)—Filed in Interference 105799 as EX2178 (Served Jun. 10, 2015).
EX2179—Apr. 2, 2004 MEMO, to Norm Johnson (ML)—Filed in Interference 105799 as EX2179 (Served Jun. 10, 2015).
EX2180—Apr. 9, 2004 MEMO, to Norm Johnson (ML)—Filed in Interference 105799 as EX2180 (Served Jun. 10, 2015).
EX2181—Apr. 16, 2004 MEMO, to Norm Johnson (ML)—Filed in Interference 105799 as EX2181 (Served Jun. 10, 2015).
EX2182—Feb. 13, 2004 MEMO, to Norm Johnson (ML)—Filed in Interference 105799 as EX2182 (Served Jun. 10, 2015).
EX2183—Mar. 5, 2004 MEMO, to Norm Johnson (ML)—Filed in Interference 105799 as EX2183 (Served Jun. 10, 2015).
EX2184—Apr. 23, 2004 MEMO, to Norm Johnson (ML)—Filed in Interference 105799 as EX2184 (Served Jun. 10, 2015).
EX2185—May 7, 2007 MEMO, to Norm Johnson (ML)—Filed in Interference 105799 as EX2185 (Served Jun. 10, 2015).
EX2186—May 14, 2004 MEMO, to Norm Johnson (ML)—Filed in Interference 105799 as EX2186 (Served Jun. 10, 2015).
EX2187—May 21, 2004 MEMO, to Norm Johnson (ML)—Filed in Interference 105799 as EX2187 (Served Jun. 10, 2015).
EX2188—Emails between counsel regarding service discrepancy, Ex 1101—Filed in Interference 105799 as EX2188 (Served Jun. 10, 2015).
EX2189—Jun. 4, 2004 MEMO, to Norm Johnson (ML)—Filed in Interference 105799 as EX2189 (Served Jun. 10, 2015).
EX2190—Jun. 25, 2004 MEMO, to Norm Johnson (ML)—Filed in Interference 105799 as EX2190 (Served Jun. 10, 2015).
EX2191—Jul. 2, 2004 MEMO, to Norm Johnson (ML)—Filed in Interference 105799 as EX2191 (Served Jun. 10, 2015).
EX2192—Jul. 9, 2004 MEMO, to Norm Johnson (ML)—Filed in Interference 105799 as EX2192 (Served Jun. 10, 2015).
EX2193—Jul. 16, 2004 MEMO, to Norm Johnson (ML)—Filed in Interference 105799 as EX2193 (Served Jun. 10, 2015).
EX2194—Jul. 23, 2004 MEMO, to Norm Johnson (ML)—Filed in Interference 105799 as EX2194 (Served Jun. 10, 2015).
EX2195—Jul. 30, 2004 MEMO, to Norm Johnson (ML)—Filed in Interference 105799 as EX2195 (Served Jun. 10, 2015).
EX2196—Aug. 6, 2006 MEMO, to Norm Johnson (ML)—Filed in Interference 105799 as EX2196 (Served Jun. 10, 2015).
EX2197—Aug. 13, 2004 MEMO, to Norm Johnson (ML)—Filed in Interference 105799 as EX2197 (Served Jun. 10, 2015).
EX2198—Aug. 20, 2004 MEMO, to Norm Johnson (ML)—Filed in Interference 105799 as EX2198 (Served Jun. 10, 2015).
EX2199—Aug. 27, 2004 MEMO, to Norm Johnson (ML)—Filed in Interference 105799 as EX2199 (Served Jun. 10, 2015).
EX2200—Sep. 3, 2004 MEMO, to Norm Johnson (ML)—Filed in Interference 105799 as EX2200 (Served Jun. 10, 2015).
EX2201—Sep. 10, 2004 MEMO, to Norm Johnson (ML)—Filed in Interference 105799 as EX2201 (Served Jun. 10, 2015).
EX2202—Sep. 17, 2004 MEMO, to Norm Johnson (ML)—Filed in Interference 105799 as EX2202 (Served Jun. 10, 2015).
EX2203—Sep. 24, 2004 MEMO, to Norm Johnson (ML)—Filed in Interference 105799 as EX2203 (Served Jun. 10, 2015).
EX2204—Oct. 1, 2004 MEMO, to Norm Johnson (ML)—Filed in Interference 105799 as EX2204 (Served Jun. 10, 2015).
EX2205—Oct. 8, 2004 MEMO, to Norm Johnson (ML)—Filed in Interference 105799 as EX2205 (Served Jun. 10, 2015).
EX2206—Oct. 22, 2004 MEMO, to Norm Johnson (ML)—Filed in Interference 105799 as EX2206 (Served Jun. 10, 2015).
EX2207—Oct. 29, 2004 MEMO, to Norm Johnson (ML)—Filed in Interference 105799 as EX2207 (Served Jun. 10, 2015).
EX2208—Nov. 5, 2004 MEMO, to Norm Johnson (ML)—Filed in Interference 105799 as EX2208 (Served Jun. 10, 2015).
EX2209—Nov. 12, 2004 MEMO, to Norm Johnson (ML)—Filed in Interference 105799 as EX2209 (Served Jun. 10, 2015).
EX2210—Jul. 17, 2003 MEMO, Ken Stirn to Distribution (ML)—Filed in Interference 105799 as EX2210 (Served Jun. 10, 2015).
EX2211—Jul. 21, 2003 MEMO, PWC Weekly update (ML)—Filed in Interference 105799 as EX2211 (Served Jun. 10, 2015).
EX2212—Jul. 29, 2003 MEMO, PWC Weekly update (ML)—Filed in Interference 105799 as EX2212 (Served Jun. 10, 2015).
EX2213—Aug. 4, 2003 MEMO, PWC Weekly update (ML)—Filed in Interference 105799 as EX2213 (Served Jun. 10, 2015).
EX2214—Aug. 11, 2003 MEMO, PWC Weekly update (ML)—Filed in Interference 105799 as EX2214 (Served Jun. 10, 2015).
EX2215—Aug. 15, 2003 MEMO, PWC Weekly update (ML)—Filed in Interference 105799 as EX2215 (Served Jun. 10, 2015).
EX2216—Aug. 25, 2003 MEMO, PWC Weekly update (ML)—Filed in Interference 105799 as EX2216 (Served Jun. 10, 2015).

(56) References Cited

OTHER PUBLICATIONS

EX2217—Sep. 22, 2003 MEMO, PWC Weekly update (ML)—Filed in Interference 105799 as EX2217 (Served Jun. 10, 2015).
EX2218—Sep. 29, 203 MEMO, PWC Weekly update (ML)—Filed in Interference 105799 as EX2218 (Served Jun. 10, 2015).
EX2219—Oct. 3, 2003 MEMO, PWC Weekly update (ML)—Filed in Interference 105799 as EX2219 (Served Jun. 10, 2015).
EX2220—Oct. 10, 2003 MEMO, PWC Weekly update (ML)—Filed in Interference 105799 as EX2220 (Served Jun. 10, 2015).
EX2221—Oct. 20, 2003 MEMO, PWC Weekly update (ML)—Filed in Interference 105799 as EX2221 (Served Jun. 10, 2015).
EX2222—Oct. 27, 2003 MEMO, PWC Weekly update (ML)—Filed in Interference 105799 as EX2222 (Served Jun. 10, 2015).
EX2223—Nov. 3. 2003 MEMO, PWC Weekly update (ML)—Filed in Interference 105799 as EX2223 (Served Jun. 10, 2015).
EX2224—Nov. 10, 2003 MEMO, PWC Weekly update (ML)—Filed in Interference 105799 as EX2224 (Served Jun. 10, 2015).
EX2225—Nov. 17, 2003 MEMO, PWC Weekly update (ML)—Filed in Interference 105799 as EX2225 (Served Jun. 10, 2015).
EX2226—Dec. 5, 2003 MEMO, PWC Weekly update (ML)—Filed in Interference 105799 as EX2226 (Served Jun. 10, 2015).
EX2227—Dec. 15, 2003 MEMO, PWC Weekly update (ML)—Filed in Interference 105799 as EX2227 (Served Jun. 10, 2015).
EX2228—Dec. 22, 2003 MEMO, PWC Weekly update (ML)—Filed in Interference 105799 as EX2228 (Served Jun. 10, 2015).
EX2229—Jan. 12, 2004 MEMO, CWC Weekly update (ML)—Filed in Interference 105799 as EX2229 (Served Jun. 10, 2015).
EX2230—Jan. 19, 2004 MEMO, CWC Weekly update (ML)—Filed in Interference 105799 as EX2230 (Served Jun. 10, 2015).
EX2231—Feb. 2, 2004 MEMO, CWC Weekly update (ML)—Filed in Interference 105799 as EX2231 (Served Jun. 10, 2015).
EX2232—Feb. 9, 2004 MEMO, CWC Weekly update (ML)—Filed in Interference 105799 as EX2232 (Served Jun. 10, 2015).
EX2233—Feb. 16, 2004 MEMO, CWC Weekly update (ML)—Filed in Interference 105799 as EX2233 (Served Jun. 10, 2015).
EX2234—Feb. 23, 2004 MEMO, CWC Weekly update (ML)—Filed in Interference 105799 as EX2234 (Served Jun. 10, 2015).
EX2235—Mar. 1, 2004 MEMO, CWC Weekly update (ML)—Filed in Interference 105799 as EX2235 (Served Jun. 10, 2015).
EX2236—Mar. 8, 2004 MEMO, CWC Weekly update (ML)—Filed in Interference 105799 as EX2236 (Served Jun. 10, 2015).
EX2237—Mar. 15, 2004 MEMO, CWC Weekly update (ML)—Filed in Interference 105799 as EX2237 (Served Jun. 10, 2015).
EX2238—Mar. 22, 2004 MEMO, CWC Weekly update (ML)—Filed in Interference 105799 as EX2238 (Served Jun. 10, 2015).
EX2239—Mar. 29, 2004 MEMO, CWC Weekly update (ML)—Filed in Interference 105799 as EX2239 (Served Jun. 10, 2015).
EX2240—Apr. 5, 2004 MEMO, CWC Weekly update (ML)—Filed in Interference 105799 as EX2240 (Served Jun. 10, 2015).
EX2241—Apr. 12, 2004 MEMO, CWC Weekly update (ML)—Filed in Interference 105799 as EX2241 (Served Jun. 10, 2015).
EX2242—Apr. 19, 2004 MEMO, CWC Weekly update (ML)—Filed in Interference 105799 as EX2242 (Served Jun. 10, 2015).
EX2243—Apr. 23, 2004 MEMO, CWC Weekly update (ML)—Filed in Interference 105799 as EX2243 (Served Jun. 10, 2015).
EX2244—Apr. 23, 2004 MEMO, CWC Weekly update (ML)—Filed in Interference 105799 as EX2244 (Served Jun. 10, 2015).
EX2245—Michaela Lewis PC Screen Shots of 2003 and 2004 Weekly folders—Filed in Interference 105799 as EX2245 (Served Jun. 10, 2015).
EX2246—Michaela Lewis PC Screen Shots of 2003 PWC and 2004 CWC folders—Filed in Interference 105799 as EX2246 (Served Jun. 10, 2015).
EX2247—Michaela Lewis Channel Flow folder file named "Channel Flow Design Review 070704.ppt"; Windows date modified Jul. 15, 2004 (ML)—Filed in Interference 105799 as EX2247 (Served Jun. 10, 2015).
EX2248—2003-2004, Channel Flow Concept Ideas Book (AH, CO)—Filed in Interference 105799 as EX2248 (Served Jun. 10, 2015).
EX2249—Brown CD Screen Shot (SM)—Filed in Interference 105799 as EX2249 (Served Jun. 10, 2015).
EX2250—VacationRecords_Gene_Steve_Stan_Al (MP)—Filed in Interference 105799 as EX2250 (Served Jun. 10, 2015).
EX2251—Gasket Designs—030512.ppt, from GeneBrown_CD (SM, GB) (Option 9 conception) (DWC)—Filed in Interference 105799 as EX2251 (Served Jun. 10, 2015).
EX2252—Oslakovic 030804.ppt, from GeneBrown_CD (SM, GB) (DWC)—Filed in Interference 105799 as EX2252 (Served Jun. 10, 2015).
EX2253—Design Requirements 040302.ppt, from GeneBrown_CD (SM, GB) (DWC)—Filed in Interference 105799 as EX2253 (Served Jun. 10, 2015).
EX2254—End Cap-Possibilities 040224.ppt, from GeneBrown_CD (SM, GB) (DWC) (Concept M at 12)—Filed in Interference 105799 as EX2254 (Served Jun. 10, 2015).
EX2255—End Cap-Possibilities 040225.ppt, from GeneBrown_CD (SM, GB) (DWC) (Concept P at 15)—Filed in Interference 105799 as EX2255 (Served Jun. 10, 2015).
EX2256—End Cap-Possibilities 040303.ppt, from GeneGrown_CD (SM, GB) (DWC) (Concepts S and T at 19 and 20)—Filed in Interference 105799 as EX2256 (Served Jun. 10, 2015).
EX2257—End Cap-Possibilities 040304.ppt, from GeneGrown_CD (SM, GB) (DWC) (Concept U at 21)—Filed in Interference 105799 as EX2257 (Served Jun. 10, 2015).
EX2258—Honeycomb-CNH-030428.ppt slide 18 Option 9_Al-Liibbe_File (AL) (Slide 18 is option 9)—Filed in Interference 105799 as EX2258 (Served Jun. 10, 2015).
EX2259—ScreenShot_AlLiibbe_FolderView_ (Honeycomb-CNH-030428.ppt file, Modified May 1, 2003) (AL)—Filed in Interference 105799 as EX2259 (Served Jun. 10, 2015).
EX2260—Declaration of Tom Hamilton—Filed in Interference 105799 as EX2260 (Served Jun. 10, 2015).
EX2261—May 30, 2003 MEMO, Ken Stirn to Distribution (ML)—Filed in Interference 105799 as EX2261 (Served Jun. 10, 2015).
EX2262—Italy—ClarCor UK Travel Request.doc, A1 Libbe Travel Request Form Modified May 28, 2003—Filed in Interference 105799 as EX2262 (Served Jun. 10, 2015) (Served Jun. 10, 2015).
EX2263—ScreenShot_A1Liibbe_FolderView, Italy—ClarCor UK Travel Request.doc, Modified May 28, 2003—Filed in Interference 105799 as EX2263 (Served Jun. 10, 2015).
EX2264—Declaration of Michelle Pearson—Filed in Interference 105799 as EX2264 (Served Jun. 10, 2015).
EX2265—BayOne Sep. 11, 2003 meeting.doc, A1 Liibbe memo, diligence (AL)—Filed in Interference 105799 as EX2265 (Served Jun. 10, 2015).
EX2266—DanArensTestData_ChannelFlowProjects_2003-2004.pdf—Filed in Interference 105799 as EX2266 (Served Jun. 10, 2015).
EX2267—Declaration of Dan Arens—Filed in Interference 105799 as EX2267 (Served Jun. 10, 2015).
EX2268—Declaration of Michaela Lewis—Filed in Interference 105799 as EX2268 (Served Jun. 10, 2015).
EX2269—Channel Flow Material Specs approved Oct. 19, 2004 by Josh Quackenbush (JQ)—Filed in Interference 105799 as EX2269 (Served Jun. 10, 2015).
EX2270—Channel Flow Material Specs approved Oct. 19, 2004 by Kyle Swanson (KS)—Filed in Interference 105799 as EX2270 (Served Jun. 10, 2015).
EX2271—R&DDesignQuote_to_JQ_Dec. 4, 2003 (JQ)—Filed in Interference 105799 as EX2271 (Served Jun. 10, 2015).
EX2272—DistefanoUPSConsignment_to-JQ_Dec. 22, 2003 (JQ)—Filed in Interference 105799 as EX2272 (Served Jun. 10, 2015).
EX2273—DistefanoQuote_to_JQ_Dec. 29, 2003—Filed in Interference 105799 as EX2273 (Served Jun. 10, 2015).
EX2274—BaldwinFiltersPOs_from_JQ Dec. 16, 2003 (JQ)—Filed in Interference 105799 as EX2274 (Served Jun. 10, 2015).
EX2275—MidlandMoldingOrder_From_JQ May 11, 2004 (JQ)—Filed in Interference 105799 as EX2275 (Served Jun. 10, 2015).
EX2276—DistefanoOrder_From_JQ May 12, 2004 (JQ)—Filed in Interference 105799 as EX2276 (Served Jun. 10, 2015).

(56) References Cited

OTHER PUBLICATIONS

EX2277—DMBOrder From JQ Jan. 22, 2004—Filed in Interference 105799 as EX2277 (Served Jun. 10, 2015).
EX2278—UrethaneMoldDrawingandQuoteFromDistefano_JQ (JQ)—Filed in Interference 105799 as EX2278 (Served Jun. 10, 2015).
EX2279—ForecastOrderFrameOutletB_from_JQ Jul. 6, 2004 (JQ)—Filed in Interference 105799 as EX2279 (Served Jun. 10, 2015).
EX2280—ForecastOrderOutletB_from_JQ Jun. 30, 2004 (JQ)—Filed in Interference 105799 as EX2280 (Served Jun. 10, 2015).
EX2281—PurchaseRequisitionMoldsFromForecast_JQ May 24, 2004 (JQ)—Filed in Interference 105799 as EX2281 (Served Jun. 10, 2015).
EX2282—MidlandMoldingQuoteVarious_to_JQ Jul. 6, 2004 (JQ)—From Interference 105799 as EX2282 (Served Jun. 10, 2015).
EX2283—DistefanoMoldOrder from JQ Jul. 6, 2004 (JQ)—Filed in Interference 105799 as EX2283 (Served Jun. 10, 2015).
EX2284—DistefanoMoldOrder_from_JQ Aug. 19, 2004 (JQ)—Filed in Interference 105799 as EX2284 (Served Jun. 10, 2015).
EX2285—DMBFastenersOrder_from_JQ Aug. 5, 2004 (JQ)—Filed in Interference 105799 as EX2285 (Served Jun. 10, 2015).
EX2286—EnduraEmailExchangeReAnodizing_JQ Aug. 19, 2004 (JQ)—Filed in Interference 105799 as EX2286 (Served Jun. 10, 2015).
EX2287—PurchaseRequisitionMoldCoatingFromEndura_JQ Aug. 16, 2004 (JQ)—Filed in Interference 105799 as EX2287 (Served Jun. 10, 2015).
EX2288—MidlandOrderCA4700MoldParts_from_JQ Sep. 2, 2004 (JQ)—Filed in Interference 105799 as EX2288 (Served Jun. 10, 2015).
EX2289—GT MidwesturethaneQuote_to_SM Sep. 20, 2004 (SM)—Filed in Interference 105799 as EX2289(Served Jun. 10, 2015).
EX2290—RedfieldOrderLabelToolingChannelFlow_from_JQ Oct. 21, 2004 (JQ)—Filed in Interference 105799 as EX2290 (Served Jun. 10, 2015).
EX2291—McMasterOrder_CaulkingGun_from_JQ Sep. 27, 2004 (JQ)—Filed in Interference 105799 as EX2291 (Served Jun. 10, 2015).
EX2292—MidlandQuote_SurfaceTexture_to_JQ Oct. 14, 2004 (JQ)—Filed in Interference 105799 as EX2292 (Served Jun. 10, 2015).
EX2293—MidlandOrder_SurfaceTexture_from_JQ Oct. 19, 2004 (JQ)—Filed in Interference 105799 as EX2293 (Served Jun. 10, 2015).
EX2294—EngineeringDrawing_OutletEndCap_CantedIn_BX02657_JQ Apr. 29, 2004 JQ)—Filed in Interference 105799 as EX2294 (Served Jun. 10, 2015).
EX2295—EngineeringDrawing_FrameRings_BX02524_JQ Mar. 15, 2004 (JQ)—Filed in Interference 105799 as EX2295 (Served Jun. 10, 2015).
EX2296—EngineeringDrawing_Core_BX02622_JQ Mar. 29, 2004 (JQ)—Filed in Interference 105799 as EX2296 (Served Jun. 10, 2015).
EX2297—CapitalProjectRequest_SM Apr. 7, 2004 (SM)—Filed in Interference 105799 as EX2297 (Served Jun. 10, 2015).
EX2298—AlstromMediaOrder_from_KS Jan. 22, 2004 (KS)—Filed in Interference 105799 as EX2298 (Served Jun. 10, 2015).
EX2299—EngineeringDrawing_CA4700FrameInlet_CA4700_JQ Aug. 16, 2004 (JQ)—Filed in Interference 105799 as EX2299 (Served Jun. 10, 2015).
EX2300—EngineeringDrawing_CA4700BaldwinFilters_CA4700_JQ Jul. 22, 2004 (JQ)—Filed in Interference 105799 as EX2300(Served Jun. 10, 2015).
EX2301—EngineeringDrawing_CA4700FrameAssyOutlet_751490_JQ Jul. 22, 2004 (JQ)—Filed in Interference 105799 as EX2301 (Served Jun. 10, 2015).
EX2302—EngineeringDrawing_Wout_SingleFace_149051_JQ Jul. 2004 (JQ)—Filed in Interference 105799 as EX2302 (Served Jun. 10, 2015).
EX2303—EngineeringDrawing_CA4700FrameOutlet_751508_JQ Aug. 16, 2004 (JQ)—Filed in Interference 105799 as EX2303 (Served Jun. 10, 2015).
EX2304—Aug. 25, 2003; sic, Aug. 29, 2003 MEMO, PWC Weekly update (ML)—Filed in Interference 105799 as EX2304 (Served Jun. 10, 2015).
EX2305—EngineeringDrawing_CA4700Mold_751511_JQ Aug. 16, 2004 (JQ)—Filed in Interference 105799 as EX2305 (Served Jun. 10, 2015).
EX2306—EngineeringDrawing_CA4700Core_147677_JQ Aug. 16, 2004 (JQ)—Filed in Interference 105799 as EX2306 (Served Jun. 10, 2015).
EX2307—EngineeringDrawing_CA4700Rhms_147690_JQ Dec. 12, 2003 (JQ)—Filed in Interference 105799 as EX2307 (Served Jun. 10, 2015).
EX2308—EngineeringDrawing_CA4700FrameAsyInlet_528654_JQ Jun. 2, 2004 (JQ)—Filed in Interference 105799 as EX2308 (Served Jun. 10, 2015).
EX2309—EngineeringDrawing_CA4700_FrameInlet_147652_JQ Aug. 16, 2004 (JQ)—Filed in Interference 105799 as EX2309 (Served Jun. 10, 2015).
EX2310—Declaration of Darla Wright-Covert—Filed in Interference 105799 as EX2310 (Served Jun. 10, 2015).
EX2311—Oct. 15, 2004; weekly Items-Engineering-Oct. 15, 2004 (DS)—Filed in Interference 105799 as EX23 (Served Jun. 10, 2015).
EX2312—Declaration of Kyle Swanson—Filed in Interference 105799 as EX2312 (Served Jun. 10, 2015).
EX2313—080112 Matrix Explanation.pdf (DWC)—Filed in Interference 105799 as EX2313 (Served Jun. 10, 2015).
EX2314—080112 NPR 003815.pclf (DWC)—Filed in Interference 105799 as EX2314 (Served Jun. 10, 2015).
EX2315—Declaration of Dan Schulte—Filed in Interference 105799 as EX2315 (Served Jun. 10, 2015).
EX2316—Aug. 7, 2004, "Channel Flow Round Freightliner Radial Seal Trial Run" report (SM)—Filed in Interference 105799 as EX2316 (Served Jun. 10, 2015).
EX2317—Baldwin Filters Catalog Supplement (2006) showing CA4700 (SM)—Filed in Interference 105799 as EX2317 (Served Jun. 10, 2015).
EX2318—Jun. 28, 2004, "Freightliner Channel Flow Design-WW.ppt" (DWC)—Filed in Interference 105799 as EX2318 (Served Jun. 10, 2015).
EX2319—Declaration of Gene Brown—Filed in Interference 105799 as EX2319 (Served Jun. 10, 2015).
EX2320—Patent application correspondence file—Filed in Interference 105799 as EX2320 (Served Jun. 10, 2015).
EX2321—Reinhart CD Image "Channel Flow Concept Ideas" provided by GB—Filed in Interference 105799 as EX2321 (Served Jun. 10, 2015).
EX2322—Declaration of Andrew Heinisch—Filed in Interference 105799 as EX2322 (Served Jun. 10, 2015).
EX2323—File "JDFEAJoeBorgia070804.ppt" (SM)—Filed in Interference 105799 as EX2323 (Served Jun. 10, 2015).
EX2324—File "JDFEAJoeBorgia070804.ppt" Jul. 8, 2004 Date Modified property (SM)—Filed in Interference 105799 as EX2324 (Served Jun. 10, 2015).
EX2325—File "UpdateforMeeting091604.doc" (SM)—Filed in Interference 105799 as EX2325 (Served Jun. 10, 2015).
EX2326—File "UpdateforMeeting091604.doc" Sep. 24, 2004 Date Modified property (SM)—Filed in Interference 105799 as EX2326 (Served Jun. 10, 2015).
EX2327—Declaration of Chuck Oslakovic—Filed in Interference 105799 as EX2327 (Served Jun. 10, 2015).
EX2328—Declaration of Al Liibbe—Filed in Interference 105799 as EX2328 (Served Jun. 10, 2015).
EX2329—Declaration of Steve Merritt—Filed in Interference 105799 as EX2329 (Served Jun. 10, 2015).

(56) References Cited

OTHER PUBLICATIONS

EX2330—Date Modified "Channel Flow Design Review 070704. ppt" (Ex 2247) — Filed in Interference 105799 as EX2330 (Served Jun. 10, 2015).
EX2331—Concept P Ex 2255, p. 15, marked—Filed in Interference 105799 as EX2331 (Served Jun. 10, 2015).
EX2332—Concept S Ex 2256, p. 19, marked—Filed in Interference 105799 as EX2332 (Served Jun. 10, 2015).
EX2333—Concept T Ex 2256, p. 20, marked—Filed in Interference 105799 as EX2333 (Served Jun. 10, 2015).
EX2334—Concept U Ex 2257, p. 21, marked—Filed in Interference 105799 as EX2334 (Served Jun. 10, 2015).
EX2335—Concept M Ex 2254, p. 12, marked—Filed in Interference 105799 as EX2335 (Served Jun. 10, 2015).
EX2336—LeydigBillingRecord, concepts P and U—Filed in Interference 105799 as EX2336 (Served Jun. 10, 2015).
EX2337—USP 6350291 to Gieseke (Served Jul. 22 2015).
EX2338—Paper 326 in Interference 105799, redeclaration (Served Jul. 22 2015).
EX2398—US D396098 to Gillingham (Served Jul. 22 2015).
EX2399—US D450827 to Gieseke (Served Jul. 22 2015).
EX2400—USP No. 6235195 to Tokar (Served Jul. 22 2015).
EX2401—US D437402 to Gieseke (Served Jul. 22 2015).
EX2402—U.S. D450828 to Tokar (Served Jul. 22 2015).
EX2403—Definition of "Arrangement" by Merriam-Webster: http://www.merriam-webster.com/dictionary/arrangement (Served Jul. 22, 2015).
EX2404—OG notice, identification of specific reference inconsistencies (Served Sep. 17, 2015).
EX2405—OA in 12556976 dated Apr. 25, 2013 (Served Sep. 17, 2015).
EX2406—Documents from the IFW of U.S. Appl. No. 10/979,783 (Served Sep. 17, 2015).
EX2407—Documents from the IFW of U.S. Appl. No. 10/979,783 showing Brown is a named inventor (Served Sep. 17, 2015).
EX2408—Definition of "in general," Oxford (Served Sep. 17, 2015).
EX2409—Definition of "air filter" Oxford (Served Sep. 17, 2015).
EX2410—Definition of "cartridge" Merriam Webster (Served Sep. 17, 2015).
EX2411—Definition of "gridwork" Wordnik (Served Sep. 17, 2015).
EX2412—Definition "grid" Collins (Served Sep. 17, 2015).
EX2413—U.S. Pat. No. 8945268 assigned to Donaldson Gridwork 109 (Served Sep. 17, 2015).
EX2414—U.S. Pat. No. 7396376 assigned to Donaldson Gridwork 109 (Served Sep. 17, 2015).
EX2415—Definition of "generally" Oxford (Served Sep. 17, 2015).
EX2416—Definition of "to" Collins (Served Sep. 17, 2015).
EX2417—Definition of "opposite" Collins (Served Sep. 17, 2015).
EX2418—Definition of "parallel" Macmillam (Served Sep. 17, 2015).
EX2419—Definition "grill" Oxford (Served Sep. 17, 2015).
EX2420—Definition "imperforate" Oxford (Served Sep. 17, 2015).
EX2421—U.S. Pat. No. 4,710,297 to Suzuki (Served Sep. 17, 2015).
EX2422—Steve Merritt Declaration Supporting Baldwin Motion 2 for Benefit of Count 1 (Served Sep. 17, 2015).
EX2423—U.S. Pat. No. 6547857 Gieseke (Served Sep. 17, 2015).
EX2424—U.S. Pat. No. 4486201 Noguchi (Served Sep. 17, 2015).
EX2425—Page from IFW for 10587766 showing issued claim 26 was application claim 38 (Served Sep. 17, 2015).
EX2426—U.S. Pat. No. 6,706,087 Gebler (Served Sep. 17, 2015).
EX2427—Notice of Allowability in Brown U.S. Appl. No. 10/979,876 (Served Sep. 17, 2015).
EX2428—U.S. Pat. No. 6,517,598 Anderson (which issued from the application published as 20020185008, Ex 2051) (Served Sep. 17, 2015).
EX2429—Steve Merritt Declaration Supporting Baldwin Motion 5—102-103 Unpatentability of Donaldson Claims (Served Sep. 17, 2015).
EX2430—U.S. Pat. No. 6368374 Tokar (Served Sep. 17, 2015).
EX2431—Issue notification in 11939662 dated Sep. 12, 2012 (Served Sep. 17, 2015).
EX2432—*Louis* v. *Okada* (Served Sep. 17, 2015).
EX2433—Donaldson U.S. Appl. No. 12/321,127, as filed, and Filing Receipt (Served Sep. 17, 2015).
EX2434—Paper 297 in Interference 105799, Decision on Motions (Served Sep. 17, 2015).
EX2435—Schrage clean claims, as filed in interference 105799 (Served Sep. 17, 2015).
EX2436—Steve Merritt Declaration Supporting Baldwin Motion 7 to redefine (Served Sep. 17, 2015).
EX2437—The claims 1-21 in U.S. Appl. No. 10/587,766 presented Jul. 28, 2007 (Served Sep. 17, 2015).
EX2438—Steve Merritt Declaration Supporting Baldwin Motion 3, 135(b) (Served Sep. 17, 2015).
EX2439—Definition of "Impermeable", from Dictionary.com (Served Oct. 18, 2015).
EX2440—Definition of "Pore", from Dictionary.com (Served Oct. 18, 2015).
EX2441—Definition of "Interstice", from Dictionary.com (Served Oct. 18, 2015).
EX2442—U.S. Pat. No. 7059481 Kochert (lifting latch) (Served Oct. 18, 2015).
EX2443—U.S. Pat. No. 5415677 Ager (Suggesting radial seals to repl (Served Oct. 18, 2015).
EX2444—US 20020185007 Xu (Fig. 3, [0027] seal type depends upon housing configuration; same seal may result in axial, radial, or both types) (Served Oct. 18, 2015).
EX2445—Definition, Adhesive, google (Served Oct. 18, 2015).
EX2447—Barkimer, Krisko Figs. 7A, 8, marked by counsel (Served Oct. 18, 2015).
EX2448—Barkimer, Krisko Figs 9B 9C marked by witness (Served Oct. 18, 2015).
EX2449—Barkimer, Krisko Figs. 9, 9A, marked by witness (Served Oct. 18, 2015).
EX2450—Barkimer, hpyo, explaining "Extending" and "At Least Partially" (Served Oct. 18, 2015).
EX2451—Barkimer, hypo, explaining "Extending" and "At Least Partially" (Served Oct. 18, 2015).
EX2452—Barkimr, markup of Ramos fig. 3 (Served Oct. 18, 2015).
EX2453—Barimer, markup of Ramos Fig. 5 (Served Oct. 18, 2015).
EX2454—Barkimer, markup of Krisko Figs. 9B, 9C showing non hollow central blade (Served Oct. 18, 2015).
EX2455—Barkimer, markup of Fig. 8 of Gieseke U.S. Pat. No. 6348084 (Ex 2025) (Served Oct. 18, 2015).
EX2456—Transcript of Oct. 8, 2015 Deposition of Steve Merritt (Served Oct. 18, 2015).
EX2457—Steve Merritt Declaration in support of Baldwin Opposition 2 and 3 (Served Nov. 19, 2015).
EX2458—U.S. Pat. No. 7,323,029 to Engelland (Served Nov. 19, 2015).
EX2459—Steve Merritt Declaration in support of Baldwin Opposition 4 (Served Nov. 19, 2015).
EX2460—Steve Merritt Declaration in support of Baldwin Opposition 6 (102) (Served Nov. 19, 2015).
EX2461—Steve Merritt Declaration in support of Baldwin Opposition 7-8 (102 and 103) (Served Nov. 19, 2015).
EX2462—Steve Merritt Declaration in support of Baldwin Opposition 10 (Indefiniteness) (Served Nov. 19, 2015).
EX2463—US 20150068174 to Krisko (Served Nov. 19, 2015).
EX2464—Steve Merritt Declaration in support of Baldwin Opposition 11 (dedesignate) (Served Nov. 19, 2015).
EX2465—Steve Merritt Declaration in support of Baldwin Replies (Served Dec. 22, 2015).
EX2466—Frazier FAQs page (Served Dec. 5, 2015).
EX2467—Ex 1041 renumbered as Ex 2467, from Merritt deposition on Dec. 3, 2015 (Served Dec. 5, 2015).
EX2468—Steve Merritt Deposition Transcript from Dec. 3, 2015 (Served Dec. 5, 2015).

(56) References Cited

OTHER PUBLICATIONS

EX2469—Fig. 12 of '851 patent, Ex 2007A, Modified (Served Dec. 7, 2015).
EX2470—Fig. 8 of Krisko, Ex 1001, marked up to highlight surface of the seal 28 associated with 28f (Served Dec. 7, 2015).
EX2471—U.S. Pat. No. 6,099,606 to Miller, nodules 86, Fig. 2 (result of free rise) (Served Dec. 7, 2015).
EX2472—U.S. Pat. No. 6,955,701 to Schrage, Fig. 4 element rounded surface 67 (result of free rise) (Served Dec. 7, 2015).
EX2473—U.S. Pat. No. 8,685,301 to Swanson, Fig. 3, surface 166 (result of free rise) (Served Dec. 7, 2015).
EX2474—U.S. Pat. No. 8,673,043 to Merritt, Figs4-7_Seal member 46 (result of free rise) (Served Dec. 7, 2015).
EX2475—U.S. Pat. No. 7,753,982 to Merritt, Fig. 11A, irregular free rise surface 112 (Served Dec. 7, 2015).
EX2476—US US20040194441 Kirsch (stick to Nylon) (Served Dec. 7, 2015).
EX2477—U.S. Pat. No. 6780217 to Palmer (Stick to Nylon) (Served Dec. 7, 2015).
EX2478—Hand sketch, section view of mold, urethane, and seal support (Served Dec. 22, 2015).
EX2479—Barkimer second deposition, Dec. 8, 2015 (Served Dec. 22, 2015).
EX2480—U.S. Pat. No. 7,300,486 to Kirsch (Served Dec. 22, 2015).
EX2481—Definition of Canted, TheFreeDictionary (Served Dec. 22, 2015).
EX2482—Ear and Amendment filed in 10979876 on Sep. 25, 2007 (Served Dec. 22, 2015).
EX2483—P1427-15 Cyclic load test Jul. 29, 2015 (Served Dec. 22, 2015).
EX2484—P1563-15 Cyclic load test Aug. 10, 2015 (Served Dec. 22, 2015).
EX2485—P1654-15 Cyclic load test (Served Dec. 22, 2015).
EX2486—P1715-15 Cyclic load test Aug. 28, 2015 (Served Dec. 22, 2015).
EX2487—P1715-15 Cyclic load test Aug. 28, 2015 (Served Dec. 22, 2015).
EX2488—P0005-05 Jan. 21, 2005 Portable Blower Test (Served Dec. 22, 2015).
EX2490—U.S. Pat. No. 5474337_Donaldson_FreeRise (Served Jan. 12, 2016).
EX2491 U.S. Pat. No. 5,897,676_Donaldson_FreeRise (Served Jan. 12, 2016).
EX2492—U.S. Pat. No. 5,938,804_Donaldson_FreeRise(Served Jan. 12, 2016).
EX2493—U.S. Pat. No. 6,004,366_Donaldson_FreeRise (Served Jan. 12, 2016).
EX2494—U.S. Pat. No. 6,322,602_DonaldsonFreeRise (Served Jan. 12, 2016).
EX2495—U.S. Pat. No. 6,258,145_Donaldson_FreeRise (Served Jan. 12, 2016).
EX2497—U.S. Pat. No. 6,413,289_Donaldson_FreeRise (Served Jan. 12, 2016).
EX2498—U.S. Pat. No. 6,521,009_Donaldson_FreeRise (Served Jan. 12, 2016).
EX2500—U.S. Pat. No. 7,455,707_Donaldson_FreeRise (Served Jan. 12, 2016).
EX2502—U.S. Pat. No. 8,361,181_Donaldson_FreeRise (Served Jan. 12, 2016).
EX2503—U.S. Pat. No. 9,089,804_Donaldson_FreeRise (Served Jan. 12, 2016).
EX2504—U.S. Pat. No. 8,709,119_Donaldson_FreeRise (Served Jan. 12, 2016).
EX2505—U.S. Pat. No. 8,292,983_Donaldson_FreeRise (Served Jan. 12, 2016).
EX2506—US 20090301045 Nelson (Served Jan. 12, 2016).
EX2507—Barkimer deposition, limiting plate mold configuration (Served Jan. 22, 2016).
EX2508—Barkimer third deposition transcript (Served Jan. 22, 2016).
EX2509—Merritt Third Deposition transcript (Served Feb. 4, 2016).
Brown Updated Notice of Related Proceedings, Interference No. 106,021 (RES), 4 pages (Jul. 13, 2015).
Order—Motion Times—37 CFR § 41.104(c), Interference No. 106,021 (RES), 8 pages (Jul. 15, 2015).
Baldwin Request for Rehearing on the Order, Paper 21, Interference No. 106,021 (RES),, 4 pages (Jul. 15, 2015).
Baldwin List of Proposed Motions, Interference No. 106,021 (RES), 17 pages (Jul. 23, 2015).
Donaldson's List of Proposed Motions, Interference No. 106,021 (RES), 6 pages (Jul. 24, 2015).
Order—Authorizing Motions—37 CFR § 41.121, Interference No. 106,021 (RES), 9 pages (Jul. 30, 2015).
Baldwin and Donaldson Stipulated Extension, Interference No. 106,021 (RES), 4 pages (Jul. 30, 2015).
Baldwin Motion 1 Requesting Rehearing on Authorized Motions, Interference No. 106,021 (RES), 4 pages (Aug. 12, 2015).
Order—Authorizing Motions—37 C.F.R. § 41.121 (Corrected), Interference No. 106,021 (RES), 9 pages (Aug. 27, 2015).
Order—Miscellaneous—37 C.F.R. § 41.104(a), Interference No. 106,021 (RES), 3 pages (Sep. 15, 2015).
Baldwin Notice of Service of Exhibits Served Sep. 17, 2015, Interference No. 106,021 (RES), 5 pages (Sep. 17, 2015).
Baldwin Notice of Filing a Priority Statement, Interference No. 106,021 (RES), 3 pages (Sep. 17, 2015).
Baldwin Priority Statement, Interference No. 106,021 (RES), 5 pages (Sep. 19, 2015).
Baldwin Motion 2 for Benefit of Count 1, Interference No. 106,021 (RES), 35 pages (Sep. 18, 2015).
Baldwin Motion 3—135(b), Interference No. 106,021 (RES), 23 pages (Sep. 18, 2015).
Baldwin Motion 5—102-103 Unpatentability of Donaldson Claims, Interference No. 106,021 (RES), 34 pages (Sep. 18, 2015).
Baldwin Motion 7 to Redefine, Interference No. 106,021 (RES), 45 pages (Sep. 18, 2015).
Donaldson's Motion 11, Interference No. 106,021 (RES), 23 pages (Sep. 18, 2015).
Donaldson's Motion 4, Interference No. 106,021 (RES), 14 pages (Sep. 18, 2015).
Donaldson's Motion 10, Interference No. 106,021 (RES), 20 pages (Sep. 18, 2015).
Donaldson's Motion 6, Interference No. 106,021 (RES), 22 pages (Sep. 18, 2015).
Donaldson's Motions 2 and 3, Interference No. 106,021 (RES), 13 pages (Sep. 18, 2015).
Donaldson's Motions 7 and 8, Interference No. 106,021 (RES), 39 pages (Sep. 18, 2015).
Donaldson Priority Statement, Interference No. 106,021 (RES), 8 pages (Sep. 18, 2015).
Donaldson List of Exhibits, Interference No. 106,021 (RES), 5 pages (Dec. 23, 2015).
EX1001—Donaldson U.S. Pat. No. 7,674,308 (Filed Sep. 18, 2015).
EX1002—File History of U.S. Pat. No. 7,674,308 (excluding references) (Filed Sep. 18, 2015).
EX1003—WO 2005/094655 A2 (published PCT/US2005/009813) (Filed Sep. 18, 2015).
EX1004—U.S. Appl. No. 60/556,133, filed Sep. 18, 2015.
EX1005—Oxford dictionary definition "impermeable" (Filed Sep. 18, 2015).
EX1006—Merriam-Webster definition "impermeable" (Filed Sep. 18, 2015).
EX1007—Oxford dictionary definition "permeable" (Filed Sep. 18, 2015).
EX1008—Merriam-Webster definition "permeable" (Filed Sep. 18, 2015).
EX1009—Oxford dictionary definition "at least" (Filed Sep. 18, 2015).
EX1010—Merriam-Webster definition "partially" (Filed Sep. 18, 2015).

(56) References Cited

OTHER PUBLICATIONS

EX1011—Oxford dictionary definition "imperforate" (Filed Sep. 18, 2015).
EX1012—Oxford dictionary definition "perforate" (Filed Sep. 18, 2015).
EX1013—Expert Declaration of Tom Barkimer (Filed Sep. 18, 2015).
EX1014—US Publication No. 2008/0016832 to Krisko (Filed Sep. 18, 2015).
EX1015—U.S. Pat. No. 6,179,890 to Ramos (Filed Sep. 18, 2015).
EX1016—US Publication No. 2003/0146149 to Binder (Filed Sep. 18, 2015).
EX1017—U.S. Pat. No. 6,517,598 to Anderson (Filed Sep. 18, 2015).
EX1018—U.S. Pat. No. 6,190,432 to Gieseke (Filed Sep. 18, 2015).
EX1019—U.S. Pat. No. 6,350,291 to Gieseke (Filed Sep. 18, 2015).
EX1020—WO 2003/084641 A2 to Krisko et al. (Filed Sep. 18, 2015).
EX1021—Brief CV of Tom Barkimer (Filed Sep. 18, 2015).
EX1023—Oblique definition (Oxford University Press 2015) (Filed Nov. 20, 2015).
EX1024—Canted definition (Oxford University Press 2015) (Filed Nov. 20, 2015).
EX1025—Table w/two figures (Fig. 9 of '308 patent and Fig. 1 of 783 application (Filed Nov. 20, 2015).
EX1026—Fig. 3 of U.S. Pat. No. 4,498,989 (Filed Nov. 20, 2015).
EX1027—Fig 8 of the '308 Patent with Merritt annotations in red (Filed Nov. 20, 2015).
EX1031—WO 2010/017407 A1 (Filed Nov. 20, 2015).
EX1032—U.S. Pat. No. 6,368,374 (Filed Nov. 20, 2015).
EX1033—Jul. 25, 2007 Amendment in U.S. Appl. No. 10/979,876, filed Nov. 20, 2015.
EX1034—U.S. Pat. No. 6,966,940 (Filed Nov. 20, 2015).
EX1035—Barkimer Transcript CT (Filed Nov. 20, 2015).
EX1036—Barkimer Transcript Full (Filed Nov. 20, 2015).
EX1037—Second Declaration from Mr. Barkimer (Filed Nov. 20, 2015).
EX1038—Merritt drawing depicting two arcs and a convoluted line between the two arcs, Z media, annotated (Filed Dec. 26, 2015).
EX1039—Merritt drawing depicting cross-section of single-faced media (Filed Dec. 26, 2015).
EX1040—Photograph of a bridge (Filed Dec. 26, 2015).
EX1041—Unused.
EX1042—Merritt annotations in red on figure 23 of U.S. Pat. No. 7,323,029 (Filed Dec. 26, 2015).
EX1043—Compilation of 11 photographs of physical racetrack-shaped air filter exhibit from interference 105,799 (Filed Dec. 26, 2015).
EX1044—Barkimer second deposition exhibit (Filed Dec. 26, 2015).
EX1045—Portion definition (Dictionary.com) (Filed Dec. 26, 2015).
EX1046—Merriam-Webster definition "shape" 1047 Third (Filed Dec. 26, 2015).
EX1047—Third Barkimer Declaration (Filed Dec. 26, 2015).
Notice of Service of Baldwin's Priority Statement, Interference No. 106,021 (RES), 1 page (Sep. 19, 2015).
Donaldson's Notice of Filing a Preliminary Statement (Corrected), Interference No. 106,021 (RES), 3 page (Sep. 19, 2015).
Donaldson's Notice of Filing a Preliminary Statement, Interference No. 106,021 (RES), 3 pages (Sep. 19, 2015).
Donaldson's Service of Preliminary Statement, Interference No. 106,021 (RES), 3 pages (Sep. 21, 2015).
Baldwin Notice of Deposition of Tom Barkimer, Interference No. 106,021 (RES), 3 pages (Sep. 28, 2015).
Donaldson's Notice of Deposition of Steve Merritt, Interference No. 106,021 (RES), 3 pages (Oct. 5, 2015).
Donaldson's Notice RE TP3 and TP4, Interference No. 106,021 (RES), 4 pages (Oct. 28, 2015).
Baldwin Opposition 2 and 3, Interference No. 106,021 (RES), 21 pages (Nov. 19, 2015).
Baldwin Opposition 4 (135(b)), Interference No. 106,021 (RES), 15 pages (Nov. 19, 2015).
Baldwin Opposition 6 (102(b)), Interference No. 106,021 (RES), 12 pages (Nov. 19, 2015).
Baldwin Opposition 7-8 (102 and 103), Interference No. 106,021 (RES), 27 pages (Nov. 19, 2015).
Baldwin Opposition 10 (Claim 1 Indefiniteness), Interference No. 106,021 (RES), 11 pages (Nov. 19, 2015).
Baldwin Opposition 11 (Dedesignate claims), Interference No. 106,021 (RES), 13 pages (Nov. 19, 2015).
Donaldson's Opposition 2, Interference No. 106,021 (RES), 11 pages (Nov. 20, 2015).
Donaldson's Opposition 3, Interference No. 106,021 (RES), 28 pages (Nov. 20, 2015).
Donaldson's Opposition 5, Interference No. 106,021 (RES), 29 pages (Nov. 20, 2015).
Donaldson's Opposition 7, Interference No. 106,021 (RES), 17 pages (Nov. 20, 2015).
Baldwin Notice of Deposition of Tom Barkimer, Interference No. 106,021 (RES), 4 pages (Dec. 3, 2015).
Baldwin Notice of Service of Exhibits Served Dec. 5, 2015, Interference No. 106,021 (RES), 3 pages (Dec. 5, 2015).
Baldwin Certificate of Service of Exhibits Dec. 7, 2015, Interference No. 106,021 (RES), 4 pages (Dec. 7, 2015).
Baldwin Certificate of Service of Exhibits Dec. 8, 2015, Interference No. 106,021 (RES), 3 pages (Dec. 8, 2015).
Baldwin Certificate of Service of Exhibits Dec. 9, 2015, Interference No. 106,021 (RES), 3 pages (Dec. 9, 2015).
Joint Proposed Stipulated Extension, Interference No. 106,021 (RES), 5 pages (Dec. 15, 2015).
Order—Miscellaneous—37 C.F.R. § 41,104(a), Interference No. 106,021 (RES), 2 pages (Dec. 16, 2015).
Baldwin Reply 2 (Benefit of Count 1), Interference No. 106,021 (RES), 9 pages (Dec. 22, 2015).
Baldwin Reply 3—135(b), Interference No. 106,021 (RES), 18 pages (Dec. 22, 2015).
Baldwin Reply 5—102-103 Unpatentability, Interference No. 106,021 (RES),14 pages (Dec. 22, 2015).
Baldwin Reply 7 to Redefine, Interference No. 106,021 (RES), 16 pages (Dec. 22, 2015).
Order—Miscellaneous—37 CFR § 41.104(a), Interference No. 106,021 (RES), 2 pages (Dec. 22, 2015).
Donaldson's Reply 6, Interference No. 106,021 (RES), 13 pages (Dec. 23, 2015).
Donaldson's Reply 10, Interference No. 106,021 (RES), 14 pages (Dec. 23, 2015).
Donaldson's Reply 4, Interference No. 106,021 (RES), 11 pages (Dec. 23, 2015).
Donaldson's Reply 2 and 3, Interference No. 106,021 (RES), 12 pages (Dec. 23, 2015).
Donaldson's Reply 11, Interference No. 106,021 (RES), 8 pages (Dec. 23, 2015).
Donaldson's Replies 7 and 8, Interference No. 106,021 (RES), 18 pages (Dec. 23, 2015).
Baldwin Notice of Deposition of Tom Barkimer, Interference No. 106,021 (RES), 3 pages (Dec. 25, 2015).
Donaldson's Notice of Deposition of Steve Merritt, Interference No. 106,021 (RES), 3 pages (Jan. 19, 2016).
Order—Miscellaneous—37 CFR § 41.104(a), Interference No. 106,021 (RES), 2 pages (Feb. 3, 2016).
Baldwin Request for Oral Argument, Interference No. 106,021 (RES), 3 pages (Feb. 8, 2016).
Baldwin Notice of Change of Postal Service Address, Interference No. 106,021 (RES), 3 pages (Feb. 8, 2016).
Donaldson's Request for Oral Argument, Interference No. 106,021 (RES), 3 pages (Feb. 11, 2016).
Decision on Motions, Interference No. 105,799, 51 pages (Mar. 23, 2012).
Decision on Motions, Interference No. 105,799, 59 pages (Jul. 11, 2013).

(56) References Cited

OTHER PUBLICATIONS

Complaint for Review of Patent Interference Decision, Civil Action No. 13-cv-3095, 13 pages (Nov. 12, 2013).
Order Dismissing Case, Civil No. 13-cv-03095-MJD/JSM, 1 page (Jul. 22, 2014).
Order—Expunging Papers—37 CFR § 41.7(a), Interference No. 106,021 (RES), 6 pages (Feb. 29, 2016).
Baldwin Observations, Interference No. 106,021 (RES), 9 pages (Feb. 29, 2016).
Donaldson's Observations on Cross-Examination, Interference No. 106,021 (RES), 8 pages (Mar. 4, 2016).
Baldwin 37 CFR 41.106(f) Certificate of Service Time Period 8 Filing Mar. 8, 2016, Interference No. 106,021 (RES), 4 pages (Mar. 8, 2016).
Baldwin Response to Donaldson Observations, Interference No. 106,021 (RES), 10 pages (Mar. 10, 2016).
Donaldson's Responses to Baldwin's Observations, Interference No. 106,021 (RES), 9 pages (Mar. 11, 2016).

FILTER ELEMENTS; AIR CLEANER; ASSEMBLY; AND, METHODS

This application is a continuation of U.S. Ser. No. 13/356,205, filed on Jan. 23, 2012. U.S. Ser. No. 13/356,205 is a continuation of U.S. Ser. No. 12/692,114, filed Jan. 22, 2010, which issued as U.S. Pat. No. 8,101,003 on Jan. 24, 2012. U.S. Ser. No. 12/692,114 is a continuation of U.S. Ser. No. 10/587,766, filed 14 May 2007, which issued as U.S. Pat. No. 7,674,308 on Mar. 9, 2010. U.S. Ser. No. 10/587,766 is a National Stage Application of PCT/US2005/009813, filed 23 Mar. 2005, which claims benefit of U.S. Provisional Patent Application Ser. No. 60/556,113, filed Mar. 24, 2004. U.S. Ser. Nos. 13/356,205, 12/692,114, 10/587,766, and 60/556,113 are incorporated herein by reference. To the extent appropriate, a claim of priority is made to each of the applications.

TECHNICAL FIELD

The present disclosure relates to filter constructions for filtering fluids, such as liquids or gases. This particular disclosure concerns: straight through flow filter cartridges; safety filters; assemblies employing such filters; precleaners; and methods for use of, and assembly of, filter cartridges.

BACKGROUND

Straight through flow filters (filter elements or filter cartridges) have been used in various systems for filtering fluids such as gases or liquids. Straight through flow filters typically have an inlet face (or end) and an oppositely disposed outlet face (or end). During filtering, the fluid to be filtered flows in one direction upon entering the filter at the inlet face, and has the same general direction of flow as it exists the outlet face. Typically, a straight through flow filter is installed in a housing, for use. After a period of use, the filter requires servicing, either through cleaning or complete replacement of the filter. A seal is necessary between the filter and a portion of the housing in which the filter is placed in use, to ensure proper filtering of the fluid flow through the arrangement.

Improvements in straight through flow filters, their assembly and their use are desirable.

SUMMARY

According to the present disclosure a filter element or cartridge is provided. The filter element or cartridge in general has a straight through flow construction and comprises z-filter media. The filter element or cartridge includes a seal gasket.

A particular type of air filter cartridge is of concern, to the present disclosure. In general the air filter cartridge comprises: a z-filter media pack; a preform having a portion circumscribing the media pack, the preform including a housing seal support portion; and, a housing seal arrangement. The housing seal arrangement generally includes: a housing seal portion secured to the housing seal support; and, a media pack sealing portion circumscribing the media pack and sealing the preform to the media pack. Preferably the media pack sealing portion is (molded) integral with the housing seal portion. Also, preferably, the housing seal support portion includes a plurality of apertures therethrough; and, the housing seal arrangement includes a seal material extending through the seal apertures to mechanically secure the seal material to the preform.

In a particular form presently disclosed techniques, a coiled z-filter media pack is positioned inside of a preform. The preform includes an outer side wall shell, an end grid in a core secured to the end grid and projecting internally into the z-filter media pack, partway. Construction of this arrangement involves inserting the coiled media pack into the preform, causing the core to push into the media pack. As indicated, the core does not project completely through the media pack, but rather typically and preferably no more than 75% through the axial length of the media pack, usually no more than 60%. An end of the media pack opposite the end into which the core projects, preferably the media pack has no central core. Preferred securing of the media pack to the preform would be as characterized above.

Methods of preparing such filter cartridges are provided.

The features, techniques and principles disclosed can be applied to a variety of filter cartridges for a variety of uses. In the drawings, a system is disclosed utilizing a preferred filter cartridge according to the principles generally characterized above is provided, with the remainder of the system generally according to many of the principles in PCT application of Apr. 3, 2003 (PCT/US 03/10258, claiming priority to U.S. 60/370,438, filed Apr. 4, 2002; 60/426,071, filed Nov. 12, 2003; and U.S. Ser. No. 10/405,432, filed Apr. 2, 2003), the complete disclosures of all four which are incorporated herein by reference.

Herein, a variety of features, arrangements and techniques are provided, that can be incorporated into air cleaner arrangements, to advantage. Selected ones of the techniques features arrangements can be utilized, to advantage. Together, a particularly preferred arrangement is provided. However, it is not a requirement that all filter elements or assemblies must incorporate all advantageous features herein, to obtain benefit and advantage according to the present disclosure. The individual features, techniques and advantages can be selected and be selectively combined, for various alternate arrangements.

BRIEF DESCRIPTION OF THE DRAWINGS

FIG. 6 being taken toward an inlet face.

FIG. 9A being taken toward the end of the preform indicated at reference numeral 61, FIG. 9;

DETAILED DESCRIPTION

A. Overview

The principles herein generally are preferred features for serviceable filter cartridges. The serviceable filter cartridges can be used in a variety of arrangements, typically as primary air filter cartridges for air cleaners. The term "serviceable" in this context, is meant to refer to a filter cartridge which after a period of use is removed and replaced, with respect to the air cleaner. The term "primary" in this context is meant to refer to the filter cartridge on which a majority of dust or other contaminant which passes through filter media in the air cleaner, is loaded.

In general, the features, techniques and principles disclosed herein with respect to filter cartridges can be applied in a variety of assemblies and arrangements. The particular arrangement depicted is a filter cartridge useable, for example, in a two-stage air cleaner, the air cleaner generally being of the type generally described in PCT publication WO 03/08464, referenced above. For this reason, other general features of the air cleaner are described in detail. Further the overall air cleaner is enhanced, by utilization of filter cartridge according to the present preferred configuration.

B. Review of the Assembly of FIGS. 1-4.

In general, the techniques described herein are applicable to fluid cleaners. There are generally two classes of fluid cleaners with which the techniques can be applied, namely liquid cleaners and gas cleaners. The embodiment depicted is specifically of an air cleaner (i.e., a type of gas cleaner), and thus the features will be described in this context. Applicability of the principles and techniques described to liquid cleaners or to cleaners of other gases, will be apparent from the general descriptions.

Figure 1:
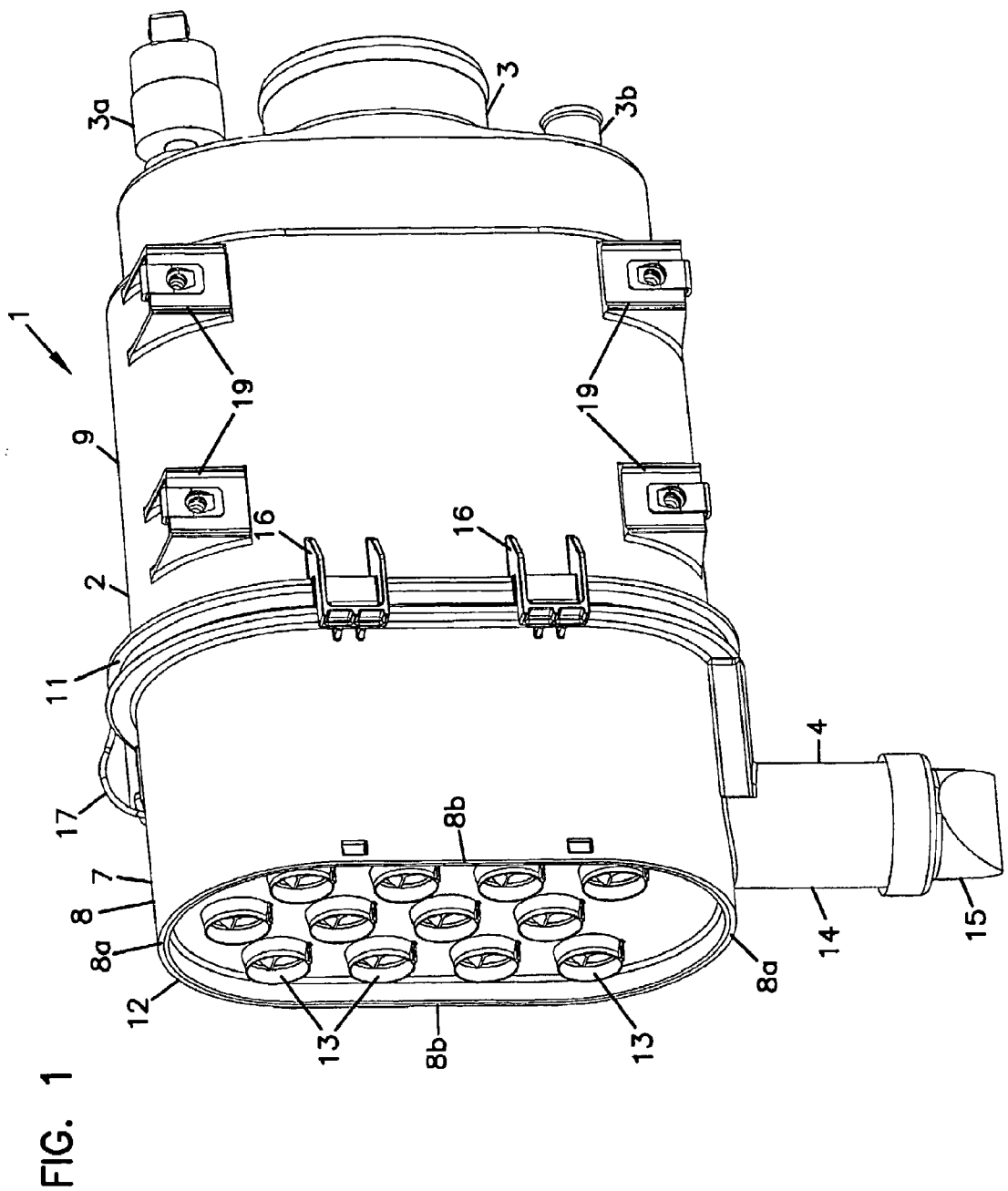
FIG. 1 is a side perspective view of an air cleaner arrangement according to the present disclosure.

Reference numeral 1, FIG. 1, indicates an air cleaner arrangement. The particular air cleaner 1 depicted is a two-stage air cleaner comprising: a housing 2, an outlet flow duct 3, and a dust ejector 4. In general, the air cleaner arrangement 1 also includes, within the housing 2, as described below, a serviceable (primary) filter cartridge (element) and an optional, serviceable safety (or secondary) filter cartridge (element). Herein the term "primary" when used to refer to a filter cartridge or element, is meant to refer to a filter cartridge which conducts majority of the filtering that occurs by passage of air through media within the assembly. In this instance by "filtering" what is meant is removal of particulate material by passage of fluid flow through media. The term "serviceable" in this context is meant to refer to a filter cartridge that is configured to be periodically removed and replaced. (That is, the air cleaner can be serviced by removing one filter cartridge and installing another.) A safety cartridge or secondary cartridge (or element) helps to protect downstream components of the equipment on which the air cleaner assembly 1 is installed, for example in case of failure of the primary filter cartridge or during servicing of the primary filter cartridge.

Herein above, it was stated that the particular air cleaner 1 depicted is a two-stage air cleaner. By this it is meant that there was a precleaner stage present, upstream of the serviceable primary filter cartridge. There is provided equipment that causes a first stage removal of dust or other componentry, prior to the air reaching the primary filter cartridge. The upstream component is generally a precleaner which operates without passage of the air through media, but rather uses a cyclonic or centrifugal approach to dust separation.

Still referring to FIG. 1, in general the air cleaner 1 depicted is a preferred two-stage air cleaner having a cover 7, in this instance a precleaner section 8, and a primary air cleaner section 9. The particular housing 2 depicted is jointed between the cover 7 and the primary air cleaner section 9, at joint or region 11. At housing joint 11, the cover 7 and the primary air cleaner section 9 can be opened or separated, for access to an internally received filter cartridge, for servicing. Herein a step of pivoting, or in some instances even removing, a housing cover 7 relative to the primary filter cartridge containing section 9, will be referred to as a step of obtaining service access to an internally-received filter element component, or alternatively as "opening" the air cleaner 1, for example for servicing.

In general, air to be filtered enters air cleaner assembly 1 at inlet end 12, by passage into individual cyclonic or centrifugal separators 13, in precleaner 8. Separators of the type usable at reference 13 could be conventional, and a variety of types may be used, for example those in U.S. Pat. Nos. 4,242,115 and 4,746,340, both of which are incorporated herein by reference.

The particular precleaner 8 shown can lead to advantages. Within the separators 13, a first stage dust separation or precleaning occurs, and dust separated at this location is ejected from the precleaner 8 through dust ejector 4, in particular through ejector tube 14 and ejector valve 15. Of course, the process conducted in the precleaner 8 is not "filtering" as the term was defined above, since the dust separation in the precleaner results from a centrifugal or cyclonic process, as opposed to a process of passing the fluid through a media. The particular precleaner 8 shown is described in more detail below.

As an alternative, in place of a precleaner that uses a plurality of individual cyclonic or centrifugal separators 13, a precleaner arrangement generally as characterized in U.S. provisional application 60/512,109, filed Oct. 17, 2003, can be used. The complete disclosure of the 60/512,109 application is incorporated herein by reference.

Air that is passed out of the precleaner 8, into the primary air cleaner section 9, is then passed: (a) first through an internally received primary filter cartridge, described in Section C below; and (b) next through (optional) safety element (described in Section D below), and eventually into a clean air region for exiting air cleaner 1 through clean air outlet duct 3. From duct 3, the clean air can be directed to whatever equipment is downstream, for example an engine air intake of an internal combustion engine or a turbocharger.

Figure 2:
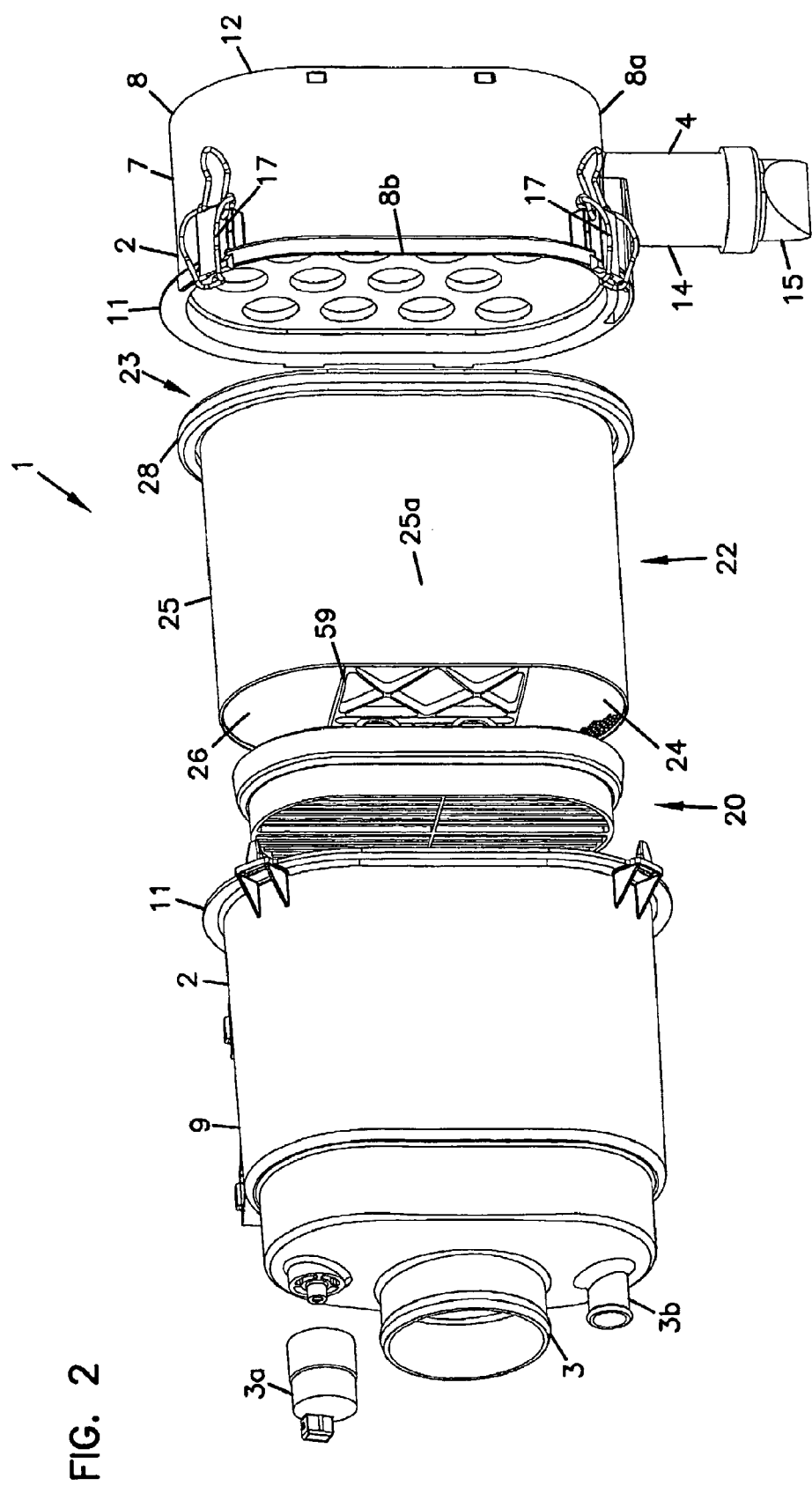
FIG. 2 is an exploded, perspective view of the air cleaner arrangement depicted in FIG. 1, the precleaner, primary filter, and safety filter being viewable.

Referring to FIGS. 1 and 2, in general cover 7 is pivotally secured on primary air cleaner section 9 by supports 16 and over center clamps 17. Once the over center clamps 17 are released, the cover 7 can be opened relative to the primary air cleaner section 9 of housing 2, by pivoting the cover 7 (or precleaner 8) relative to the supports 16. Alternately, the system can be configured for complete separation of the cover 7 during opening. (It is noted that in FIG. 2A, the over center clamps are not shown, but mounts 17a for them are.)

Referring to FIG. 1, the assembly 1 can be mounted on various machinery parts by mounting pads 19, for example using bolts. In general, air cleaner 1 will be mounted with ejector tube 14 and dust ejector 15 directed generally downwardly, to facilitate dust ejection. The mounting pads 19 are shown in an example location. The specific type and location of mounting pads will depend on the equipment to which the air cleaner 1 is to be mounted, and the preference for accomplishing the downward direction of the ejector tube 14 and dust ejector 15. The relative location of the ejector tube 14, around a perimeter of the precleaner 8, is also a function of how the air cleaner 1 is to be mounted in use. The particular location shown, at one of the (opposite) narrower curved ends 8a of the precleaner 8, instead of one of the (opposite) sides 8b is convenient for many assemblies using principles according to the present disclosure.

Still referring to FIG. 1, the air cleaner 1 may include a pressure indicator 3a and a connector 3b adjacent outlet 3, for conventional use. The connector 3b can provide, for example, for filtered air flow to a crank case ventilation system.

Figure 16:
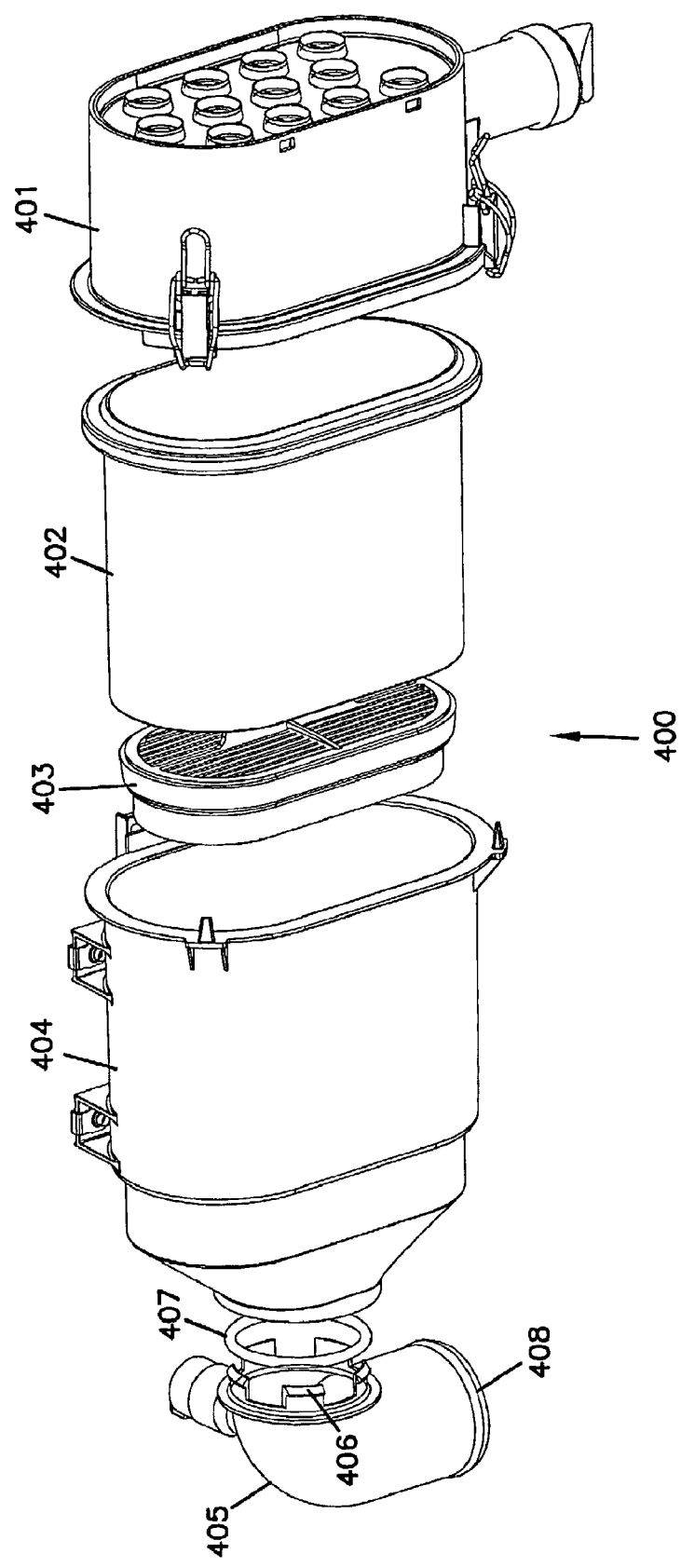
FIG. 16 is an exploded view of a second embodiment.

Referring still to FIG. 1, outlet 3 is a fixed stationary outlet. Alternatives are possible. With respect to this, attention is directed to FIG. 16 in which an exploded view of an alternate embodiment 400 is depicted. Air cleaner 400 comprises precleaner 401, primary filter element 402, optional safety element 403, housing section 404 and outlet 405. The outlet 405 is swivel or pivotal piece, mounted with a snap-fit at 406 and a swivel ring 407. Thus, it can be pivoted on housing 405 for outlet end 408 to be directed in a variety of directions.

The other components 401, 402, 403 and 404, may be analogous to the same components as described in connection with the other figures.

Figure 3:
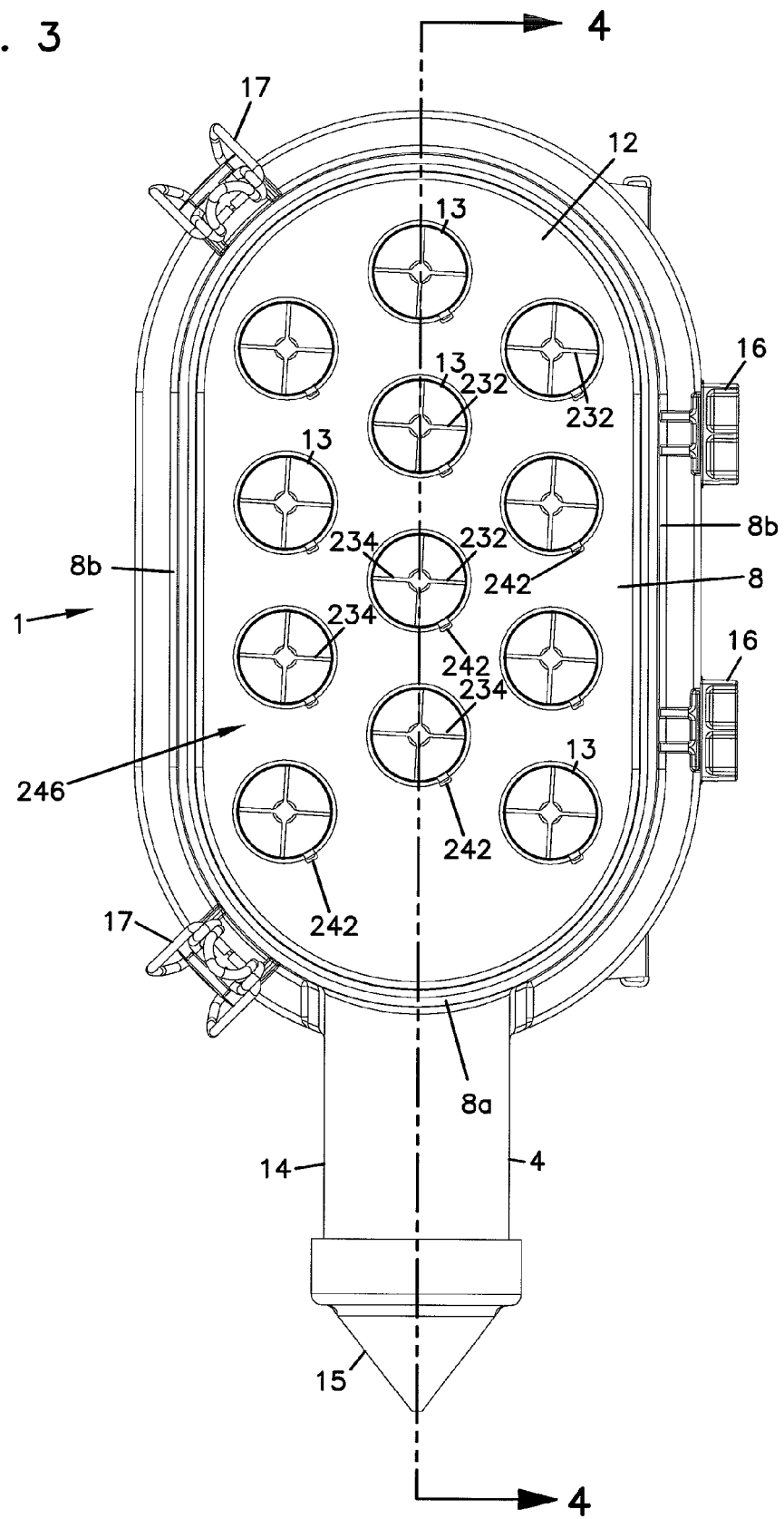
FIG. 3 is an inlet end view of the air cleaner arrangement depicted in FIG. 1.
Figure 4:
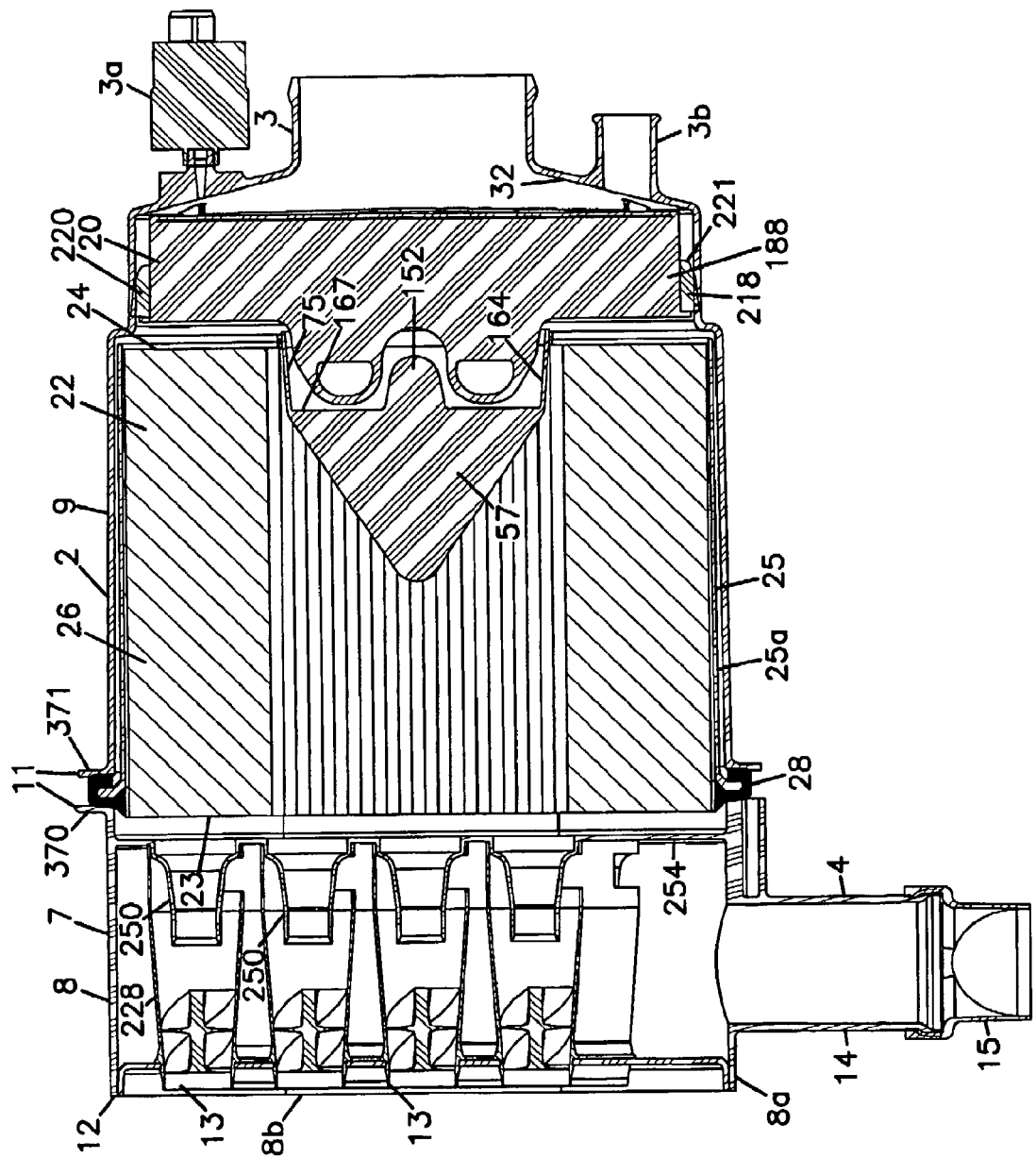
FIG. 4 is a cross-sectional view of the air cleaner arrangement depicted in FIG. 1, the cross-section being taken generally along the line 4-4 of FIG. 3.

Attention is now directed to FIG. 4, which is a fragmentary cross-sectional view of the assembly 1 depicted from the view point of line 4-4, FIG. 3. Referring to FIG. 4, precleaner 8 is shown mounted on primary air cleaner section 9, with internally received primary filter cartridge 22 depicted and with optional internally received safety filter 20 depicted.

C. A Preferred Primary Filter Cartridge.

Referring to FIG. 2, the filter cartridge 22 is configured to permit straight through flow; that is, it has a straight through flow construction. By the term "straight through flow," in this context, it is meant that the fluids which flow to the filter cartridge 22, for filtering, enter filter media 26 of the filter cartridge 22 at inlet end or face 23 in a first direction and exit from opposite outlet end or face 24 with flow in the same general direction. The term "straight through flow" as characterized above, is meant to specifically differentiate a flow in a system such as that described in WO 89/01818 published 9 Mar. 1989, in which air enters a cylindrical pleated filter member by direction against a cylindrical surface, and then exits the element (for example through an aperture) after making an approximately 90° turn.

The filter cartridge 22 has an outer sidewall or surface 25 with a filter media pack 26 that is configured to filter particulates from a gas stream entering the inlet end or face 23, such that the gas stream exiting the outlet end or face 24 is at least partially clean (i.e., free of particulates). As can be seen from FIG. 2, the filter cartridge 22 includes a housing gasket or housing seal 28 which aids in inhibiting leakage between the filter cartridge 22 and portions of the housing 2 in which the filter cartridge 22 is installed. The preferred gasket 28 extends completely, peripherally, around the outer sidewall 25 of the straight through flow construction or cartridge 22.

As will be discussed further below, for the preferred arrangements the outer side wall or surface 25 is formed by a preformed piece (preferably a preformed molded plastic piece) or preform 25a: (a) inside of which filter media pack 26 is positioned, (b) to which the filter media pack 26 is sealed; and, (c) on which the housing seal 28 is secured. This preform 25a, is discussed in greater detail below, in connection with the description of FIGS. 6-7A and 9-9C at 60. The preform or preformed piece 25a, is sometimes referred to herein as a "shell," or as an "element housing." It should not be confused with the air cleaner housing 2. Indeed, in use, the particular preform 25a shown is positioned to secure the media pack 25 inside of air cleaner housing 2, with housing seal 28 secured between housing portions, as discussed below in connection with FIG. 8.

Preferred filter media packs 26 usable in the primary element 22 of air cleaner arrangement 1 uses a type of media, described below, generally referred to as "z-media" or "z-filter media." Z-filter media generally comprises a fluted (typically corrugated or pleated) media sheet secured to a facing sheet. Typically, the facing sheet for z-filter media is a non-fluted, non-corrugated sheet. In some instances a sheet having corrugations extending perpendicularly to the flutes of the fluted sheet can be used, see for example the disclosure of U.S. provisional 60/543,702, filed Feb. 10, 2004 and U.S. provisional 60/543,804, filed Feb. 11, 2004, both of which are incorporated herein by reference.

In general, z-filter media is arranged to form a set of longitudinal (axial) flutes or air flow channels on one side of the corrugated or fluted media, and another set of longitudinal (axial) flow channels on an opposite side of the fluted media. The term "axial" in connection with the definition of the longitudinal flutes, is meant to refer to a direction of flute extensions generally between the opposite faces 23, 24 of the media pack 26, typically referred to as the axial direction.

In operation, flutes of one set of flutes: are designated as inlet flutes; are left open at an inlet end side, edge or face of the media; and, are sealed or otherwise folded closed at an outlet end, side, edge or face of the media. Analogously, the flutes of a second set of flutes: are generally designated as outlet flutes; are sealed or otherwise closed at the inlet end side, edge or face of the filter; and, are left open at the outlet end side, edge or face of the media. In operation, air passes into the inlet flow face 23 of the media pack 26 by passage into the open inlet flutes at an upstream end or face of the filter cartridge 22. The air cannot flow out of the closed ends of these inlet flutes, so it must pass through the filter media into the outlet flutes. The filtered air then passes outwardly from an exit end 24 of the filter media pack 26, through the open ends of the outlet flutes.

A variety of shapes, i.e., outer perimeter configurations, for the primary filter cartridge 22 can be used. The particular one used the arrangement of the drawings, is an "obround" shape. The term "obround" as used herein, is generally meant to refer to an arrangement that is not circular in a perimeter shape of a cross-section; the referenced cross-section being taken perpendicularly to a direction of extension of the flutes, again sometimes referenced as the axial direction. (Of course, many of the techniques described herein can be applied to elements that have a circular perimeter shape or cross-section.) A variety of obround shapes are possible including, for example, oval and racetrack. In general both of these example obround shapes can generally be characterized as having two opposite curved ends with sides extending therebetween. A "racetrack shape" generally has opposite parallel sides extending between the two, opposite, curved ends. An oval shape generally has a slight curvature to the opposite sides, typically with the opposite sides positioned as mirror images to one another.

The particular filter cartridge 22 depicted, has a generally obround shape to both a cross-section of the outer preform or shell 25a and a cross-section of the media pack 26, as will be apparent from the following descriptions. Typically the ends (of the cross-sectional shape) of the obround configuration are each semi-circular.

Figure 5:
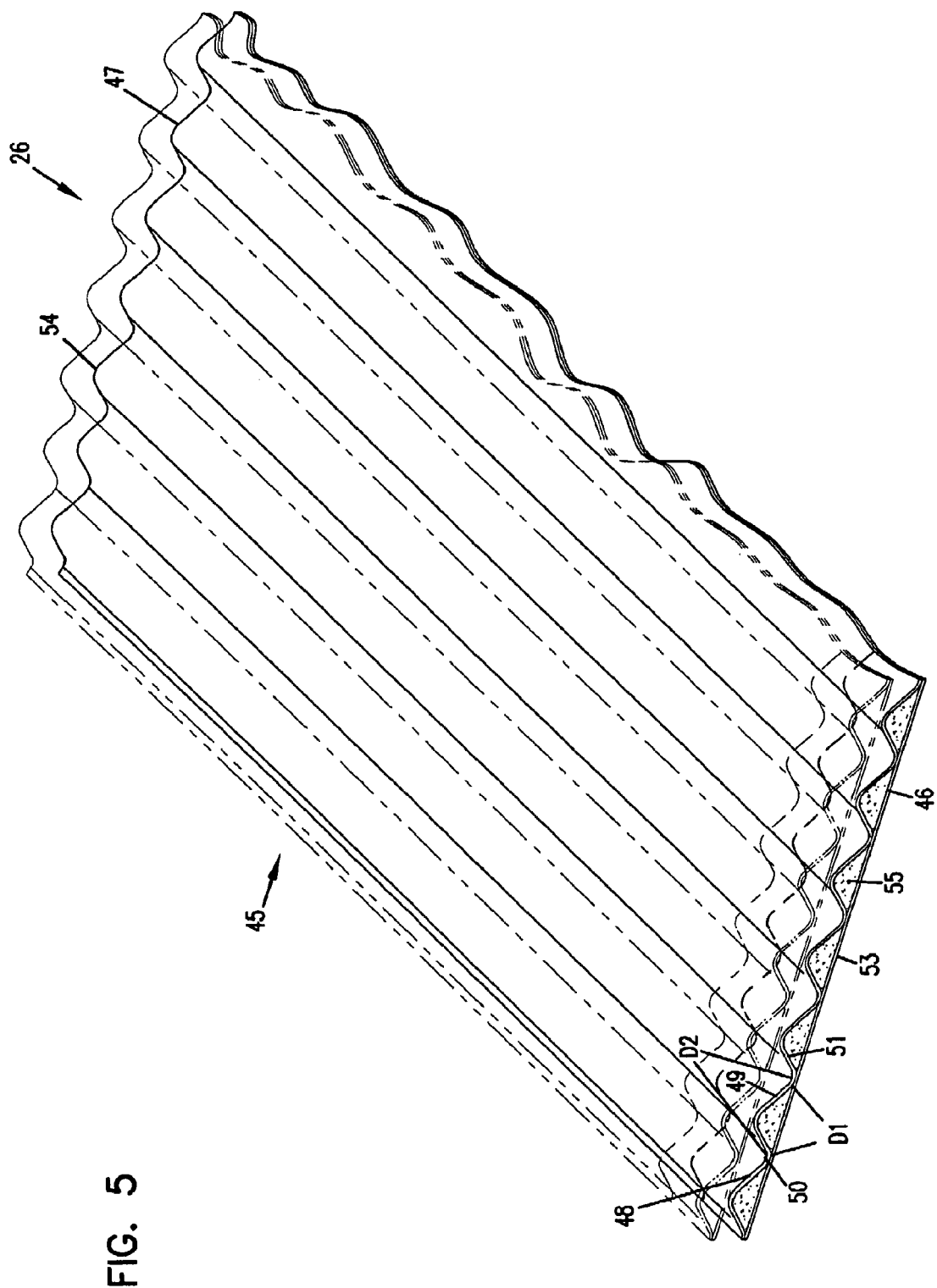
FIG. 5 is a schematic, perspective view of z-filter media; a type of media preferably used in the primary filter cartridge of FIG. 2.

Referring to FIG. 5, in general the filter media pack 26 is made from a two-layered construction 45, formed from a facing sheet 46 secured to a fluted, in this instance corrugated, sheet 47. Typically, the media pack is a coiled arrangement and the coiling is conducted with the facing sheet 46 directed to the outside, and the corrugated sheet 47 directed inwardly. For the particular filter media pack 26 depicted, FIG. 5, the facing sheet 46 is a non-corrugated, non-fluted shape. In the alternative a sheet corrugated perpendicularly to the direction of the flutes of the fluted sheet 47, can be used in some instances.

Media comprising strips of two-layered construction 45 formed from a facing sheet 46 secured to a fluted corrugated sheet 47, can also be formed into a media pack by stacking the strips on one another, with an appropriate sealant bead therebetween. Such arrangements are generally referred to as "stacked z-filter media." The principles described herein can be applied to a stacked arrangement, however the embodiment shown is particularly well adapted for use with coiled arrangements.

In general, on one side 48 of the fluted sheet 47 a first set of flutes 49 is formed; and on an opposite second side 50, a second set of flutes 51 is formed. In FIG. 5, edge 53 would correspond to inlet face 23, FIG. 2; and, edge 54 would correspond to outlet face 24, FIG. 2. The phantom lines in FIG. 5, indicate coiling of the two-layered construction 45 around itself. The solid lines indicate an outer layer of the two layers depicted, resulting from the coiling.

In use, the first set of flutes 49 are closed adjacent an edge 54; and, the second set of flutes 51 are closed adjacent to opposite edge 53. Generally when it is said that the flutes are closed "adjacent" an edge, it is meant that they are sealed along the edge or at a position spaced from the edge, but generally positioned near the edge. When it is stated that the flutes are "sealed" when "closed" it is meant that they are either sealed by an applied sealant, or they are otherwise distorted closed, to inhibit passage of unfiltered liquid through the ends. A variety of techniques for sealing can be used. Typically a sealant 55 is used. A sealant can be applied as a continuous strip, between the fluted sheet 47 and the facing sheet 46. The flutes can be distorted (for example darted), in the vicinity of one or both of the ends, to advantage. Other techniques of sealing, not involving sealant, can be applied. Useable techniques of flute end sealing include those described in PCT/US03/02799, filed Jan. 31, 2003, U.S. provisional applications 60/455,643, filed Mar. 18, 2003; 60/466,026, filed Apr. 25, 2003; and 60/467,521, filed May 2, 2003; and PCT Application filed Mar. 17, 2004, under Express Mail #EV 408495263 US and under title "Improved Process and Materials for Coiling Z-Filter Media, and/or Closing Flutes of Filter Media; and, Products", all of which are incorporated herein by reference.

Figure 7:
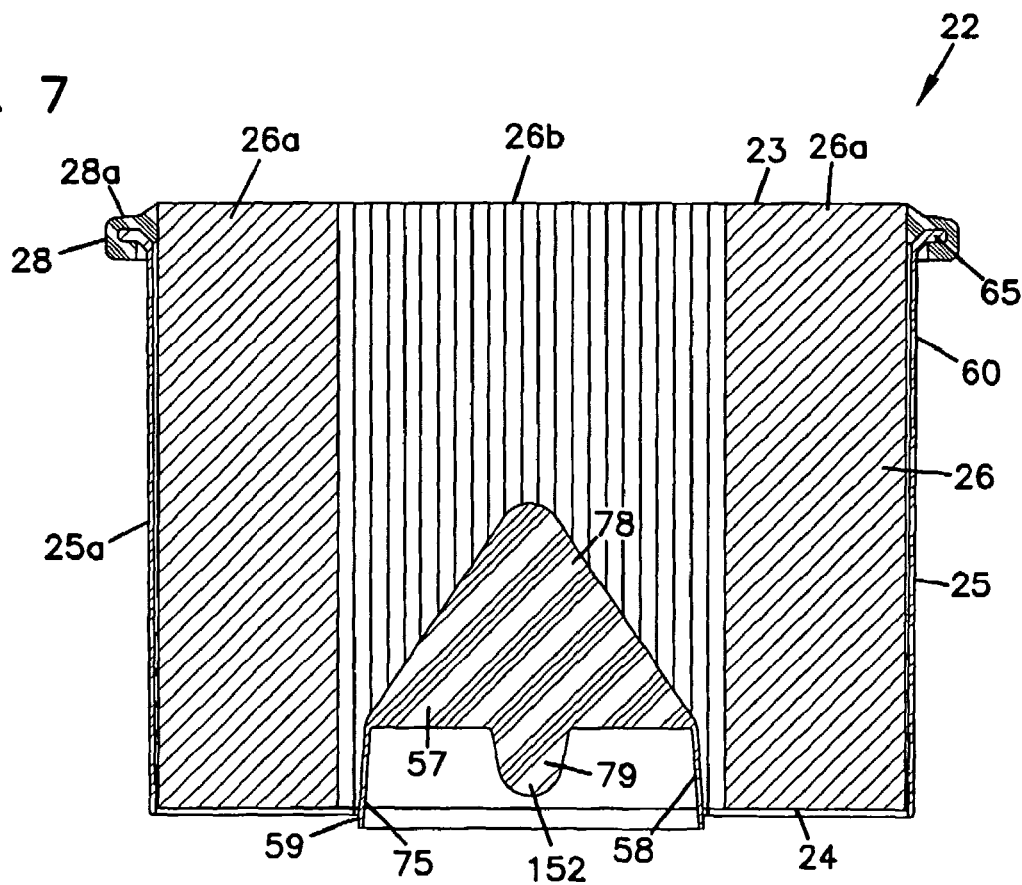
FIG. 7 is a cross-sectional view of the primary filter cartridge of FIG. 6, the cross-section being taken along the line 7-7 of FIG. 6.

From review of FIGS. 2 and 5, it should be apparent how the media 26 functions. In general, flutes of the first set of flutes 49 are open at inlet face 23, and thus comprise inlet flutes. They would be closed at their exit ends 54, as a result of a sealant bead or similar closure at this location. Thus, air which enters flutes of flute set 49 at the inlet edge 53 must pass through the media 26 to escape from the inlet flutes. Upon passage through the media: filtering occurs; and, air flow enters a second set of (outlet) flutes 51, at a location downstream from the sealant 53. Flutes of the outlet set of flutes 51 are open along edge 54, and thus the filtered fluid stream can flow out of the media 26. This type of construction is generally characterized herein as z-filter media. The z-filter media generally includes a plurality of flutes; each of having an upstream portion adjacent to an inlet flow face and a downstream portion adjacent to an outlet flow face; selected ones of the flutes being open at the upstream portion and closed at the downstream portion; and, selected ones of the flutes being closed at the upstream portion and open at the downstream portion. The inlet and outlet flow faces are not required to be planar, however that is a typical shape, as shown in FIGS. 4 and 7.

A variety of corrugation shapes and sizes can be utilized in the filter media 26. Examples include: corrugations resulting in a straight flutes, in which the flutes are parallel to each other and do not change shape from one end to other; straight flutes having crushed or pinched ends; and tapered flutes, in which inlet flutes gradually converge from a wide end in direction to a narrow end with adjacent exit flutes diverging from a narrow end to a wide end, in the same direction. Some examples of useable z-filter media configurations are described in the following references:

1. Standard flutes are depicted in U.S. Pat. Nos. 5,820, 646; and 5,895,574.
2. Tapered flutes, flutes with crushed ends and other variations in flute shapes are described in WO 97/40918, published Nov. 6, 1997.

The complete disclosures of above references (i.e., U.S. Pat. Nos. 5,820,646; 5,895,524 and WO 97/40918) are incorporated herein by reference.

In general, when the media pack 26 comprises a coiled media, the coiling is of a media strip sometimes referred to as a "single facer" comprising the fluted media sheet 47 secured to the facing sheet 46, by a sealant bead positioned between the two. The sealant bead positioned between the fluted sheet 47 and facing sheet 46 of the single facer or media combination 45 is generally referred to herein as the single facer bead or sealant. Typically when the resulting media combination 45 is coiled, to form the coiled media pack 26, it is coiled: with the facing sheet 46 directed outwardly; and, with a second bead of sealant positioned adjacent an opposite end of the flutes from the single facer bead, along an opposite side of the facing sheet from the single facer bead. This second bead is typically referred to as a "winding bead," since: (a) it is formed generally immediately prior to coiling or winding of the media combination 45; and (b) its sealing function is provided as a result of the winding.

When the media pack 26 is formed by coiling the media configuration 45 with a winding bead thereon, a region of sealant from the winding bead is generally positioned toward an inside of the wind. The media can then be compressed at this region, sealing opposite sides of the winding bead material in this location together, to advantage. This is described for example in U.S. provisional application 60/467,521, filed May 2, 2003, incorporated herein by reference. It is also described in the 60/467,521 application, that a urethane material can be used to advantage at this location. The 60/467,521 disclosure was filed as part of a PCT application on Mar. 17, 2004, under Express Mail #EV 408495263 US and under title "Improved Process and Materials for Coiling Z-Filter Media, and/or Closing Flutes of Filter Media; and, Products." The complete disclosure of this PCT application is also incorporated herein by reference.

With respect to the preferred media pack 26, of cartridge 22, FIG. 7, the winding bead would typically be position adjacent inlet face 23, with a single facer bead adjacent outlet face 24. A core 57 projects to the media pack 26 adjacent the outlet end 24. Adjacent face 23, where the winding bead is located, would be less convenient location to insert the core 57. Also this type of construction avoids the necessity of a seal adjacent outlet face 24 between the media pack 26 and core 57.

In general, when the media pack 26 is a coil, at an inside side of the coil a lead end of the media combination 45 is present. It may be desirable to seal this lead end closed completely across the media combination, with a sealant, before coiling. In some arrangements such as a seal at this location can be avoided, due to the presence of the winding bead adjacent end 23 closing off a central portion of the media pack 26 adjacent inlet end 23.

Similarly, on the outside of the media pack 26, a tail end of coiled media combination 45 is present. This can be sealed closed with various sealants such as polyurethane or hot melt sealants, as desired. In some instances, the presence of the seal 28 described below, in overlap with a portion of this tail end in a region adjacent the winding bead near face 23, can obviate the criticality of a seal at this location.

The sealant used in the single facer bead and winding bead can be the same or different, and a variety of sealant materials can be used. Typically hot melt sealants or foamed sealants such as foamed polyurethanes will be used. A description of sealing to form related media packs, is provided in the above incorporated U.S. provisional application 60/467,521.

If the winding bead does not provide sufficient closure adjacent inlet end 23, additional sealant can be added at this location in the central portion of the media pack 26. This is also generally described in U.S. Provisional 60/467,521.

The term "corrugated" used herein to refer to structure in media, is meant to refer to a flute structure resulting from passing the media between two corrugation rollers, i.e., into a nip or bite between two rollers, each of which has surface features appropriate to cause a corrugation affect in the resulting media. The term "corrugation" is not meant to refer to flutes that are scored and folded or otherwise formed by techniques not involving passage of media into a bite between corrugation rollers. However, the term "corrugated" is meant to apply even if the media is further modified or deformed after corrugation, for example by the folding techniques described in PCT/US03/02799, incorporated herein by reference.

Corrugated media is a specific form of fluted media. Fluted media is media which has individual flutes (for example formed by corrugating or folding) extending thereacross.

In general, the corrugated sheet 47, FIG. 5 is of a type generally characterized herein as having a regular, curved, wave pattern of flutes or corrugations. The term "wave pattern" in this context, is meant to refer to a flute or corrugated pattern of alternating troughs and ridges. The term "regular" in this context is meant to refer to the fact that the pairs of troughs and ridges alternate with generally the same repeating corrugation (or flute) shape and size. (Also, typically each trough is substantially an inverse of each ridge). The term "regular" is thus meant to indicate that the corrugation (or flute) pattern comprises troughs and ridges with each pair (comprising an adjacent trough and ridge) repeating, without substantial modification in size and shape of the corrugations along at least 70% of the length of the flutes. The term "substantial" in this context, refers to a modification resulting from a change in the process or form used to create the corrugated or fluted sheet, as opposed to minor variations from the fact that the media sheet is flexible. With respect to the characterization of a repeating pattern, it is not meant that in any given filter construction, an equal number of ridges and troughs is necessarily present. The media could be terminated, for example, between a pair comprising a ridge and a trough, or partially along a pair comprising a ridge and a trough. Also, the ends of the troughs and ridges may vary from one another. Such variations in ends are disregarded in the definitions.

In the context of the characterization of a "curved" wave pattern of corrugations, the term "curved" is meant to refer to a corrugation pattern that is not the result of a folded or creased shape provided to the media, but rather the apex of each ridge and the bottom of each trough is formed along a radiused curve. A typical radius for such z-filter media would be at least 0.25 mm and typically be not more than 3 mm.

An additional characteristic of the particular regular, curved, wave pattern depicted in FIG. 5, for the corrugated sheet 47, is that at approximately a midpoint between each trough and each adjacent ridge, along most of the length of the flutes, is located a transition region where the curvature inverts.

A characteristic of the particular regular, curved, wave pattern corrugated sheet shown in FIG. 5, is that the individual corrugations are generally straight. By "straight" in this context, it is meant that through at least 70%, typically at least 80% of the length between opposite edges 53, 54, the troughs do not change substantially in cross-section. The term "straight" in reference to corrugation pattern shown in FIG. 5, in part distinguishes the pattern from the tapered flutes of corrugated media described in FIG. 1 of WO 97/40918, the complete disclosure of which is incorporated herein by reference. The tapered flutes of FIG. 1 of WO 97/40918 would be a curved wave pattern, but not a "regular" pattern, or a pattern of straight flutes, as the terms are used herein.

For the particular arrangement shown herein in FIG. 5, the parallel corrugations are generally straight completely across the media, from edge 53 to edge 54. Straight flutes or corrugations can be deformed or folded at selected locations, especially at ends. Modifications at flute ends are generally disregarded in the above definitions of "regular," "curved" and "wave pattern."

In general, the filter media is a relatively flexible material, typically a non-woven fibrous material (of cellulose fibers, synthetic fibers or both) typically including a resin therein, sometimes treated with additional materials. Thus, it can be conformed or configured into the various folded or corrugated patterns, without unacceptable media damage. Also, it can be readily coiled or otherwise configured for use, again without unacceptable media damage. Of course, it must be of a nature such that it will maintain a corrugated or folded configuration, during use.

In the corrugation process, an inelastic deformation is caused to the media. This prevents the media from returning to its original shape. However, once the tension is released the flute or corrugations will tend to spring back, recovering only a portion of the stretch and bending that has occurred. The facing sheet is often tacked to the fluted sheet, to inhibit this spring back.

Also, in general, the media contains a resin. During the corrugation process, the media can be heated to above the glass transition point of the resin. When the resin then cools, it will help to maintain the fluted shapes.

Both of these techniques are generally known in practice, with respect to the formation of corrugated media.

An issue with respect to z-filter constructions relates to closing of the individual flute ends. Typically a sealant or adhesive is provided, to accomplish the closure. As is apparent from the discussion above, in typical z-filter media, especially that which uses straight flutes as opposed to tapered flutes, large sealant surface areas (and volume) at both the upstream end and the downstream end are needed. High quality seals at these locations are critical to proper operation of the media structure that results. The high sealant volume and area, creates issues with respect to this.

Attention is again directed to FIG. 5, in which a z-filter media construction 26 utilizing a regular, curved, wave pattern corrugated sheet 47, and a non-corrugated flat sheet 46, is depicted. A distance (D1), defines the extension of flat media 46 in a region underneath a given corrugated flute. A length (D2) of the arcuate media for a corrugated flute, over the same distance D1 is of course larger than D1, due to the shape of the corrugated flute. For a typical regular shaped media used in fluted filter applications, a linear length D2 of the fluted media between points of contact with the non-fluted media will generally be at least 1.2 times D1. Typically, D2 would be within a range of 1.2-2.0, inclusive. One particularly convenient arrangement for air filters has a configuration in which D2 is about 1.25-1.35×D1. Such media has, for example, been used commercially in Donaldson Powercore™ Z-filter arrangements. Herein the ratio D2/D1 will sometimes be characterized as the flute/flat ratio or media draw for the corrugated media.

Figure 15:
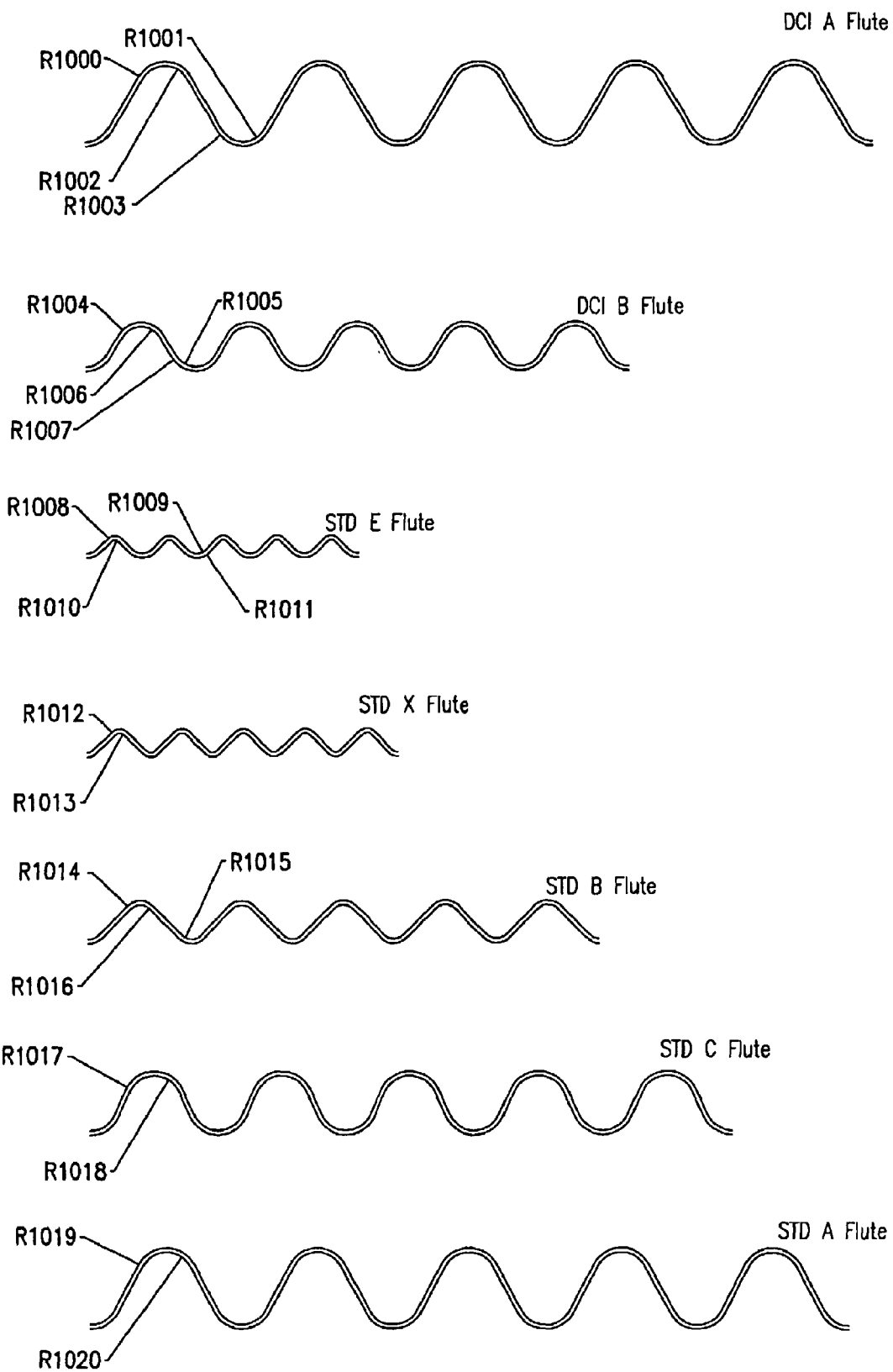
FIG. 15 is a schematic depiction of various flute definitions.

In the corrugated cardboard industry, various standard flutes have been defined. For example the standard E flute, standard X flute, standard B flute, standard C flute and standard A flute. FIG. 15, attached, in combination with Table A below provides definitions of these flutes.

Donaldson Company, Inc., (DCI) the assignee of the present disclosure, has used variations of the standard A and standard B flutes, in a variety of filter arrangements. These flutes are also defined in FIG. 15 and Table A.

TABLE A (Flute definitions for FIG. 20)

| | |
|---|---|
| DCI A Flute: | Flute/flat = 1.52:1; The Radii (R) are as follows: $R1000 = .0675$ inch (1.715 mm); $R1001 = .0581$ inch (1.476 mm); $R1002 = .0575$ inch (1.461 mm); $R1003 = .0681$ inch (1.730 mm); |
| DCI B Flute: | Flute/flat = 1.32:1; The Radii (R) are as follows: $R1004 = .0600$ inch (1.524 mm); $R1005 = .0520$ inch (1.321 mm); $R1006 = .0500$ inch (1.270 mm); $R1007 = .0620$ inch (1.575 mm); |
| Std. E Flute: | Flute/flat = 1.24:1; The Radii (R) are as follows: $R1008 = .0200$ inch (.508 mm); $R1009 = .0300$ inch (.762 mm); $R1010 = .0100$ inch (.254 mm); $R1011 = .0400$ inch (1.016 mm); |
| Std. X Flute: | Flute/flat = 1.29:1; The Radii (R) are as follows: $R1012 = .0250$ inch (.635 mm); $R1013 = .0150$ inch (.381 mm); |
| Std. B Flute: | Flute/flat = 1.29:1; The Radii (R) are as follows: $R1014 = .0410$ inch (1.041 mm); $R1015 = .0310$ inch (.7874 mm); $R1016 = .0310$ inch (.7874 mm); |
| Std. C Flute: | Flute/flat = 1.46:1; The Radii (R) are as follows: $R1017 = .0720$ inch (1.829 mm); $R1018 = .0620$ inch (1.575 mm); |
| Std. A Flute: | Flute/flat = 1.53:1; The Radii (R) are as follows: $R1019 = .0720$ inch (1.829 mm); $R1020 = .0620$ inch (1.575 mm). |

Of course other, standard, flutes definitions from the corrugated box industry are known.

In general, standard flute configurations from the corrugated box industry can be used to define corrugation shapes or approximate corrugation shapes for corrugated media. Comparisons above between the DCI A flute and DCI B flute, and the corrugation industry standard A and standard B flutes, indicate some convenient variations.

Referring again to FIG. 2, the preferred (primary) filter cartridge 22 is serviceable. By the term "serviceable" in this context, it is meant that the filter cartridge 22 can be removed from the air cleaner assembly 1, and either be refurbished or replaced. In typical systems, the filter element 22 is periodically replaced, during a servicing operation, by installation of a new replacement cartridge.

The particular, preferred, filter cartridge 22, FIG. 7 comprises the following components: preform (shell) 25a; media pack 26; centerpiece or core 57, receiver 58, grid 59; and, seal or gasket member 28. (The grid 59 is more readily viewed in FIG. 2.) The preferred seal member 28 is generally positioned to completely circumscribe the media pack 26 and thus to separate the opposite flow faces 23, 24 of the media pack 26 from one another, with respect to flow around media pack 26. For the particular arrangement depicted, the seal member 28 is positioned to completely circumscribe the media pack 26, by being mounted on the preform 25a. For the particular, preferred, arrangement shown, the seal member 28 is positioned with axial seal surface 28a positioned within a distance no greater than 15 mm of, and preferably within a distance no greater than 8 mm of, inlet face 23, although alternatives are possible.

It is noted that in the figures, the main body or straight through flow construction of the media pack 26 is shown schematically, in the cross-sections. That is, flute detail is not depicted. As to flute detail, it is not shown in any figures other than the example of FIG. 5, for convenience. As indicated previously, a variety of flute shapes can be used. Examples depicting the ends of a z-filter element, and sealing at those ends, are provided in the drawings of U.S.

Des. 396,098; U.S. Pat. No. 6,190,432; U.S. Des. D450,827; U.S. Pat. No. 6,235,195; U.S. D437,402 and U.S. D450,828, all 6 of these references being incorporated herein by reference.

Figure 6:
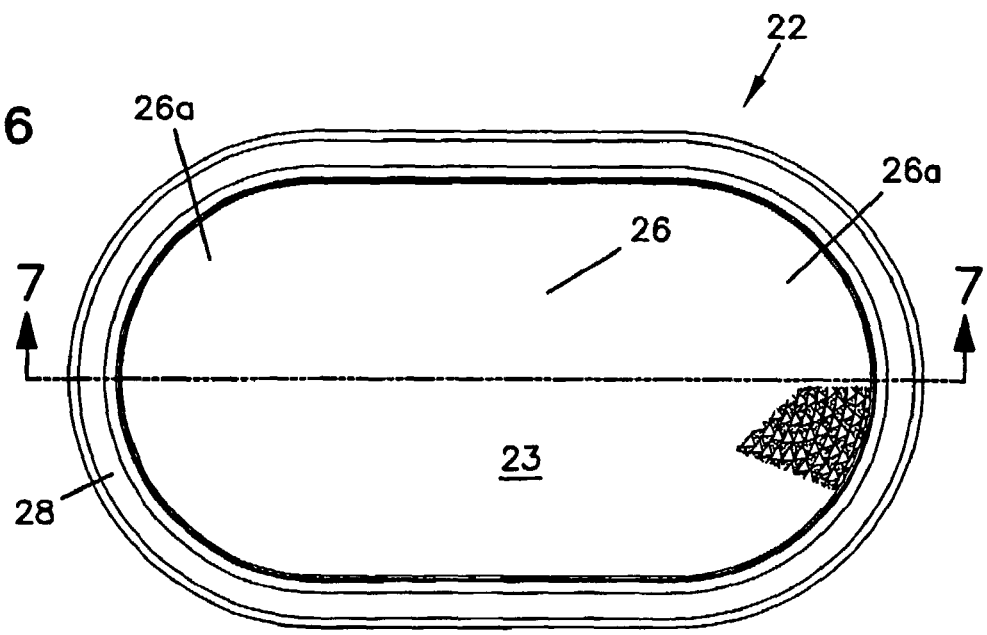
FIG. 6 is a plan view of the primary filter cartridge viewable in FIG. 2.

Referring specifically to FIG. 6 and the cross-section shown in FIG. 7, regions 26a show where the media pack 26 has been cut in cross-section, to provide the drawing of FIG. 7. Region 26b indicates a region where the cross-section line 7-7, FIG. 6, is positioned between layers of the wound media pack 26, with the surface viewable at 26b being a corrugated surface. A cross-section similar to FIG. 7 results, when the cross-section line, FIG. 6, is across coiled layers at the opposite curved ends, but between layers through the center region.

As discussed in greater detail below, in general core 57 is positioned to separate layers of wound media, in which each layer comprises a fluted sheet secured to the non-fluted sheet.

Figure 7A:
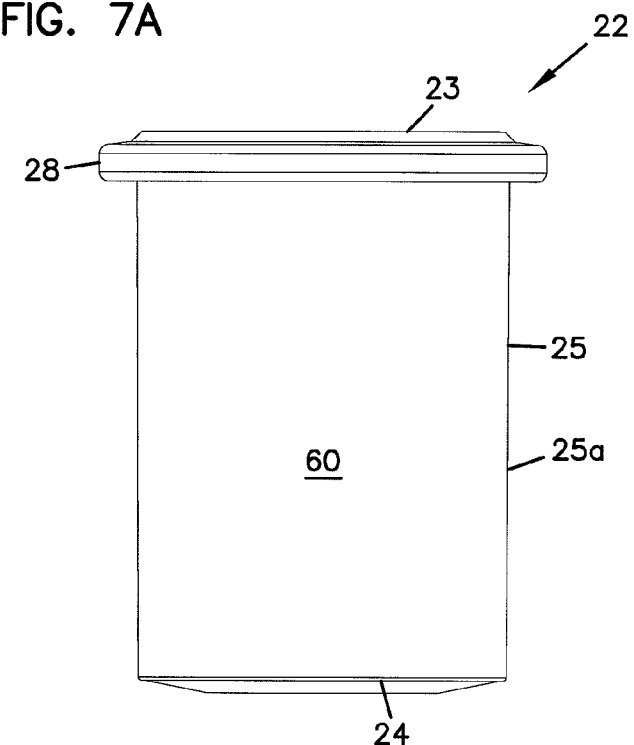
FIG. 7A is a side, elevational view of the filter cartridge depicted in FIGS. 6 and 7.

Referring to FIGS. 6-7A, for the preferred embodiment shown the preform (shell) 25a, core 57, receiver 58 and grid 59 are all integral with one another. By "integral" in this context, it is meant that the parts identified cannot be separated from one another without damage to the defined unit. Collectively, these identified parts comprise preferred preform 60. The preform 60 is prepared before the cartridge 22 is assembled. The cartridge 22 is typically assembled by inserting the media pack 26 and the preform 60 into a mold and molding the seal 28 in place. This is described in greater detail below.

Still referring to FIGS. 6-7A, preferably the preform 60 comprises a molded plastic material, such as a polypropylene. An example of a useable material would be a 25% glass-filled, 10% mica filled, polypropylene; such as a Thermofil polypropylene or an Adell polypropylene.

Figure 9:
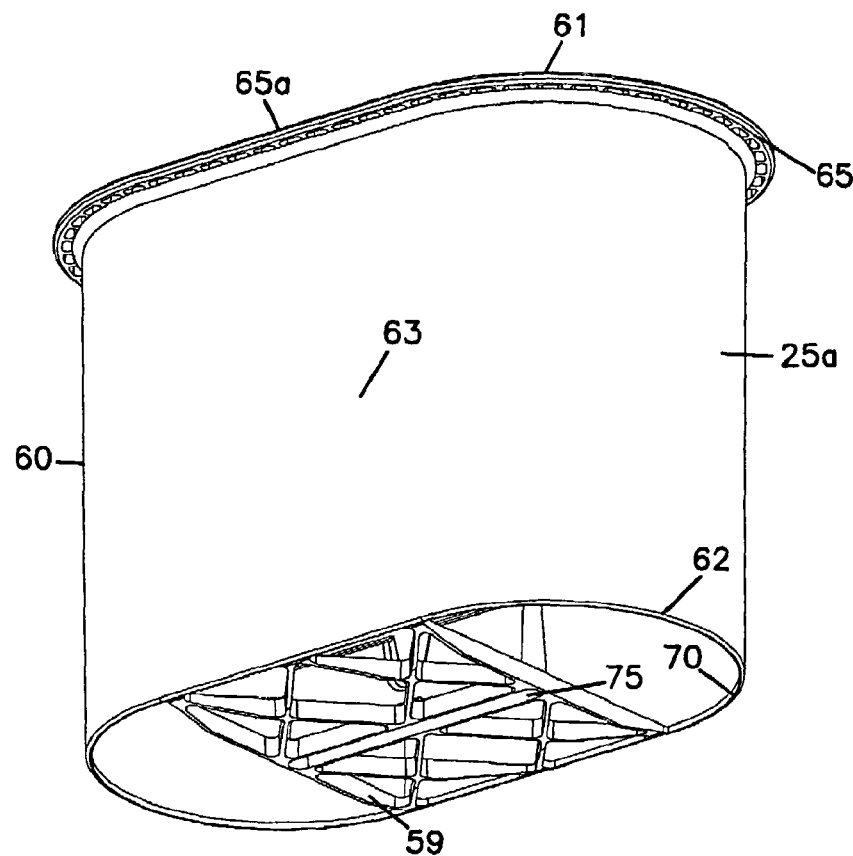
FIG. 9 is a perspective view of a preform useable to form the filter cartridge of FIGS. 6-7A.
Figure 9A:
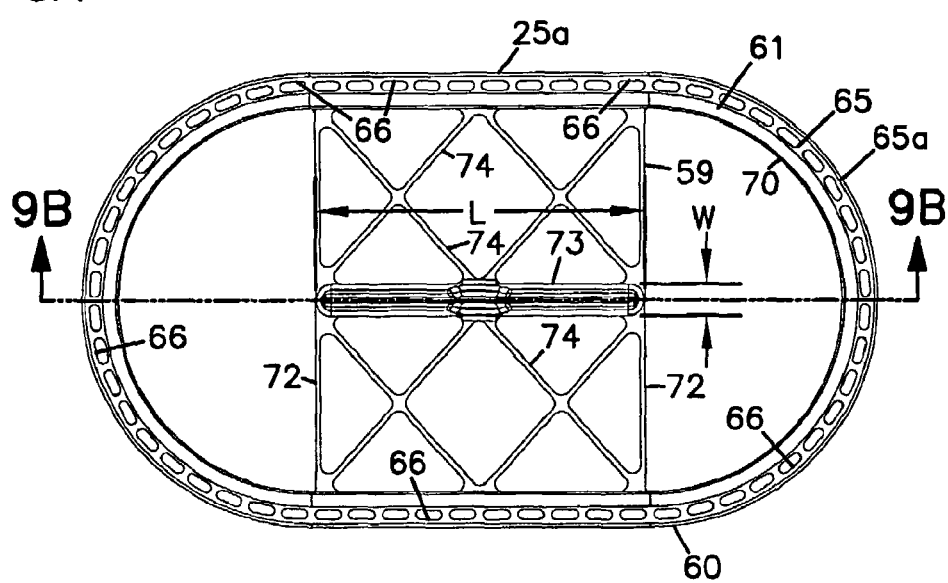
FIG. 9A is an end view of the preform depicted in FIG. 9.
Figure 9C:
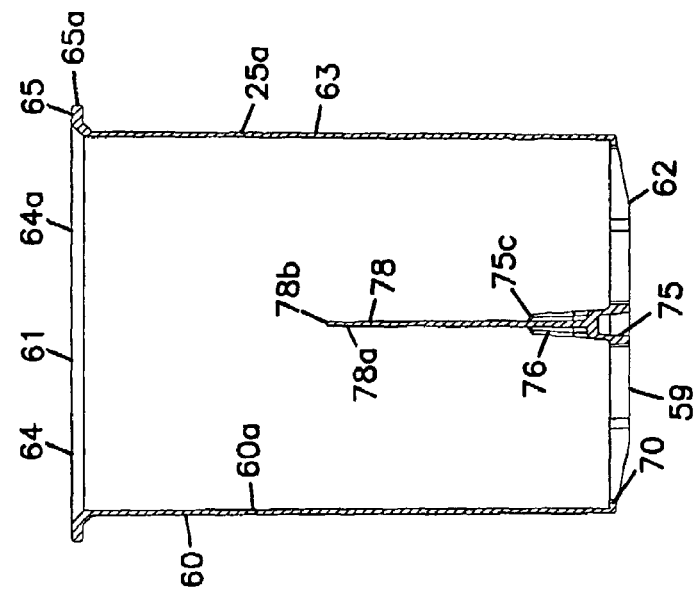
FIG. 9C is a cross-sectional view taken along line 9C-9C, FIG. 9B.

Referring to FIGS. 9-9C, preform 60 includes opposite ends 61, 62 with side wall 63 extending therebetween. Adjacent end 61, the side wall 63 has an outward funnel transition portion 64, FIG. 9B, with housing seal support 65, comprising radially outwardly directed seal support portion or lip 65a thereon. Lip 65a has seal flow apertures 66, FIG. 9A, therethrough, for use as described further below. In general housing seal support 65 will generally be characterized as radially directed, since it is directed radially outwardly from a longitudinal axis 67 of the preform 60, FIG. 9B.

As indicated below in connection with the description of FIGS. 10, 10A, funnel transition portion 64 opens up a space into which sealant can flow, during assembly. Preferably at outer edge 64a, FIG. 9C, the transition portion 64 has spread outwardly sufficiently far, to create a gap for convenient sealant flow therein during assembly.

In extension between regions 71 and 68, the side wall 63 can have a slight downwardly (or inwardly) directed taper, for convenience.

In preferred arrangements, the side wall 63 will be impermeable along its length, although alternatives are possible. Also preferably the side wall 63, in combination with the seal 28, will extend at least the entire axial length of the media pack 26, although alternatives are possible.

At end 62, grid work 59 is provided in extension across opening 70. The grid work 59 may have a variety of shapes. The particular shape provided (FIG. 9A) comprises parallel cross pieces 72, center cross piece 73, and diagonal cross pieces 74. In general, the grid work 59 is positioned to support the outlet face 24 of the media pack 26, FIG. 7. The grid work 59 inhibits media telescoping.

The center cross piece 73 defines a central, elongate, hollow receiver 75 therein, forming receiver 58, FIG. 7. The receiver 75 preferably has an outside aspect ratio (external length L FIG. 9A over external width W FIG. 9A) of at least 3:1, preferably at least 5:1 most preferably within the range of 6:1 to 10:1. Typically and preferably the external width W, FIG. 9A, is no greater than about 65%, preferably no greater than about 50%, of a longer dimension of a media pack cross-section.

Figure 9B:
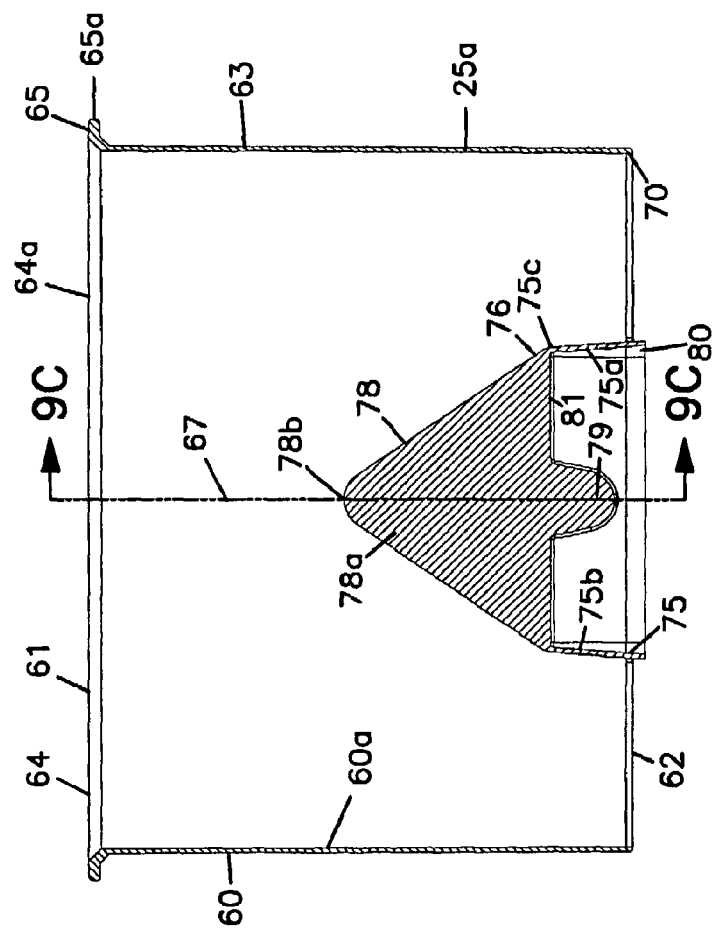
FIG. 9B is a cross-sectional view taken generally along line 9B-9B, FIG. 9A.

Referring to FIGS. 9B and 9C, preferably the receiver 75 comprises a portion of a central core 76 including receiver 75 and non-hollow central blade 78 thereon. Also, preferably a divider 79 is provided in receiver 75 (FIG. 9B) to divide the receiver 75 into two sides 75a and 75b. Preferably each side extends in depth, inwardly from edge 80 to end 81 of at least 10 mm, preferably not more than 35 mm. Typical depth for each side would be on the order of about 15 mm to 28 mm. Preferably the shape of each side is as shown in FIG. 9B.

Referring to FIGS. 6 and 7, outside surfaces of receiver 75 comprise a core projecting into coiled media pack 26. Typically, the coiled media pack 26 would be formed into coil, and then be inserted over receiver 75. That is, in typical assembly the media pack 26 would not be coiled with core 76 in position. Rather the media pack 26 would first constructed in its coiled form, then would be inserted into interior 60a of preform 60, through end 61, and continue to be pushed inwardly to push the blade 57 (78) between layers of the media pack 26, guiding core 75 into position. The somewhat triangular shape and relative thinness of blade 78, FIG. 9B, facilitate this assembly.

More specifically, extending from inner end 75c (FIGS. 9B and 9C) of receiver 75, axially inwardly of shell 25a is provided central vane or blade arrangement 78. The blade 78 preferably comprises a non-hollow, triangularly shaped blade 78a preferably no more than 3.0 mm thick between regions 75c and 78b; and no more than 2 mm thick at tip 78a. Typically adjacent region 75c the blade 78 is about 2 mm thick, and at tip 78b it is about 1.0-1.5 mm thick (for example 1.3 mm) with a taper in between. The relatively thin, non-hollow, blade 78 facilitates in pushing media pack 26 into shell 25a with a portion around receiver 75. The blade 78 is preferably triangular in shape, with rounded tip 78a opposite receiver 75.

Preferably blade arrangement 78 projects inwardly of media pack a distance from outlet end 24 at least 30% of axial length of the media pack, typically at least 40% of this length. Preferably blade 78 does not extend further than 75% of the axial length of the media pack, typically not more than 60% of this length, and thus blade 78 ends spaced from opposite end surface 23 of the media pack 26.

Figure 17:
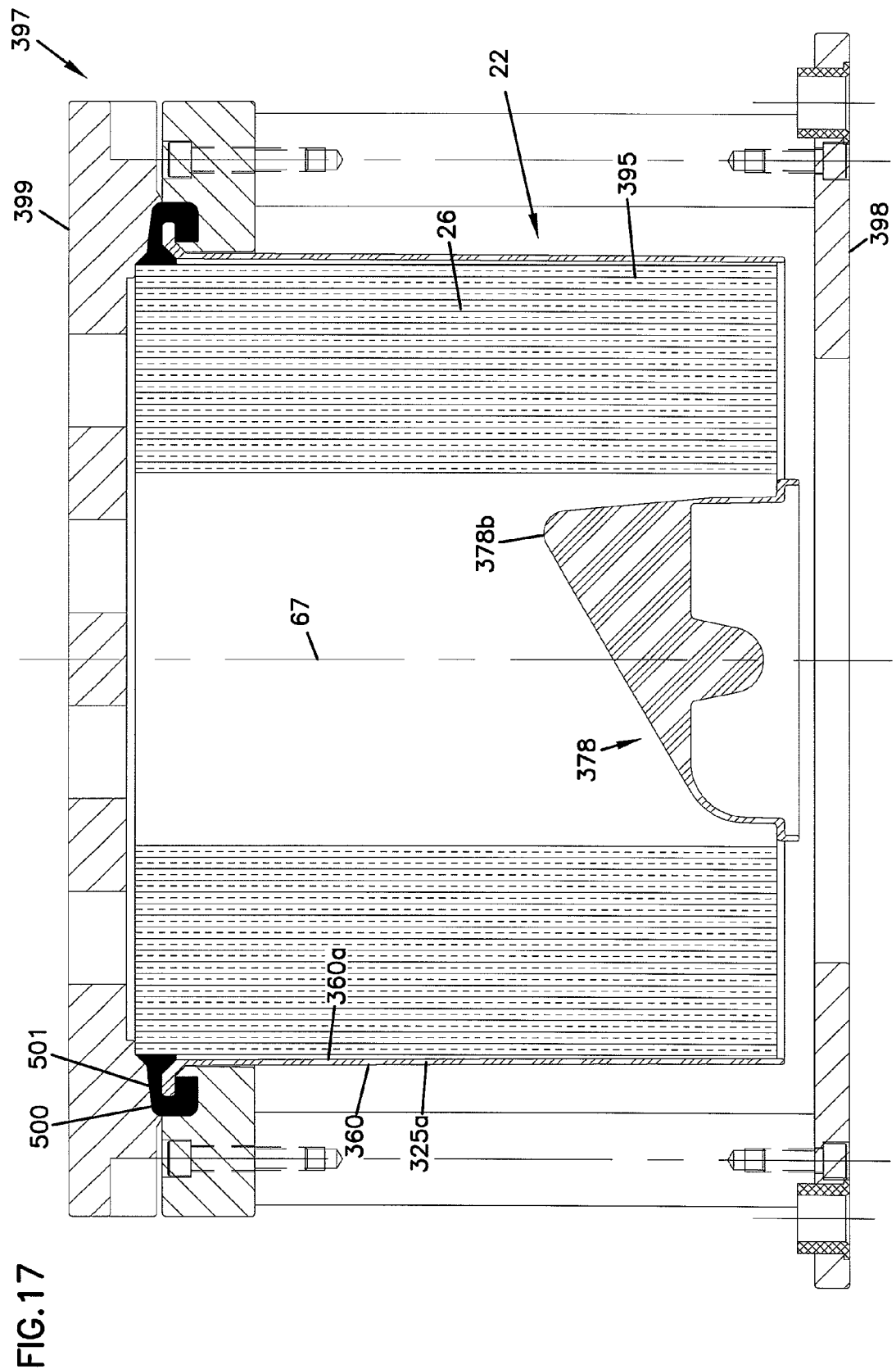
FIG. 17 is a cross-sectional view of a mold arrangement, analogous to the mold arrangement depicted in FIG. 10, and showing an alternate embodiment of a preform.

FIG. 17 shows the filter cartridge 22 with an alternate embodiment of a preform 360. The particular arrangement in FIG. 17 shows the filter element 22 within a mold arrangement 397, to be described further below. The filter cartridge 22 is shown in cross-sectional view and an alternate central vane or blade arrangement 378 can be seen. The blade 378 facilitates in pushing the media pack 26 into the shell 325a. The blade 378 is preferably triangular in shape, with a rounded tip or apex 378b.

The blade 378 of FIG. 17 differs from the blade 78 of FIG. 9b in that the apex 378b is offset from the central axis 67. That is, the apex 378b is located off to the side of the axis 67. The blade 378 has the general shape of a right triangle, rather than the appearance of equilateral or isosceles triangle of FIG. 9. The blade 378 generally has the same thicknesses and depth of penetration into the media 26 as the blade 78.

The blade 378 is formed with the apex 378b offset from the central longitudinal axis 67 for ease and convenience of pushing the blade 378 between layers of the media pack 26. When the apex 378b is offset from the central longitudinal axis 67, the blade 378 first enters between layers of media 26 that are closer to the turn in the coiled media pack 26. At the portion of the turn in the coiled media pack, the layers of media 26 are not as tightly packed together as, for example, the very center of the media pack, and this creates a larger gap between layers of media which facilitates an easier insertion of the blade 378 between the layers of the coiled media.

Attention is now directed to FIG. 7, in which the seal arrangement 28 is shown secured to lip or flange 65 (i.e., housing seal support) of preform 60. This is also shown in exploded view in FIG. 8.

Figure 8:
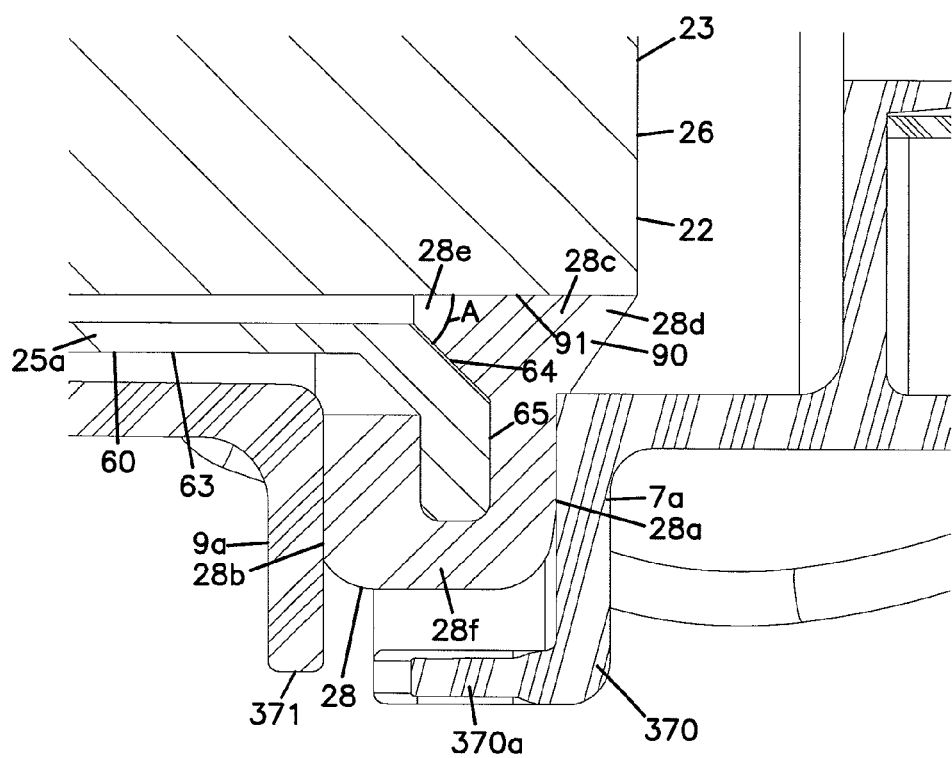
FIG. 8 is an enlarged fragmentary view showing an interaction between a gasket member mounted on the primary filter cartridge and structural members on certain housing components.

Referring to FIG. 8, seal 28 is molded directly to the lip or support 65. Further, an integral portion 90 of seal 28 is molded directly to the media pack 26 at 91, sealing the seal 28, preform 25a and media pack 26 together, at this location.

The seal 91 is preferably directly to the facing sheet 46 and preferably completely around the media pack 26. The seal 91 also preferably starts on a portion of the media pack 26 adjacent one of the flow faces, in this instance flow face 23. Preferably the seal 28 includes no portion extending over a flow face.

Referring to FIG. 8, seal 28 is an axial pinch seal, with respect to the housing 2. In particular, it is pinched between sections 7 and 9 of the housing, in particular between housing extensions 9a and 7a. Typically the seal 28 will be configured to compress in thickness, when installed. Preferred materials for the seal 28 comprise foamed sealant materials, such as foam polyurethane, which can readily compress to form a strong seal. Useable polyurethane seal materials include those described in U.S. Pat. No. 6,350,291 and U.S. application Ser. No. 10/112,097, filed Mar. 28, 2002, both of which are incorporated herein by reference, although alternatives are possible.

As described, the seal 28 is specifically an axial pinch seal (or axial housing seal). It can be configured with relatively flat opposite surfaces 28a, 28b, or with opposite surfaces that have a ridge or groove therein. Alternate seals can be used, including radial seals.

In general surfaces 28a, 28b comprise housing engagement seal regions, since it is these regions that engage the housing, during sealing.

Figure 10A:
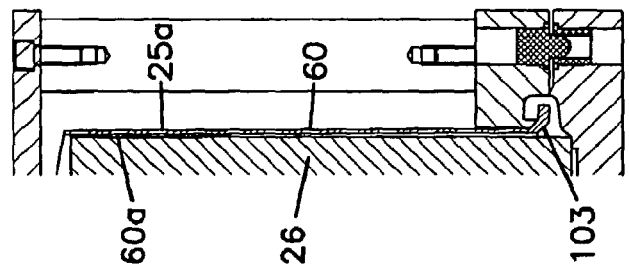
FIG. 10A is a fragmentary cross-sectional view of the arrangement of FIG. 10, taken generally along line 10A-10A thereof.
Figure 10:
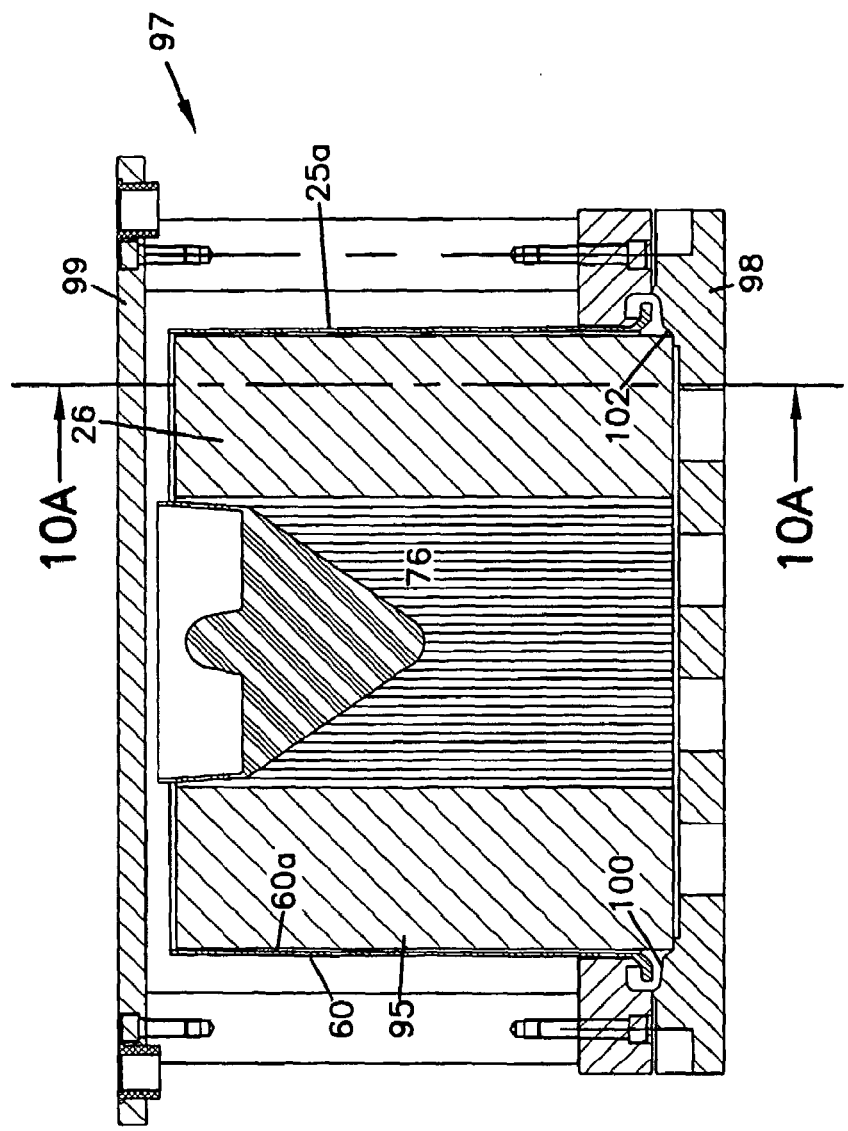
FIG. 10 is a cross-sectional view of a mold arrangement including the preform of FIG. 9 with a media pack therein, positioned in a mold for forming a housing seal arrangement of the filter cartridge depicted in FIGS. 6-7A.

A useable method for generating this type of seal arrangement can be understood by reference to FIGS. 10, 10A, and 17 and the following description. In FIG. 10, the media pack 26 is shown inserted into an interior 60a of preform 60. It would be understood, that the media pack 26 would be positioned with core 76, projecting into the media pack 26, between media layers.

The assembly 95 comprising the shell 60 and media pack 26 are shown positioned in mold arrangement 97. The mold arrangement 97 includes a mold base 98 and a mold cover 99 defining cavity 100 therebetween. The cavity 100 is configured for formation of the seal 28. The seal 28 is formed by dispensing a curable resin into mold cavity 100, preferably after assembly 95 is positioned in base 98 and before cover 99 is in place. In operation, a foaming urethane (which preferably will increase in volume at least 20%, typically at least 40% and usually 50-100% during cure), would be used.

Before resin cure, the mold cover 99 would be put into position. The mold cover provides definition of a portion of seal 28. During molding, the resin will rise to fill cavity 100. This rise would generally involve flow through apertures 66 in housing seal support 65, FIG. 9A. As a result of flow through these apertures, after cure the seal 28 will be mechanically secured to the seal support 65, due to a portion of the resin being cured and left in extension through the apertures 66.

Sealing of a portion of the cured seal 28 directly to the media pack 26a will also occur at region 100, since in this region the resin will directly contact the media pack. Flow across end surface 23 will generally be prevented by sloped region 102 of the cavity 100 engaging in the media pack 26. If necessary to inhibit flash at this location, the media pack 26 can be pinched by the mold at this region; or, a thixotropic bead can be placed between the media pack 26 and the mold base 98 at this location.

Referring to FIG. 10A, at 103, the funnel surface 64 (FIG. 9B) of the preform 60 creates a surface diagonal upwardly toward the media pack 26. This slope will help directed resin toward the media pack, and also inhibit trapping of air at this location during the molding process.

FIG. 17 illustrates an alternate embodiment of a method for generating preferred types of seal arrangements described herein. In FIG. 17, the media pack 26 is shown inserted into an interior 360a of a preform 360. The assembly 395 comprising the shell 360 and media pack 26 are shown positioned in the mold arrangement 397. The mold arrangement 397 includes a mold base 398 and a mold cover 399 defining a cavity 400 therebetween. The cavity 400, in this embodiment, is shown filled with resin 401. The cavity 400 is configured for formation of the seal 28. The seal 28 is formed by dispensing a curable resin into the mold cavity 400, preferably after the assembly 395 is positioned in the base 398 and before the cover 399 is in place. In operation, a foaming urethane would be used. A foaming urethane would preferably increase in volume at least 20%, typically at least 40%, and usually 50%-100% during cure.

Before the resin cures, the mold cover 399 would be put into position on the base 398. The mold cover 399 provides definition of a portion of seal 28. During molding, the resin will rise to fill cavity 400. This rise would generally involve flowing through apertures 66 in the housing seal support 65 (FIG. 9a). As a result of flowing through these apertures, after curing, the seal 28 will be mechanically secured to the seal support 65, due to a portion of the resin being cured and left in extension through the apertures 66.

Thus, advantageously, the seal 28 (FIG. 8) for arrangements according to the present disclosure provide for both: a housing seal portions as indicated at 28a, 28b as opposite surfaces for sealing with a housing in use; and, a portion 28c, integral with the housing seal portion 28a, which provides for: a seal directly to the media 26; a seal around the media pack 26; and, a seal of the media pack 26 and the preform 60, 360 (or 25a). These seal portions (28a, 28b, 28c) are preferably integral with one another and are simultaneously molded from a single resin shot. By "integral" in this context, it is meant preferably regions 28a, 28b, 28c are all portions of the same cure or pool or volume of resin, without separation therebetween. This is preferred, for convenient assembly without multiple sealing steps.

Referring to FIG. 8, the preferred shape of the seal 28 includes portion 28d directed upwardly (toward end 23) from surface 28a; with portion 28e oppositely directed, to fill in a region between funnel surface 64 and media pack 26. Regions 28a and 28b are positioned at opposite sides of lip 65, with transition portion 28f preferably positioned to extend therebetween.

Angle A, the acute angle between media pack 26 and funnel surface 64 preferably extends at an angle A within the range of 30° to 60° inclusive, more preferably 35° to 55° inclusive.

This type of molding operation uses some principles related to that described in U.S. provisional application 60/532,783 filed Dec. 22, 2003, the complete disclosure of which is incorporated herein by reference. Some of the techniques used in that application can be applied to provide for the seal arrangement shown in FIG. 8. It is noted that the particular location and shape of the present FIG. 8 seal is quite different, as well as the location and nature of the preform piece used. Further the specific example seals shown are of different types with respect to how the housing is preferably engaged.

Although the media packs can be made in a variety of sizes and shapes, a typical media pack useable in the specific configurations depicted, will have an axial length of at least 140 mm, and a longer cross-sectional length axis of at least 190 mm and a shorter cross-section axis or length of at least 110 mm.

Referring to FIG. 8, generally the interface between media pack 26 and seal material of seal 28, is over a distance of extension along the media pack of at least 4 mm, and typically 5-15 mm. This extension helps provide for a good secure engagement between the media pack 26 and the seal 28. Further the seal 28, will operate for some dampening affect with respect to vibration, of the equipment on which the assembly 1 is installed, being transmitted undesirably to the media pack 26 potentially damaging the media pack 26 at this location. That is, the desirable dampening effect of the material 28 facilitates integrity of the filter cartridge 22, during use.

C. Usable Safety Filters

In reference now to FIGS. 11-14, an embodiment of a usable safety filter 20 is illustrated. In preferred systems, the safety filter 20 is oriented in the air cleaner 1 downstream of the primary filter cartridge 22 in order to protect downstream components from debris that could get passed the primary filter cartridge 22, in case of failure of the primary filter cartridge 22. In addition, the safety filter 20 helps to protect the engine while servicing the air cleaner 1 while preventing debris from falling into clean air region 32, FIG. 4.

The safety filter 20 has an outside periphery 170 that preferably matches, in general shape, the outside periphery of the primary filter cartridge 22. In the embodiment illustrated, the safety filter 20 is obround, but can be other shapes such as circular. The particular obround shape shown is a racetrack shape with a pair of opposite sides 172, 173, joined by a pair of rounded or curved, opposite, ends 174, 175.

Figure 11:
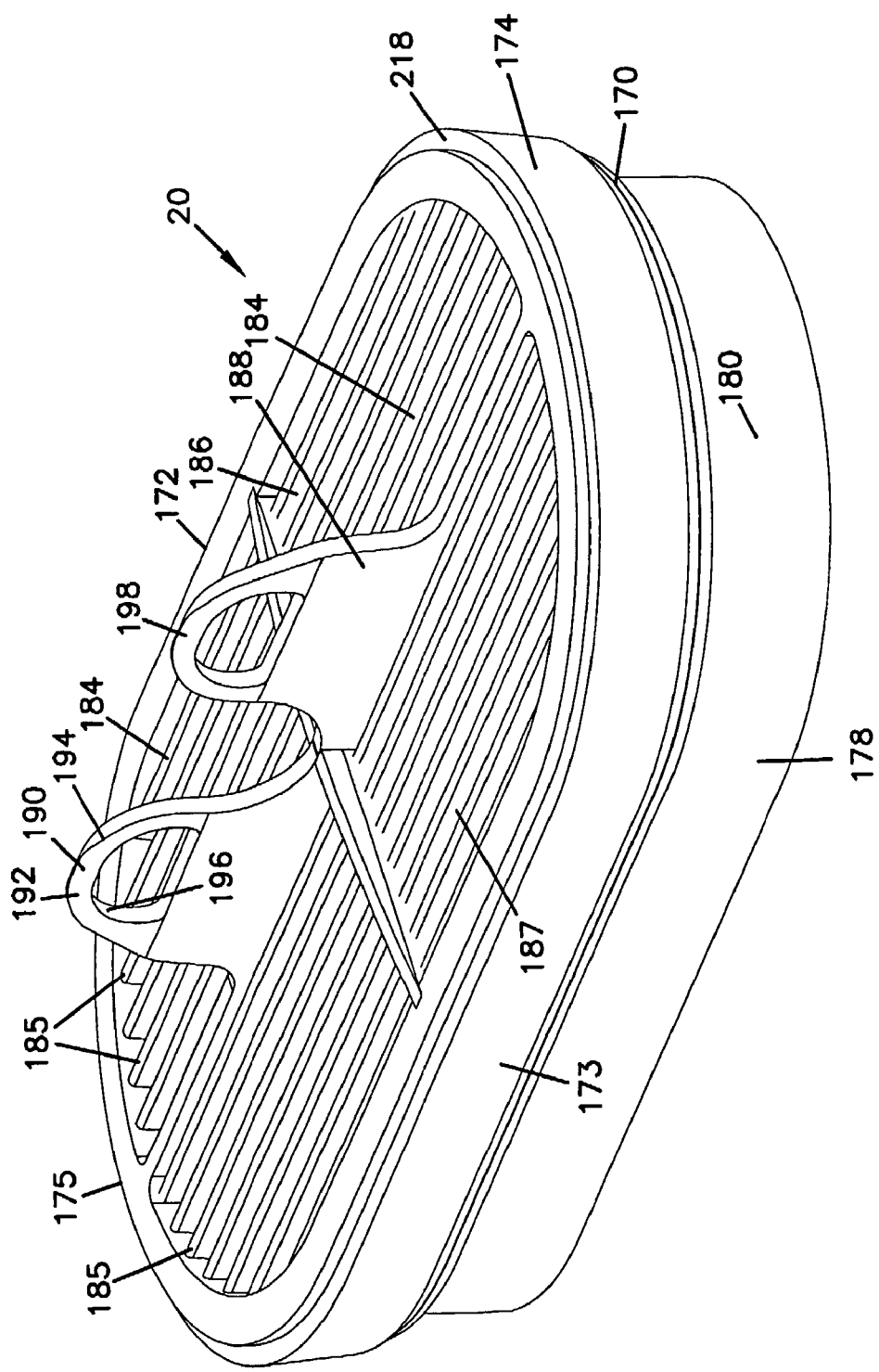
FIG. 11 is a perspective view of a safety filter usable in the air cleaner arrangement depicted in FIG. 2.
Figure 12:
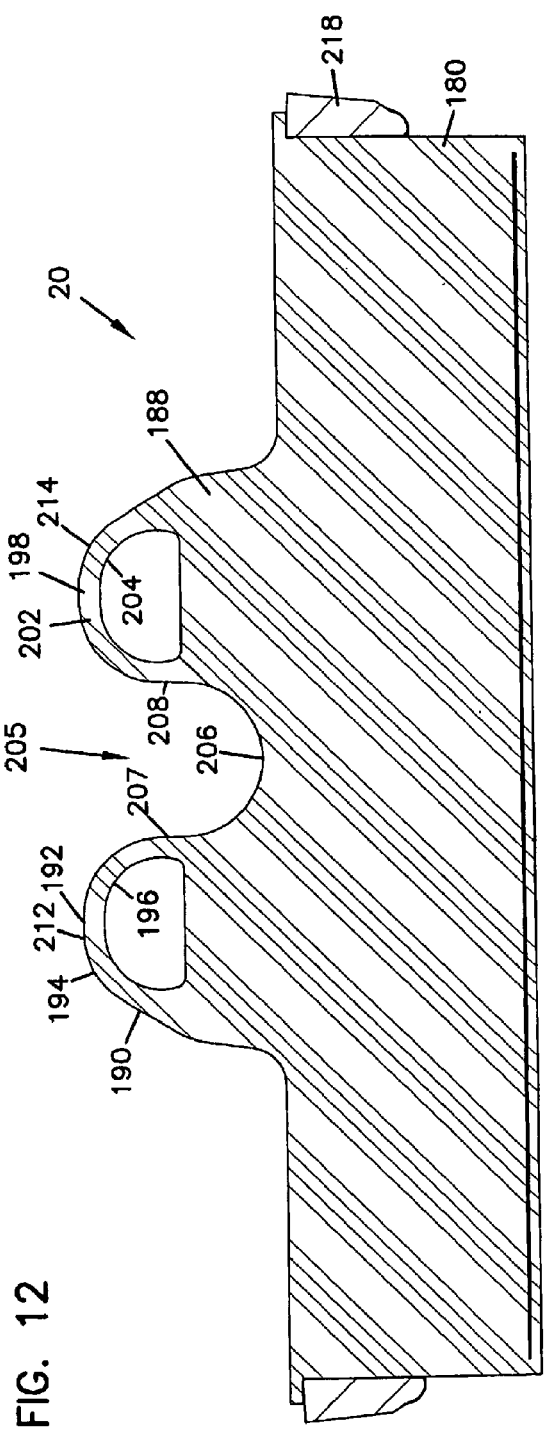
FIG. 12 is a longitudinal cross-sectional view of the safety filter depicted in FIG. 11.
Figure 13:
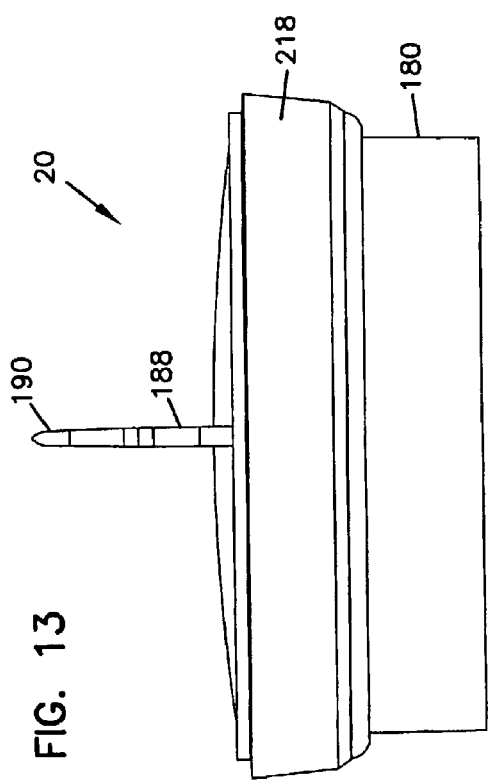
FIG. 13 is an end view of the safety filter of FIG. 11.
Figure 14:
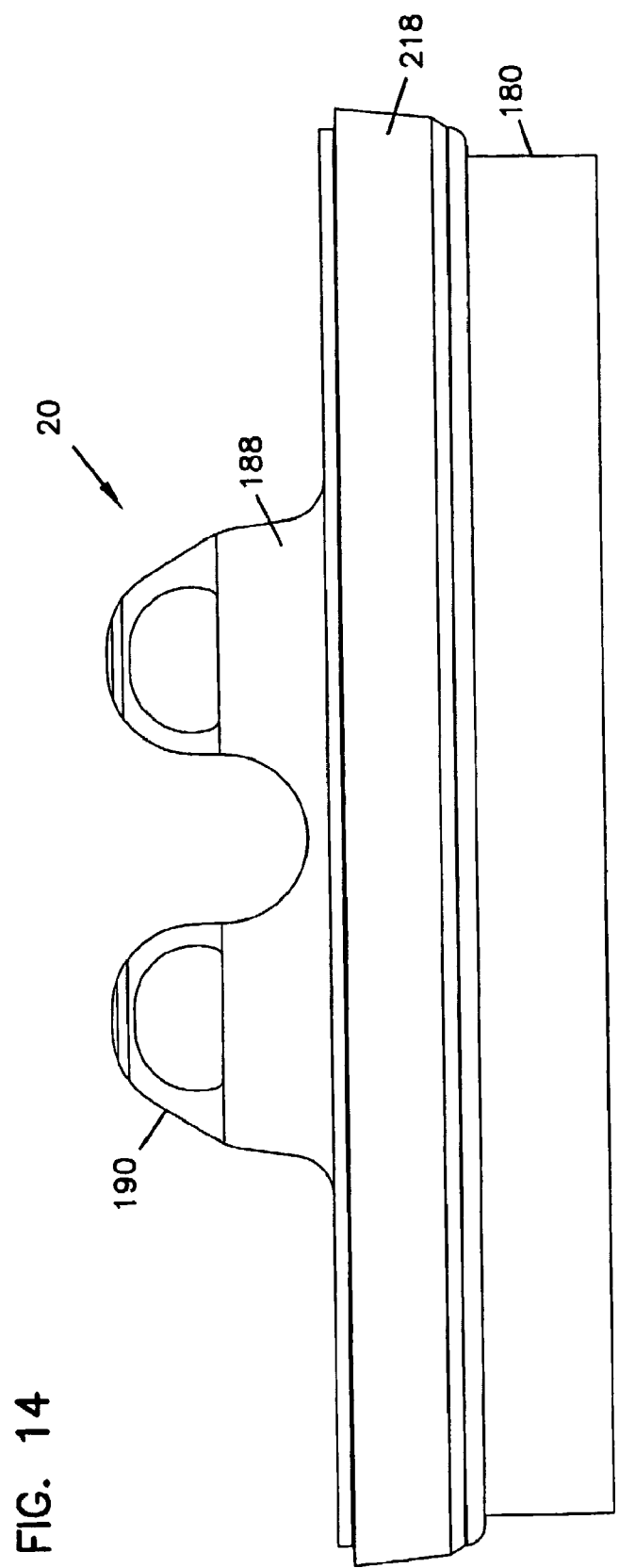
FIG. 14 is a side elevational view of the safety filter depicted in FIG. 11.

In the illustrated embodiment, the safety filter 20 includes a rigid, structural frame 178. Forming a portion of the frame 178 is a skirt or band 180. The band 180 circumscribes an internal region of filter media 184. A variety of types of media 184 can be utilized. In the configuration shown, the media 184 is pleated, with the pleats 185, FIG. 11, extending parallel to the straight sides 172, 173. Pleat densities of at least two pleats per inch, and typically 3-8 pleats per inch, are useable, for example. In FIG. 11, it can be seen how there are two regions of pleats 186, 187. The first pleat region 186 is separated from the second pleat region 187 by a partition 188 of the frame 178 that generally bisects the safety filter 20. The bisecting wall 188 extends longitudinally along the safety filter 20 between curved end 174 and curved end 175.

In the preferred embodiment, the safety filter 20 includes a handle 190 that is sized to accommodate at least a portion of a human hand. By "sized to accommodate a portion of a human hand", it is meant that the handle 190 has structure between it and the remaining portion of the safety element 20 that allows at least a part of hand (a finger or fingers) to fit between the handle structure and the remaining portion of the safety filter 20 to allow for manipulation of the safety filter 20.

In the embodiment shown, the safety filter 20 includes the handle 190 projecting from the frame 178. In preferred embodiments, the handle 190 is an integral extension of the partition 188. A variety of handle constructions 190 are usable. In the one shown, the handle 190 has at least one projection 192 extending from the frame member 189. The projection 192 can take various configurations, including knobs, rings, extensions, etc. In the one shown, the projection 192 takes the form of an arm 194 defining a void 196, FIG. 12. In preferred embodiments, the void 196 goes completely through the arm 194.

In particular preferred embodiments, the handle 190 includes a second projection 198. The second projection 198 can also take a variety of shapes or configurations. In the one shown, the projection 198 has the same shape as projection 192, in the form of an arm 202 having a void 204 (FIG. 12) therebetween.

The sizes of the voids 196, 204, in preferred embodiments, are large enough to accommodate a gloved finger of a human hand, to assist with manipulation of the safety element relative to the air cleaner 1. For example, the voids 196, 204 define a cross-sectional area of at least 2 cm$^2$, typically 4-100 sq. cm$^2$. The projections 192, 198 are separated from each other by a landing 206, FIG. 12, in the partition 188.

In preferred uses, volume 205 defined by landing 206 and the inner sides 207, 208 of each projection 192, 198 accommodates the apex 152 (FIG. 7) of the centering construction 79 of the core 57, see FIG. 4. In such preferred uses, the projections 192, 198 operate as guides 212, 214 (FIG. 12) to help operably orient the primary filter cartridge 22 in place in the air cleaner 1. The guides 212, 214, can be sized to help to center and place the filter cartridge 22 within the air cleaner 1.

Still in reference to FIGS. 11-14, the preferred safety filter 20 includes a seal member 218 to help form a seal 220 (FIG. 4) between the safety filter 20 and the air cleaner section 9 of the housing 2. In the one shown, the seal member 218 is secured to the band 180 around the entire periphery of the band 180. The seal member 218, in the one shown, forms a radially directed seal 221 (FIG. 4) between and against the band 180 and the inside surface 120 of the air cleaner section 9 of the housing 2.

Useful media 184 can include many different types of conventional filter media. This includes cellulose, synthetic, and various blends. One usable, convenient media is a synthetic/glass fiber blend having a weight of 70±4.0 lb./3,000 ft.$^2$ (114±6.5 g/m$^2$); a thickness of 0.032±0.003 in (0.81±0.08 mm); a Frazier permeability of 165±20 ft./min. (50.3±6.1 m/min.); a pore size of 100±8 microns; a dry tensile strength of 19.8±6.6 lb./in (9.0±3 kg/in); and a burst strength of 20±5 psi (138±34 kPa).

D. Usable Precleaner Constructions

In FIGS. 2-4, a preferred precleaner section 8 is illustrated. While a number of different, conventional precleaners can be used upstream of the primary filter element 22, the particular precleaner 8 illustrated can be used to advantage.

Figure 2A:
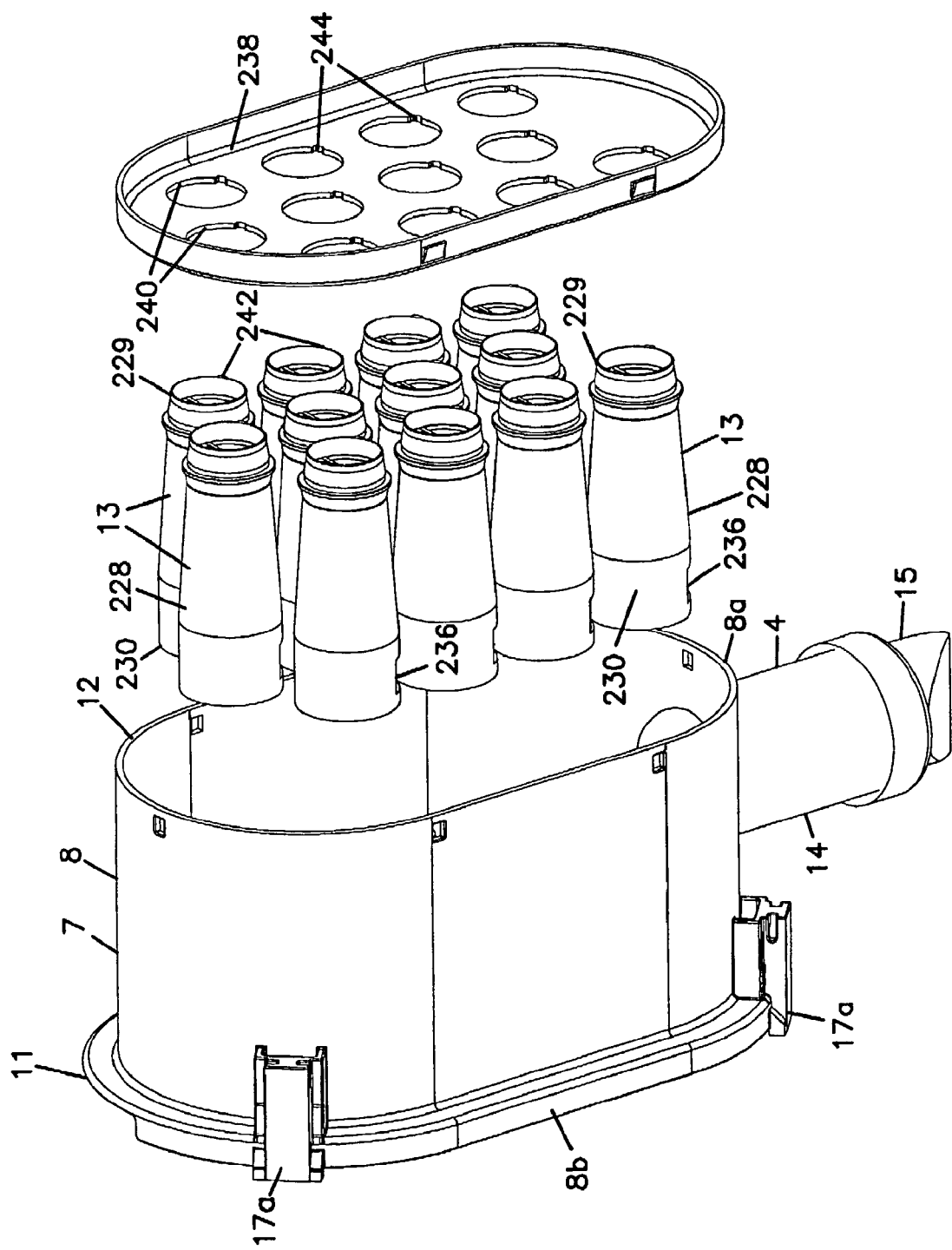
FIG. 2a is an exploded, perspective view of a precleaner assembly portion of the air cleaner arrangement depicted in FIG. 1.

As mentioned above, the precleaner 8 includes a plurality of centrifugal separator tubes 13, FIG. 2A. Each of the tubes 13 include an outer surrounding substantially cylindrical wall 228 that is tapered between opposite ends 229, 230. The end 229 has a smaller diameter than the end 230. The end 229 will be oriented upstream to the end 230. Located within the wall 228 is a vortex generator 232, FIG. 3, including vanes or curved blades 234. The wall 228 also includes at its downstream end 230 an outlet port 236, FIG. 2A.

Each of the tubes 13 is received within an upstream baffle plate 238, FIG. 2A. The baffle plate 238 includes a plurality of apertures 240 sized to receive the upstream end 229 of the tubes 13. The upstream end 229 of each of the tubes has a tab 242 (FIG. 3) that is received within a slot 244, FIG. 2A, which is part of the aperture 240. This tab/aperture forms an indexing arrangement 246 (FIG. 3) that ensures that each of the outlet ports 236 on each of the tubes 13 is pointed in the direction toward the dust ejection tube 4.

The preferred precleaner 8 depicted also includes a plurality of extraction tubes 250, FIG. 4, that are received within the tubes 228. In preferred implementations, each of the extraction tubes 250 is molded as an integral part of the cover 7. As such, in preferred embodiments, the cover 7 includes as an integral, molded, one-piece member: the side wall 252, the tube 14, a downstream baffle plate 254, and each of the extraction tubes 250.

To assemble the precleaner 8, each of the tubes 228 is inserted into a corresponding aperture 240 in the baffle plate 238. The indexing arrangement 246 is used by aligning the tab of each of the tubes 228 into a corresponding slot 244 to ensure that the outlet port 236 is pointed in a direction toward the ejector tube 4. The upstream baffle plate 238 with each of the tubes 228 installed there within is then oriented over the remaining portion of the precleaner 8. Each of the ends 230 of the tubes 228 is oriented over a corresponding extraction tube 250, and the baffle plate 238 is secured, such as by a snap fit, onto the side wall 252.

The precleaner 8 operates as follows: a gas flow stream containing particulate matter flows through the upstream end 229 of each of the tubes 13. The flow is induced to rotate by the vortex generator 232. The rotating nature of the flow stream causes centrifugal forces to act on the particulate matter in the gas flow stream. The particulate matter heavier than the gas in the flow stream and migrates toward the wall 228.

The particles are ejected from the outlet ports 236, while the remaining gas stream flows through the extraction tubes 250. From the extraction tubes 250, the air flows downstream and into the upstream flow face 23 of the primary filter element 22. The particulate matter that is ejected from the outlet ports 236 falls by gravity downwardly through the ejection tube 4 and out through the ejection valve 15.

E. Methods

In general, a method of sealing a filter element having a straight through flow construction, as described, is provided. The preferred method generally includes positioning opposing flanges of a cover and a primary air cleaner section, as described, in engagement with the projecting axial seal gasket (on the element) and axially compressing the gasket, as shown.

A method for mounting a sealing gasket in a filter cartridge having a straight through flow construction, as described, is provided. One example method generally includes sealing a preform and media pack together, with the same seal material shot that will form a housing seal for the cartridge.

To clean gas, first, the filters (20, 22) should be installed within the air cleaner 1. The cover 8, containing a precleaner, is removed from the air cleaner section 9 of the housing 2. The safety filter 20 is provided. The safety filter 20 is handled and manipulated by grasping the handle 190, such as by putting fingers through the voids 196, 204. The safety filter 20 is placed through the open end of the air cleaner section 9 and installed within the portion 32. The gasket 220 is compressed between and against the wall 9 to form a radial seal 221 between the safety filter 20 and the air cleaner section 9.

Referring to FIG. 4, next, the primary filter cartridge 22 is provided.

The primary filter cartridge 22 is manipulated such that the downstream end 24 is placed first through the open end of the air cleaner portion 9. The receiver 75 is aligned with the guides 212, 214 to be received therein. In particular, the core 57 has receiver pockets 164, 167, FIG. 4, that receive the guides 212, 214 there within. The centering structure 152 of the core 57 interacts with the guides 212, 214 to help align and center the primary element 22 within the air cleaner section 9.

The primary filter cartridge 22 is centered as described above and oriented such that the gasket 28 rests upon the flange 371 of the air cleaner section 9. Next, the precleaner section 7 is oriented over the air cleaner section 9 so that the flange 370 rests on the gasket 28. The over center latches or clamps 17 are then used to apply axial force at joint 11 and form an axial seal with the gasket 28 between the precleaner section 7 of the housing and the air cleaner section 9 of the housing. Flange 370 includes peripheral extension 370*a*, FIG. 8, to cover outer annular portion 28*f* of seal 28.

To clean air, the air enters the precleaner 7 through the centrifugal tubes 13. The vortex generator 232 causes the gas flow to rotate, which causes the particulate matter to migrate toward the walls 228. The particulate matter is then ejected through the outlet ports 236, to fall by gravity through the dust ejector tube 14. The precleaned air then flows through the extraction tubes 250 and then through the inlet face 23 of the primary filter element 22. The media pack 26 removes further particulate material from the air. The cleaned air then flows through the outlet face 24. Next, the cleaned air flows through the media 184 of the optional safety filter 20, and then through the outlet tube 3. From there, the cleaned air flows to downstream equipment, such as an engine.

After a period of use, the air cleaner 1 will require servicing. To service the air cleaner 1, the precleaner section 7 is removed from the air cleaner section 9 of the housing 2. This is done by releasing the clamps. When the clamps 17 are released, this releases the axial seal formed by the sealing gasket 28. The upstream face of the filter cartridge 22 is then exposed. The filter cartridge 22 is grasped and removed from the air cleaner section 9. The primary filter cartridge 22 can be disposed of or recycled, in convenient applications. If the safety filter 20 also needs servicing, the handle 190 is grasped, and the safety element 20 is removed from the air cleaner section 9 and disposed of or recycled. It should be understood that in many applications, the primary filter cartridge 22 will require replacement, while the safety filter element 20 will not require replacement.

If the safety filter 20 is being replaced, then a second, new safety filter element 20 is inserted into the housing 2, as described in the initial installation description above. Next, a new primary filter cartridge 22 is provided and is installed within the air cleaner section 9, as described above. The precleaner section 8 is placed over the air cleaner section 9, and the axial seal is formed with the gasket 28.

What is claimed is:

1. An air filter cartridge comprising:
   (a) a z-filter media pack comprising a coiled arrangement of single facer media, wherein the single facer media comprises a fluted media sheet secured to a facing media sheet by a first sealant positioned therebetween, and a second sealant positioned along an opposite side of the facing media sheet from the first sealant, the media pack having an inlet flow face, an outlet flow face, an axial length between the inlet flow face and the outlet flow face, and flutes extending from the inlet flow face to the outlet flow face; wherein the media is closed to the flow of unfiltered air therethrough;
   (b) a shell having opposite ends and a sidewall extending therebetween, the sidewall circumscribing the media pack, wherein the media pack is secured within the shell;
   (c) a seal support extending from the shell and having a plurality of apertures therethrough;
   (d) a seal arrangement secured on the seal support, wherein the seal arrangement is molded to the seal support and extends through the apertures; and
   (e) the z-filter media pack has a non-circular cross section taken perpendicularly to a direction of extension of the flutes.

2. An air filter cartridge according to claim 1, wherein the shell comprises a molded plastic material.

3. An air filter cartridge according to claim 1, wherein the seal arrangement comprises foam polyurethane.

4. An air filter cartridge according to claim 1, wherein the shell is secured to the media pack by the seal arrangement.

5. An air filter cartridge according to claim 1, wherein the seal arrangement is constructed to provide an axial seal when in sealing engagement with an air cleaner housing.

6. An air filter cartridge according to claim 1, wherein the shell includes a portion extending over one of the z-filter media pack flow faces.

7. An air filter cartridge according to claims 6, wherein the portion extending over one of the z-media pack flow faces comprises a grid work.

8. An air filter cartridge according to claim 7, wherein the grid work comprises diagonal cross pieces.

9. An air filter cartridge according to claim 7, wherein the grid work inhibits media telescoping.

10. An air filter cartridge according to claim 1, wherein the shell includes a portion extending over the outlet flow face of the media pack.

11. An air filter cartridge according to claim 1, wherein the shell further comprises a funnel surface extending at an angle relative to the media pack.

12. An air filter cartridge according to claim 11, wherein the angle is within the range of 30° to 60°.

13. An air filter cartridge according to claim 11, wherein the angle is within the range of 35° to 55°.

14. An air filter cartridge according to claim 1, wherein the z-filter media pack non-circular cross section has a pair of opposite sides joined by a pair of curved opposite ends.

15. An air filter cartridge comprising:
   (a) a z-filter media pack comprising a coiled arrangement of single facer media., wherein the single facer media comprises a fluted media sheet secured to a facing media sheet by a first sealant positioned therebetween, and a second sealant positioned along an opposite side of the facing media sheet from the first sealant, the media pack having an inlet flow face, an outlet flow face, an axial length between the inlet flow face and the outlet flow face, and flutes extending from the inlet flow face to the outlet flow face; wherein the media is closed to the flow of unfiltered air therethrough, wherein the media is closed to the flow of unfiltered air therethrough;
   (b) a sealing structure located around a periphery of the z-filter media pack between the inlet flow face and the outlet flow face, and wherein at least a portion of the sealing structure is molded to the outer periphery of the z-filter media pack, the sealing structure comprising:
      (i) a molded member having opposite ends and a sidewall extending therebetween, the sidewall circumscribing the media pack, wherein the media pack is secured within the sidewall, and
      a seal support extending from the sidewall and located between the media pack inlet flow face and the media pack outlet flow face;
      (ii) a seal arrangement molded on the seal support; and
   (c) the z-filter media pack has non-circular cross section taken perpendicularly to a direction of extension of the flutes.

16. An air filter cartridge according to claim 15, wherein the sidewall has a length from a first end to an opposite second end that is less than the axial length between the inlet flow face to the outlet flow face.

17. An air filter cartridge according to claim 15, wherein the sidewall is secured to the media pack by the seal arrangement.

18. An air filter cartridge according to claim 15, wherein the seal arrangement is constructed to provide an axial seal when in sealing engagement with an air cleaner housing.

19. An air filter cartridge according to claim 15, wherein the molded member includes a portion extending over one of the inlet flow face or the outlet flow face.

20. An air filter cartridge according to claim 15, wherein the z-filter media pack non-circular cross section has a pair of opposite sides joined by a pair of curved opposite ends.

21. An air filter cartridge according to claim 15, further comprising:
   (a) an elongated centerpiece located within the z-filter media pack.

* * * * *